(12) United States Patent
Minnen

(10) Patent No.: US 8,890,813 B2
(45) Date of Patent: Nov. 18, 2014

(54) CROSS-USER HAND TRACKING AND SHAPE RECOGNITION USER INTERFACE

(71) Applicant: Oblong Industries, Inc., Los Angeles, CA (US)

(72) Inventor: David Minnen, Santa Monica, CA (US)

(73) Assignee: Oblong Industries, Inc., Los Angeles, CA (US)

(*) Notice: Subject to any disclaimer, the term of this patent is extended or adjusted under 35 U.S.C. 154(b) by 0 days.

(21) Appl. No.: 13/888,174

(22) Filed: May 6, 2013

(65) Prior Publication Data

US 2014/0145929 A1    May 29, 2014

Related U.S. Application Data

(63) Continuation-in-part of application No. 12/572,689, filed on Oct. 2, 2009, and a continuation-in-part of (Continued)

(51) Int. Cl.
*G09G 5/08*    (2006.01)

(52) U.S. Cl.
USPC .......................................... 345/158; 345/166

(58) Field of Classification Search
USPC .................... 345/156–178; 178/18.01–18.09, 178/20.01–20.04
See application file for complete search history.

(56) References Cited

U.S. PATENT DOCUMENTS

| | | | |
|---|---|---|---|
| 8,531,396 B2 * | 9/2013 | Underkoffler et al. | 345/158 |
| 8,537,111 B2 * | 9/2013 | Underkoffler et al. | 345/158 |
| 8,669,939 B2 * | 3/2014 | Underkoffler et al. | 345/158 |

*Primary Examiner* — Vijay Shankar
(74) *Attorney, Agent, or Firm* — IPR Law Group, PC

(57) ABSTRACT

Embodiments include vision-based interfaces performing hand or object tracking and shape recognition. The vision-based interface receives data from a sensor, and the data corresponds to an object detected by the sensor. The interface generates images from each frame of the data, and the images represent numerous resolutions. The interface detects blobs in the images and tracks the object by associating the blobs with tracks of the object. The interface detects a pose of the object by classifying each blob as corresponding to one of a number of object shapes. The interface controls a gestural interface in response to the pose and the tracks.

65 Claims, 33 Drawing Sheets

Related U.S. Application Data application No. 12/572,698, filed on Oct. 2, 2009, now Pat. No. 8,830,168, and a continuation-in-part of application No. 13/850,837, filed on Mar. 26, 2013, and a continuation-in-part of application No. 12/417,252, filed on Apr. 2, 2009, and a continuation-in-part of application No. 12/487,623, filed on Jun. 18, 2009, and a continuation-in-part of application No. 12/553,845, filed on Sep. 3, 2009, now Pat. No. 8,531,396, and a continuation-in-part of application No. 12/553,902, filed on Sep. 3, 2009, now Pat. No. 8,537,111, and a continuation-in-part of application No. 12/553,929, filed on Sep. 3, 2009, now Pat. No. 8,537,112, and a continuation-in-part of application No. 12/557,464, filed on Sep. 10, 2009, and a continuation-in-part of application No. 12/579,340, filed on Oct. 14, 2009, and a continuation-in-part of application No. 13/759,472, filed on Feb. 5, 2013, and a continuation-in-part of application No. 12/579,372, filed on Oct. 14, 2009, and a continuation-in-part of application No. 12/773,605, filed on May 4, 2010, now Pat. No. 8,681,098, and a continuation-in-part of application No. 12/773,667, filed on May 4, 2010, now Pat. No. 8,723,795, and a continuation-in-part of application No. 12/789,129, filed on May 27, 2010, and a continuation-in-part of application No. 12/789,262, filed on May 27, 2010, now Pat. No. 8,669,939, and a continuation-in-part of application No. 12/789,302, filed on May 27, 2010, now Pat. No. 8,665,213, and a continuation-in-part of application No. 13/430,509, filed on Mar. 26, 2012, and a continuation-in-part of application No. 13/430,626, filed on Mar. 26, 2012, and a continuation-in-part of application No. 13/532,527, filed on Jun. 25, 2012, and a continuation-in-part of application No. 13/532,605, filed on Jun. 25, 2012, and a continuation-in-part of application No. 13/532,628, filed on Jun. 25, 2012.

(60) Provisional application No. 61/643,124, filed on May 4, 2012, provisional application No. 61/655,423, filed on Jun. 4, 2012, provisional application No. 61/711,152, filed on Oct. 8, 2012, provisional application No. 61/719,109, filed on Oct. 26, 2012, provisional application No. 61/722,007, filed on Nov. 2, 2012, provisional application No. 61/725,449, filed on Nov. 12, 2012, provisional application No. 61/787,792, filed on Mar. 15, 2013, provisional application No. 61/785,053, filed on Mar. 14, 2013, provisional application No. 61/787,650, filed on Mar. 15, 2013, provisional application No. 61/747,940, filed on Dec. 31, 2012.

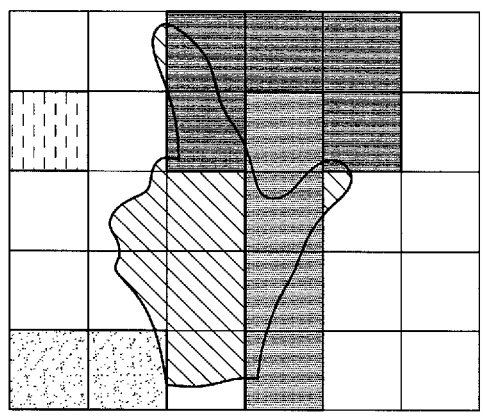 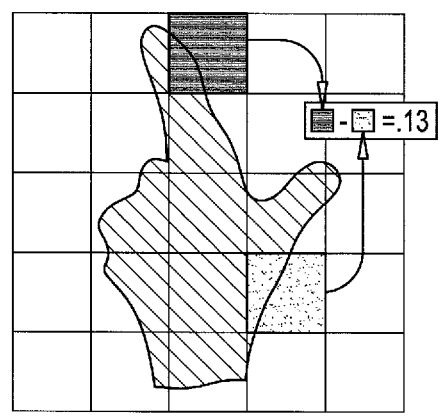
(a) Feature Set B        (b) Feature Set C
FIG. 8

1. Depict pose with left hand as viewed from back p = pinkie finger
r = ring finger
m = middle finger
i = index finger
t = thumb

| ^ | = curled non-thumb |
| > | = curled thumb |
| \| | = straight finger or thumb pointed straight up |
| \ or / | = straight finger or thumb pointed at angle |
| - | = thumb pointing straight sideways |
| x | = finger or thumb pointing into plane |

| Pose name | p | r | m | i | t |
|---:|:-:|:-:|:-:|:-:|:-:|
| | | | Hand Pose | | |
| flat | \| | \| | \| | \| | \| |
| fist | ^ | ^ | ^ | ^ | > |
| mime gun | ^ | ^ | ^ | \| | - |
| 2 or peace | ^ | ^ | \ | / | > |
| one-finger point | ^ | ^ | ^ | \| | > |
| two-finger point | ^ | ^ | \| | \| | > |
| x·y·z | ^ | ^ | x | \| | - |
| ok | \| | \| | \| | ^ | > |
| pinkie point | \| | ^ | ^ | ^ | > |
| bracket | x | x | x | x | x |
| 4 | \ | \ | \| | / | > |
| 3 | ^ | \ | \| | / | > |
| 5 | \ | \ | \| | / | / |

FIG. 13

2. Add hand orientation to complete pose must specify two variables:
    1. palm direction (if hand were flat)
    2. finger direction (if hand were flat)

| | |
|---|---|
| - | medial |
| + | lateral |
| x | anterior |
| * | posterior |
| ^ | cranial |
| v | caudal | orientation variables come after colon, e.g.:

| | | |
|---|---|---|
| ^ ^ x \| - : - x | = | x·y·z start position |
| ^ ^ \ / > : * v | = | upside-down v |

FIG. 14

3. Two-hand combos

| Hand 1 | Hand 2 | Pose |
|---|---|---|
| ^ ^ ^ ^ > : x ^ | ^ ^ ^ ^ > : x ^ | full stop |
| ^ ^ ^ \| - : x - | ^ ^ ^ \| - : x ^ | snapshot |
| \| \| \| \| \| : v x | \| \| \| \| \| : - x | rudder and throttle start position |

FIG. 15

4. Orientation blends

Achieve variable blending by enclosing pairs e.g.:

| | | | | : (vx) (x^)          flat at 45 degrees pitch toward screen

^ ^ | | > : ( - ( - v ) ) x    two-finger point rolled medially to 22.5
                                  degrees (halfway between palm medial
                                  and palm rolled to 45 degrees)

| Gest I.D. | Description | Hand 1 Pose | Hand 1 Motion | Hand 2 Pose | Hand 2 Motion |
|---|---|---|---|---|---|
| 1 | point at object (invoke and move cursor) | ^ ^ ^ \| - : - x | point mime gun | | |
| 2 | select object | ^ ^ ^ \| \| : - x | drop thumb to select | | |
| 3 | move spatially / zoom in / out | ^ ^ x \| - : - x | rotate / translate | | |
| 4 | snapshot | ^ ^ ^ \| - : x - | make square with 2 hands | ^ ^ ^ \| - : x ^ | make square with 2 hands |
| 5 | demarcate rectangular region | ^ ^ ^ \| - : x - | make square then adjust size | ^ ^ ^ \| - : x ^ | make square then adjust size |
| 6 | clear the decks | \| \| \| \| : + x | sweep hand laterally | \| \| \| \| : - x | sweep hand medially |
| 7 | organize objects into a circle | ^ ^ ^ \| - : - ^ | look through circle of O.K. sign | | |
| 8 | two-finger point at objects | ^ ^ \| \| : - x | point | | |
| 9 | two-finger select object | ^ ^ ^ \| \| : - x | drop thumb to select | | |
| 10 | mark start time | x x x x x : - ^ | strike pose | | |
| 11 | mode change 1 | \| \| \| \| : - ^ | strike pose-make "T" with two hands | \| \| \| \| : v - | strike pose-make "T" with two hands |
| 12 | mode change 11 | \| \| \| \| : - ^ | strike pose - parallel hands | \| \| \| \| : - ^ | strike pose - parallel hands |
| 13 | push back and slide workspace | \| \| \| \| - : x ^ | push palm toward screen - - move sideways to find new regions | | |

FIG. 18A

| | | | | |
|---|---|---|---|---|
| 14 | enter sub-application | \|\|\|\| : x ^ | strike pose | \|\|\|\| : x ^ strike pose |
| 15 | return from sub-application | \|\|\|\| : . ^ | strike pose | \|\|\|\| : . ^ strike pose |
| 16 | select option | ^ ^ ^ \| - : - x | medial roll | |
| 17 | roll time forward/back | \|\|\|\| : v x | Yaw hand at elbow while keeping hand parallel to floor | |
| 18 | stop time | \|\|\|\| : x ^ | strike pose | |
| 19 | loop time | ^ ^ ^ \| - : x ^ | circular motion with "L" | |
| 20 | demarcate irregular region | ^ ^ ^ \| - : v x | start with 2 finger tips together. 1 hand holds start position. | ^ ^ ^ \| - : - x  other hand traces out shape - select "click" for vertices |
| 21 | tag object | \| ^ ^ ^ > : - x | pinky-point at object then roll hand medially | |
| 22 | group data streams | ^ ^ ^ \| - : v x | bring finger tips of two hands together | ^ ^ ^ \| - : v x  bring finger tips of two hands together |
| 23 | restore encapsulated workspace | \|\|\|\| : + x | sweep hand medially | \|\|\|\| : - x  sweep hand laterally |

FIG. 18B first quadword of every slaw

| | 76543210 | 76543210 | 76543210 | 76543210 |
|---|---|---|---|---|
| length-follows: | 1xxxxxxx | xxxxxxxx | xxxxxxxx | xxxxxxxx |
| eight-byte length: | 11xxxxxx | xxxxxxxx | xxxxxxxx | xxxxxxxx |
| | | | | |
| wee cons: | 01xxxxxx | xxxxxxxx | xxxxxxxx | xxxxxxxx |
| wee cons quadlen: | rrqqqqqq | qqqqqqqq | qqqqqqqq | qqqqqqqq |
| wee string: | 001xxxxx | xxxxxxxx | xxxxxxxx | xxxxxxxx |
| wee string quadlen: | rrrqqqqq | qqqqqqqq | qqqqqqqq | qqqqqqqq |
| wee list: | 0001xxxx | xxxxxxxx | xxxxxxxx | xxxxxxxx |
| wee list quadlen: | rrrrqqqq | qqqqqqqq | qqqqqqqq | qqqqqqqq |
| | | | | |
| full string: | 1*100000 | 00000000 | 00000000 | 00000001 |
| full cons: | 1*100000 | 00000000 | 00000000 | 00000010 |
| | | | | |
| full list: | 1*100000 | 00000000 | 00000000 | 00000011 |

(the penulti-MSB above is zero or one as the length is contained in the next one or two quadwords, i.e. if it's a four or eight byte length, per the 'eight-byte length' bit description second from top)

| | | | | |
|---|---|---|---|---|
| numeric: | 00001xxx | xxxxxxxx | xxxxxxxx | xxxxxxxx |
| | | | | |
| numeric float: | xxxxx1xx | xxxxxxxx | xxxxxxxx | xxxxxxxx |
| numeric complex: | xxxxxx1x | xxxxxxxx | xxxxxxxx | xxxxxxxx |
| numeric unsigned: | xxxxxxx1 | xxxxxxxx | xxxxxxxx | xxxxxxxx |
| numeric wide: | xxxxxxxx | 1xxxxxxx | xxxxxxxx | xxxxxxxx |
| numeric stumpy: | xxxxxxxx | x1xxxxxx | xxxxxxxx | xxxxxxxx |
| numeric reserved: | xxxxxxxx | xx1xxxxx | xxxxxxxx | xxxxxxxx |

FIG. 24B1

(wide and stumpy conspire to express whether the number in question is 8, 16, 32, or 64 bits long; neither-wide-nor-stumpy, i.e. both zero, is sort of canonical and thus means 32 bits; stumpy alone is 8; stumpy and wide is 16; and just wide is 64)

| | | | | |
|---|---|---|---|---|
| numeric 2-vector: | xxxxxxxx | xxx01xxx | xxxxxxxx | xxxxxxxx |
| numeric 3-vector: | xxxxxxxx | xxx10xxx | xxxxxxxx | xxxxxxxx |
| numeric 4-vector: | xxxxxxxx | xxx11xxx | xxxxxxxx | xxxxxxxx | for any numeric entity, array or not, a size-in-bytes-minus-one is stored in the last eight bits -- if a singleton, this describes the size of the data part; if an array, it's the size of a single element -- so:

| | | | | |
|---|---|---|---|---|
| num'c unit bsize mask: | 00001xxx | xxxxxxxx | xxxxxxxx | mmmmmmmm | and for arrays, there are these:

| | | | | |
|---|---|---|---|---|
| num'c breadth follows: | xxxxxxxx | xxxxx1xx | xxxxxxxx | xxxxxxxx |
| num'c 8-byte breadth: | xxxxxxxx | xxxxx11x | xxxxxxxx | xxxxxxxx |
| num'c wee breadth mask: | xxxxxxxx | xxxxx0mm | mmmmmmmm | xxxxxxxx |

FIG. 24B2

CROSS-USER HAND TRACKING AND SHAPE RECOGNITION USER INTERFACE

RELATED APPLICATIONS

This application claims the benefit of U.S. Patent Application No. 61/643,124, filed May 4, 2012.
This application claims the benefit of U.S. Patent Application No. 61/655,423, filed Jun. 4, 2012.
This application claims the benefit of U.S. Patent Application No. 61/711,152, filed Oct. 8, 2012.
This application claims the benefit of U.S. Patent Application No. 61/719,109, filed Oct. 26, 2012.
This application claims the benefit of U.S. Patent Application No. 61/722,007, filed Nov. 2, 2012.
This application claims the benefit of U.S. Patent Application No. 61/725,449, filed Nov. 12, 2012.
This application claims the benefit of U.S. Patent Application No. 61/787,792, filed Mar. 15, 2013.
This application claims the benefit of U.S. Patent Application No. 61/785,053, filed Mar. 14, 2013.
This application claims the benefit of U.S. Patent Application No. 61/787,650, filed Mar. 15, 2013.
This application claims the benefit of U.S. Patent Application No. 61/747,940, filed Dec. 31, 2012.
This application is a continuation in part application of U.S. patent application Ser. Nos. 12/572,689, 12/572,698, 13/850,837, 12/417,252, 12/487,623, 12/553,845, 12/553,902, 12/553,929, 12/557,464, 12/579,340, 13/759,472, 12/579,372, 12/773,605, 12/773,667, 12/789,129, 12/789,262, 12/789,302, 13/430,509, 13/430,626, 13/532,527, 13/532,605, and 13/532,628.

TECHNICAL FIELD

The embodiments described herein relate generally to processing system and, more specifically, to hand tracking and shape recognition processing systems.

BACKGROUND

In vision-based interfaces, hand tracking is often used to support user interactions such as cursor control, 3D navigation, recognition of dynamic gestures, and consistent focus and user identity. Although many sophisticated algorithms have been developed for robust tracking in cluttered, visually noisy scenes, long-duration tracking and hand detection for track initialization remain challenging tasks.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

BRIEF DESCRIPTION OF THE DRAWINGS

FIG. 8 shows features extracted for (a) Set B showing four rectangles and (b) Set C showing the difference in mean depth between one pair of grid cells, under an embodiment.
FIG. 13 is a diagram of poses in a gesture vocabulary, under an embodiment.
FIG. 14 is a diagram of orientation in a gesture vocabulary, under an embodiment.
FIG. 15 is a diagram of two hand combinations in a gesture vocabulary, under an embodiment.
FIGS. 18A and 18B show example commands, under an embodiment.
FIGS. 24B1 and 24B2 show a slaw header format, under an embodiment.

DETAILED DESCRIPTION

Figure 1A:
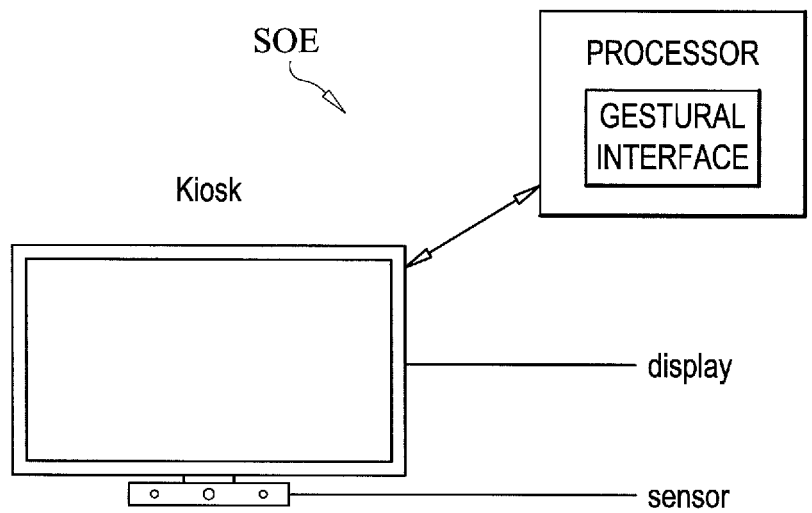
FIG. 1A is a block diagram of the SOE kiosk including a processor hosting the hand tracking and shape recognition component or application, a display and a sensor, under an embodiment.

Embodiments described herein provide a gestural interface that automatically recognizes a broad set of hand shapes and maintains high accuracy rates in tracking and recognizing gestures across a wide range of users. Embodiments provide real-time hand detection and tracking using data received from a sensor. The hand tracking and shape recognition gestural interface described herein enables or is a component of a Spatial Operating Environment (SOE) kiosk (also referred to as "kiosk" or "SOE kiosk"), in which a spatial operating environment (SOE) and its gestural interface operate within a reliable, markerless hand tracking system. This combination of an SOE with markerless gesture recognition provides functionalities incorporating novelties in tracking and classification of hand shapes, and developments in the design, execution, and purview of SOE applications.

The Related Applications referenced herein includes descriptions of systems and methods for gesture-based control, which in some embodiments provide markerless gesture recognition, and in other embodiments identify users' hands in the form of glove or gloves with certain indicia. The SOE kiosk system provides a markerless setting in which gestures are tracked and detected in a gloveless, indicia-free system, providing unusual finger detection and latency, as an example. The SOE includes at least a gestural input/output, a network-based data representation, transit, and interchange, and a spatially conformed display mesh. In scope the SOE resembles an operating system as it is a complete application and development platform. It assumes, though, a perspective enacting design and function that extend beyond traditional computing systems. Enriched, capabilities include a gestural interface, where a user interacts with a system that tracks and interprets hand poses, gestures, and motions.

As described in detail in the description herein and the Related Applications, all of which are incorporated herein by reference, an SOE enacts real-world geometries to enable such interface and interaction. For example, the SOE employs a spatially conformed display mesh that aligns physical space and virtual space such that the visual, aural, and haptic displays of a system exist within a "real-world" expanse. This entire area of its function is realized by the SOE in terms of a three-dimensional geometry. Pixels have a location in the world, in addition to resolution on a monitor, as the two-dimensional monitor itself has a size and orientation. In this scheme, real-world coordinates annotate properties. This descriptive capability covers all SOE participants. For example, devices such as wands and mobile units can be one of a number of realized input elements.

This authentic notion of space pervades the SOE. At every level, it provides access to its coordinate notation. As the location of an object (whether physical or virtual) can be expressed in terms of geometry, so then the spatial relationship between objects (whether physical or virtual) can be expressed in terms of geometry. (Again, any kind of input device can be included as a component of this relationship.) When a user points to an object on a screen, as noted in the Related Applications and the description herein, the SOE interprets an intersection calculation. The screen object reacts, responding to a user's operations. When the user perceives and responds to this causality, supplanted are old modes of computer interaction. The user acts understanding that within the SOE, the graphics are in the same room with her. The result is direct spatial manipulation. In this dynamic interface, inputs expand beyond the constraints of old methods. The SOE opens up the full volume of three-dimensional space and accepts diverse input elements.

Into this reconceived and richer computing space, the SOE brings recombinant networking, a new approach to interoperability. The Related Applications and the description herein describe that the SOE is a programming environment that sustains large-scale multi-process interoperation. The SOE comprises "plasma," an architecture that institutes at least efficient exchange of data between large numbers of processes, flexible data "typing" and structure, so that widely varying kinds and uses of data are supported, flexible mechanisms for data exchange (e.g., local memory, disk, network, etc.), all driven by substantially similar APIs, data exchange between processes written in different programming languages, and automatic maintenance of data caching and aggregate state to name a few. Regardless of technology stack or operating system, the SOE makes use of external data and operations, including legacy expressions. This includes integrating spatial data of relatively low-level quality from devices including but not limited to mobile units such as the iPhone. Such devices are also referred to as "edge" units.

As stated above, the SOE kiosk described herein provides the robust approach of the SOE within a self-contained markerless setting. A user engages the SOE as a "free" agent, without gloves, markers, or any such indicia, nor does it require space modifications such as installation of screens, cameras, or emitters. The only requirement is proximity to the system that detects, tracks, and responds to hand shapes and other input elements. The system, comprising representative sensors combined with the markerless tracking system, as described in detail herein, provides pose recognition within a pre-specified range (e.g., between one and three meters, etc.). The SOE kiosk system therefore provides flexibility in portability and installation but embodiments are not so limited.

Figure 1B:
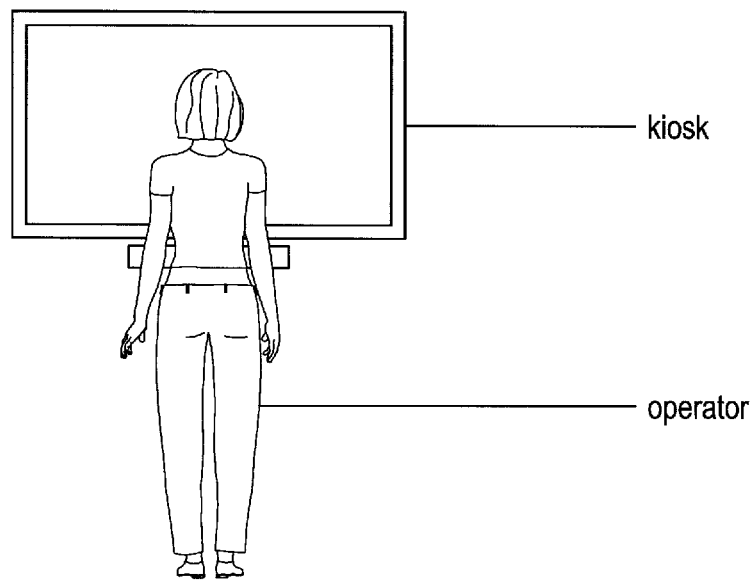
FIG. 1B shows a relationship between the SOE kiosk and an operator, under an embodiment.

FIG. 1A is a block diagram of the SOE kiosk including a processor hosting the gestural interface component or application that provides the vision-based interface using hand tracking and shape recognition, a display and a sensor, under an embodiment. FIG. 1B shows a relationship between the SOE kiosk and an operator, under an embodiment. The general term "kiosk" encompasses a variety of set-ups or configurations that use the markerless tracking and recognition processes described herein. These different installations include, for example, a processor coupled to a sensor and at least one display, and the tracking and recognition component or application running on the processor to provide the SOE integrating the vision pipeline. The SOE kiosk of an embodiment includes network capabilities, whether provided by coupled or connected devices such as a router or engaged through access such as wireless.

Figure 2:
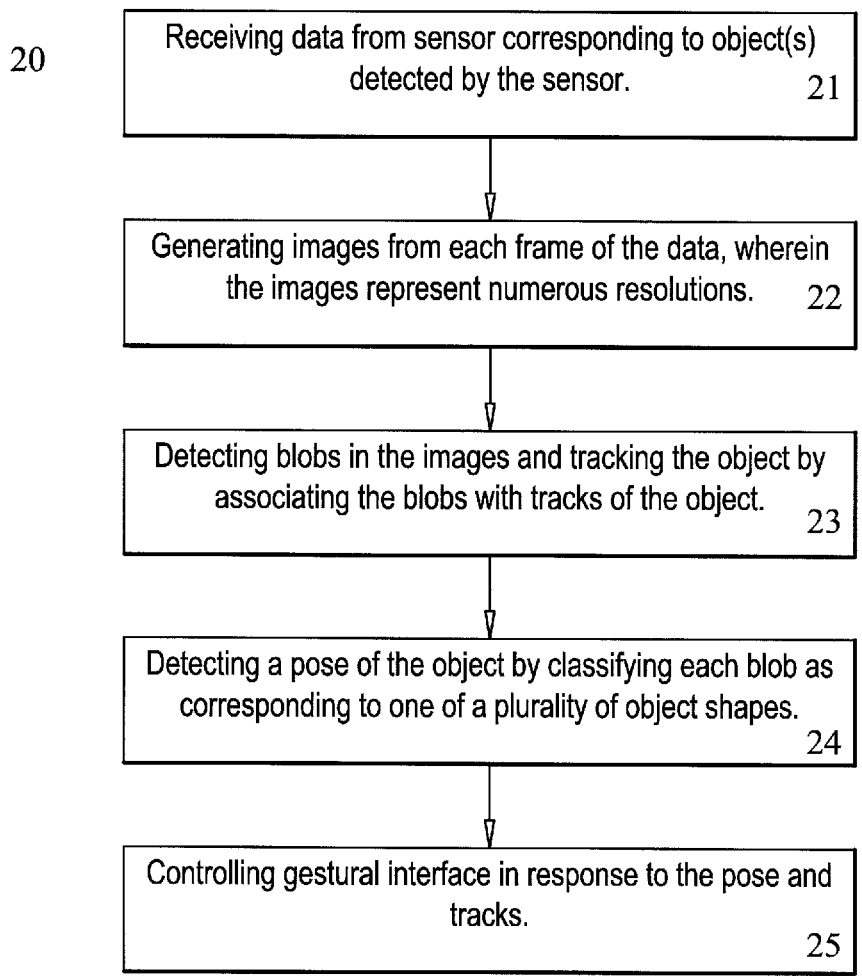
FIG. 2 is a flow diagram of operation of the vision-based interface performing hand or object tracking and shape recognition, under an embodiment.

FIG. 2 is a flow diagram of operation of the gestural or vision-based interface performing hand or object tracking and shape recognition 20, under an embodiment. The vision-based interface receives data from a sensor 21, and the data corresponds to an object detected by the sensor. The interface generates images from each frame of the data 22, and the images represent numerous resolutions. The interface detects blobs in the images and tracks the object by associating the blobs with tracks of the object 23. A blob is a region of a digital image in which some properties (e.g., brightness, color, depth, etc.) are constant or vary within a prescribed range of value, such that all point in a blob can be considered in some sense to be similar to each other. The interface detects a pose of the object by classifying each blob as corresponding to one of a number of object shapes 24. The interface controls a gestural interface in response to the pose and the tracks 25.

Figure 3:
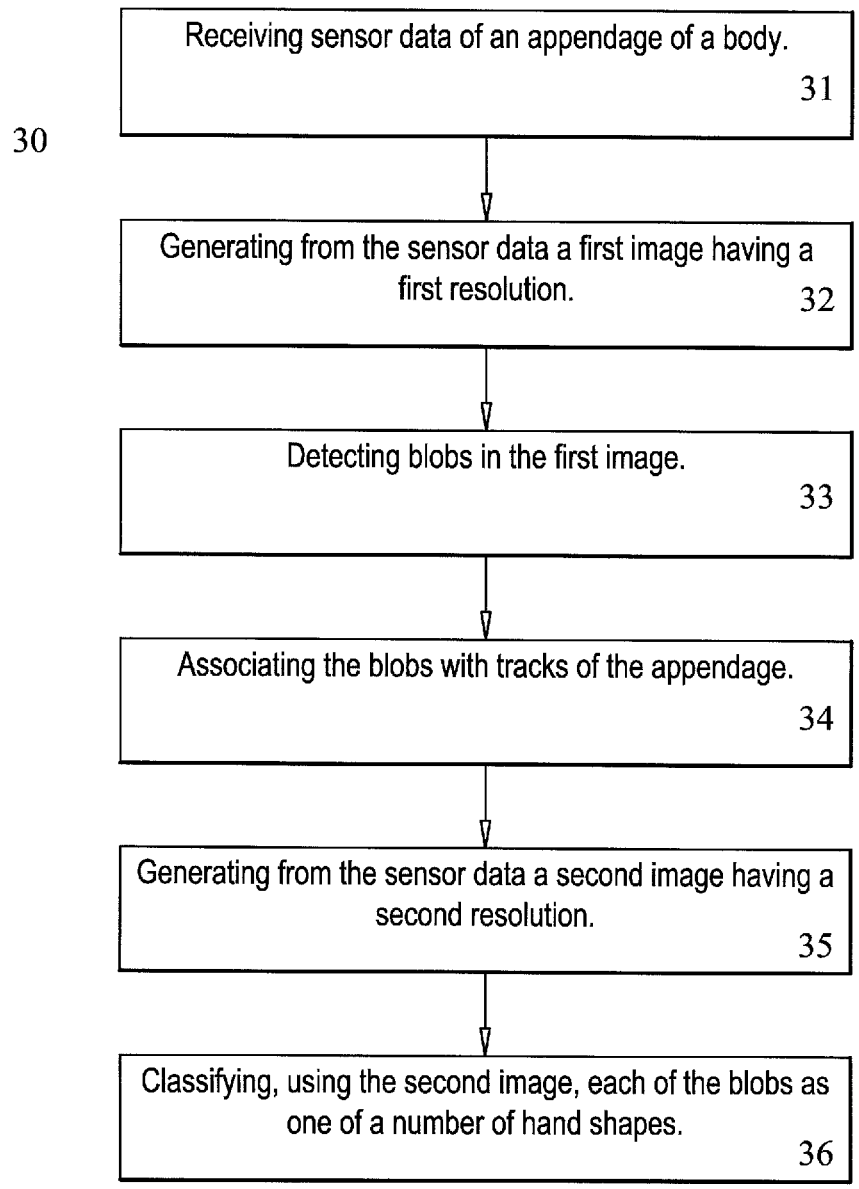
FIG. 3 is a flow diagram for performing hand or object tracking and shape recognition, under an embodiment.

FIG. 3 is a flow diagram for performing hand or object tracking and shape recognition 30, under an embodiment. The object tracking and shape recognition is used in a vision-based gestural interface, for example, but is not so limited. The tracking and recognition comprises receiving sensor data of an appendage of a body 31. The tracking and recognition comprises generating from the sensor data a first image having a first resolution 32. The tracking and recognition comprises detecting blobs in the first image 33. The tracking and recognition comprises associating the blobs with tracks of the appendage 34. The tracking and recognition comprises generating from the sensor data a second image having a second resolution 35. The tracking and recognition comprises using the second image to classify each of the blobs as one of a number of hand shapes 36.

Example embodiments of the SOE kiosk hardware configurations follow, but the embodiments are not limited to these example configurations. The SOE kiosk of an example embodiment is an iMac-based kiosk comprising a 27" version of the Apple iMac with an Asus Xtion Pro, and a sensor is affixed to the top of the iMac. A Tenba case includes the iMac, sensor, and accessories including keyboard, mouse, power cable, and power strip.

The SOE kiosk of another example embodiment is a portable mini-kiosk comprising a 30" screen with relatively small form-factor personal computer (PC). As screen and stand are separate from the processor, this set-up supports both landscape and portrait orientations in display.

The SOE kiosk of an additional example embodiment comprises a display that is a 50" 1920×1080 television or monitor accepting DVI or HDMI input, a sensor (e.g., Asus Xtion Pro Live, Asus Xtion Pro, Microsoft Kinect, Microsoft Kinect for Windows, Panasonic D-Imager, SoftKinetic DS311, Tyzx G3 EVS, etc.), and a computer or process comprising a relatively small form-factor PC running a quad-core CPU and an NVIDIA NVS 420 GPU.

As described above, embodiments of the SOE kiosk include as a sensor the Microsoft Kinect sensor, but the embodiments are not so limited. The Kinect sensor of an embodiment generally includes a camera, an infrared (IR) emitter, a microphone, and an accelerometer. More specifically, the Kinect includes a color VGA camera, or RGB camera, that stores three-channel data in a 1280×960 resolution. Also included is an IR emitter and an IR depth sensor. The emitter emits infrared light beams and the depth sensor reads the IR beams reflected back to the sensor. The reflected beams are converted into depth information measuring the distance between an object and the sensor, which enables the capture of a depth image.

The Kinect also includes a multi-array microphone, which contains four microphones for capturing sound. Because there are four microphones, it is possible to record audio as well as find the location of the sound source and the direction of the audio wave. Further included in the sensor is a 3-axis accelerometer configured for a 2G range, where G represents the acceleration due to gravity. The accelerometer can be used to determine the current orientation of the Kinect.

Low-cost depth cameras create new opportunities for robust and ubiquitous vision-based interfaces. While much research has focused on full-body pose estimation and the interpretation of gross body movement, this work investigates skeleton-free hand detection, tracking, and shape classification. Embodiments described herein provide a rich and reliable gestural interface by developing methods that recognize a broad set of hand shapes and which maintain high accuracy rates across a wide range of users. Embodiments provide real-time hand detection and tracking using depth data from the Microsoft Kinect, as an example, but are not so limited. Quantitative shape recognition results are presented for eight hand shapes collected from 16 users and physical configuration and interface design issues are presented that help boost reliability and overall user experience.

Hand tracking, gesture recognition, and vision-based interfaces have a long history within the computer vision community (e.g., the put-that-there system published in 1980 (e.g., R. A. Bolt. Put-that-there: Voice and gesture at the graphics interface. Conference on Computer Graphics and Interactive Techniques, 1980 ("Bolt"))). The interested reader is directed to one of the many survey papers covering the broader field (e.g., A. Erol, G. Bebis, M. Nicolescu, R. Boyle, and X. Twombly. Vision-based hand pose estimation: A review. Computer Vision and Image Understanding, 108:52-73, 2007 ("Erol et al."); S. Mitra and T. Acharya. Gesture recognition: A survey. IEEE Transactions on Systems, Man and Cybernetics—Part C, 37(3):311-324, 2007 ("Mitra et al."); X. Zabulis, H. Baltzakis, and A. Argyros. Vision-based hand gesture recognition for human-computer interaction. The Universal Access Handbook, pages 34.1-34.30, 2009 ("Zabulis et al."); T. B. Moeslund and E. Granum. A survey of computer vision-based human motion capture. Computer Vision and Image Understanding, 81:231-268, 2001 ("Moeslund-1 et al."); T. B. Moeslund, A. Hilton, and V. Kruger. A survey of advances in vision-based human motion capture and analysis. Computer Vision and Image Understanding, 104:90-126, 2006 ("Moeslund-2 et al.")).

The work of Plagemann et al. presents a method for detecting and classifying body parts such as the head, hands, and feet directly from depth images (e.g., C. Plagemann, V. Ganapathi, D. Koller, and S. Thrun. Real-time identification and localization of body parts from depth images. IEEE International Conference on Robotics and Automation (ICRA), 2010 ("Plagemann et al.")). They equate these body parts with geodesic extrema, which are detected by locating connected meshes in the depth image and then iteratively finding mesh points that maximize the geodesic distance to the previous set of points. The process is seeded by either using the centroid of the mesh or by locating the two farthest points. The approach presented herein is conceptually similar but it does not require a pre-specified bounding box to ignore clutter. Furthermore, Plagemann et al. used a learned classifier to identify extrema as a valid head, hand, or foot, whereas our method makes use of a higher-resolution depth sensor and recognizes extrema as one of several different hand shapes.

Shwarz et al. extend the work of Plagemann et al. by detecting additional body parts and fitting a full-body skeleton to the mesh (e.g., L. A. Schwarz, A. Mkhitaryan, D. Mateus, and N. Navab. Estimating human 3d pose from time-of-flight images based on geodesic distances and optical flow. Automatic Face and Gesture Recognition, pages 700-706, 2011 ("Shwarz et al.")). They also incorporate optical flow information to help compensate for self-occlusions. The relationship to the embodiments presented herein, however, is similar to that of Plagemann et al. in that Shwarz et al. make use of global information to calculate geodesic distance which will likely reduce reliability in cluttered scenes, and they do not try to detect finger configurations or recognize overall hand shape.

Shotton et al. developed a method for directly classifying depth points as different body parts using a randomized decision forest (e.g., L. Breiman. Random forests. Machine Learning, 45(1):5-32, 2001 ("Breiman")) trained on the distance between the query point and others in a local neighborhood (e.g., J. Shotton, A. Fitzgibbon, M. Cook, T. Sharp, M. Finocchio, R. Moore, A. Kipman, and A. Blake. Real-time human pose recognition in parts from a single depth image. IEEE Conf on Computer Vision and Pattern Recognition, 2011 ("Shotton et al.")). Their goal was to provide higher-level information to a real-time skeleton tracking system and so they recognize 31 different body parts, which goes well beyond just the head, hands, and feet. The approach described herein also uses randomized decision forests because of their low classification overhead and the model's intrinsic ability to handle multi-class problems. Embodiments described herein train the forest to recognize several different hand shapes, but do not detect non-hand body parts.

In vision-based interfaces, as noted herein, hand tracking is often used to support user interactions such as cursor control, 3D navigation, recognition of dynamic gestures, and consistent focus and user identity. Although many sophisticated algorithms have been developed for robust tracking in cluttered, visually noisy scenes (e.g., J. Deutscher, A. Blake, and I. Reid. Articulated body motion capture by annealed particle filtering. Computer Vision and Pattern Recognition, pages 126-133, 2000 ("Deutscher et al."); A. Argyros and M. Lourakis. Vision-based interpretation of hand gestures for remote control of a computer mouse. Computer Vision in HCI, pages 40-51, 2006. 1 ("Argyros et al.")), long-duration tracking and hand detection for track initialization remain challenging tasks. Embodiments described herein build a reliable, markerless hand tracking system that supports the creation of gestural interfaces based on hand shape, pose, and motion. Such an interface requires low-latency hand tracking and accurate shape classification, which together allow for timely feedback and a seamless user experience.

Embodiments described herein make use of depth information from a single camera for local segmentation and hand detection. Accurate, per-pixel depth data significantly reduces the problem of foreground/background segmentation in a way that is largely independent of visual complexity. Embodiments therefore build body-part detectors and tracking systems based on the 3D structure of the human body rather than on secondary properties such as local texture and color, which typically exhibit a much higher degree of variation across different users and environments (See, Shotton et al., Plagemann et al.).

Embodiments provide markerless hand tracking and hand shape recognition as the foundation for a vision-based user interface. As such, it is not strictly necessary to identify and track the user's entire body, and, in fact, it is not assumed that the full body (or even the full upper body) is visible. Instead, embodiments envision situations that only allow for limited visibility such as a seated user where a desk occludes part of the user's arm so that the hand is not observably connected to the rest of the body. Such scenarios arise quite naturally in real-world environments where a user may rest their elbow on their chair's arm or where desktop clutter like an open laptop may occlude the lower portions of the camera's view.

Figure 4:
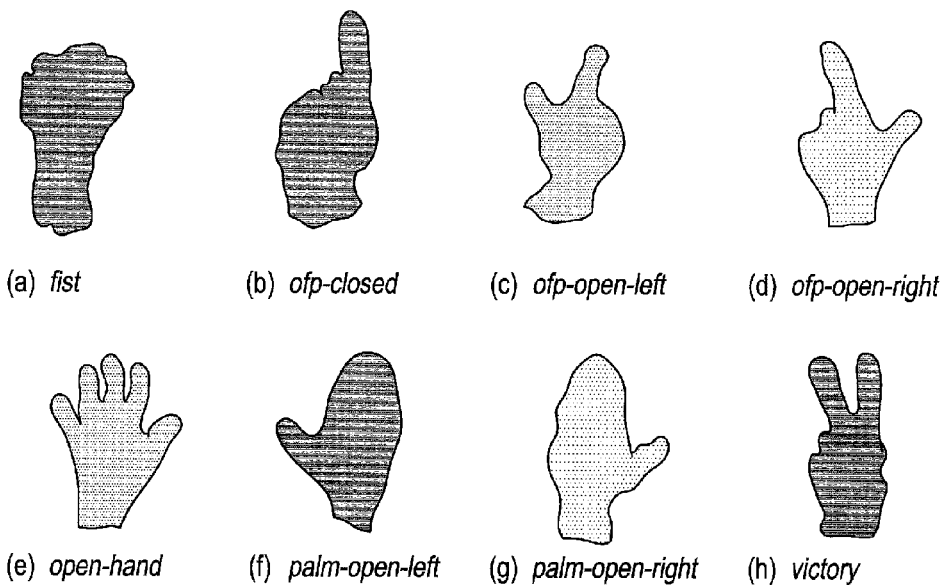
FIG. 4 depicts eight hand shapes used in hand tracking and shape recognition, under an embodiment.

FIG. 4 depicts eight hand shapes used in hand tracking and shape recognition, under an embodiment. Pose names that end in -left or -right are specific to that hand, while open and closed refer to whether the thumb is extended or tucked in to the palm. The acronym "ofp" represents "one finger point" and corresponds to the outstretched index finger.

The initial set of eight poses of an embodiment provides a range of useful interactions while maintaining relatively strong visual distinctiveness. For example, the combination of open-hand and first may be used to move a cursor and then grab or select an object. Similarly, the palm-open pose can be used to activate and expose more information (by "pushing" a graphical representation back in space) and then scrolling through the data with lateral hand motions.

Other sets of hand shapes are broader but also require much more accurate and complete information about the finger configuration. For example, the American Sign Language (ASL) finger-spelling alphabet includes a much richer set of hand poses that covers 26 letters plus the digits zero through nine. These hand shapes make use of subtle finger cues, however, which can be difficult to discern for both the user and especially for the vision system.

Figure 5:
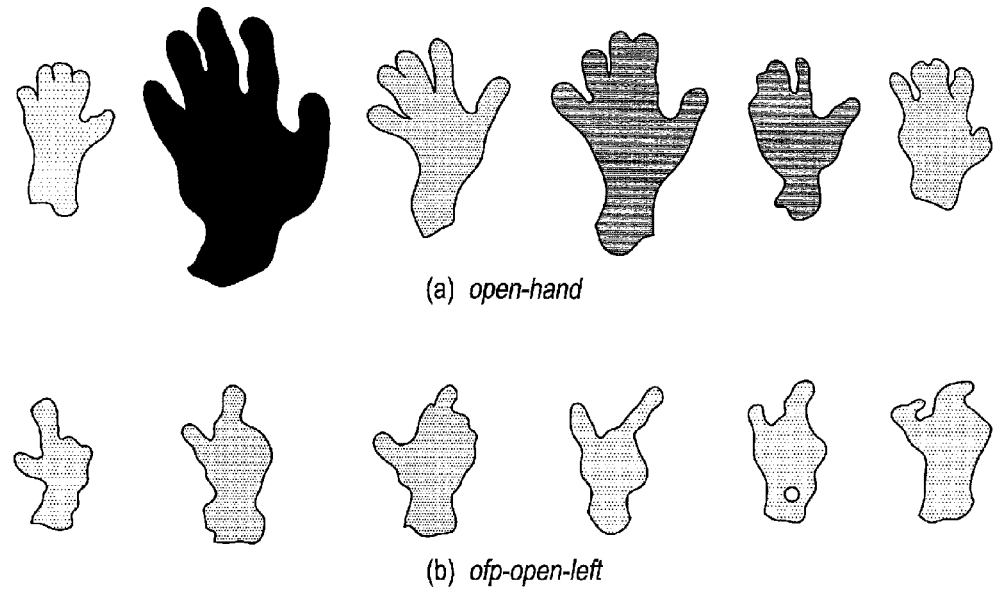
FIG. 5 shows sample images showing variation across users for the same hand shape category.

Despite the fact that the gesture set of an embodiment is configured to be visually distinct, a large range of variation was seen within each shape class. FIG. 5 shows sample images showing variation across users for the same hand shape category. Although a more accurate, higher-resolution depth sensor would reduce some of the intra-class differences, the primary causes are the intrinsic variations across people's hands and the perspective and occlusion effects caused by only using a single point of view. Physical hand variations were observed in overall size, finger width, ratio of finger length to palm size, joint ranges, flexibility, and finger control. For example, in the palm-open pose, some users would naturally extend their thumb so that it was nearly perpendicular to their palm and index finger, while other users expressed discomfort when trying to move their thumb beyond 45 degrees. Similarly, variation was seen during a single interaction as, for example, a user might start an palm-open gesture with their fingers tightly pressed together but then relax their fingers as the gesture proceeded, thus blurring the distinction between palm-open and open-hand.

The central contribution of embodiments herein is the design and implementation of a real-time vision interface that works reliably across different users despite wide variations in hand shape and mechanics. The approach of an embodiment is based on an efficient, skeleton-free hand detection and tracking algorithm that uses per-frame local extrema detection combined with fast hand shape classification, and a quantitative evaluation of the methods herein provide a hand shape recognition rate of more than 97% on previously unseen users.

Detection and tracking of embodiments herein are based on the idea that hands correspond to extrema in terms of geodesic distance from the center of a user's body mass. This assumption is violated when, for example, a user stands with arms akimbo, but such body poses preclude valid interactions with the interface, and so these low-level false negatives do not correspond to high-level false negatives. Since embodiments are to be robust to clutter without requiring a pre-specified bounding box to limit the processing volume, the approach of those embodiments avoids computing global geodesic distance and instead takes a simpler, local approach. Specifically, extrema candidates are found by directly detecting local, directional peaks in the depth image and then extract spatially connected components as potential hands.

The core detection and tracking of embodiments is performed for each depth frame after subsampling from the input resolution of 640×480 down to 80×60. Hand shape analysis, however, is performed at a higher resolution as described herein. The downsampled depth image is computed using a robust approach that ignores zero values, which correspond to missing depth data, and that preserves edges. Since the depth readings essentially represent mass in the scene, it is desirable to avoid averaging disparate depth values which would otherwise lead to "hallucinated" mass at an intermediate depth.

Local peaks are detected in the 80×60 depth image by searching for pixels that extend farther than their spatial neighbors in any of the four cardinal directions (up, down, left, and right). This heuristic provides a low false negative rate even at the expense of many false positives. In other words, embodiments do not want to miss a real hand, but may include multiple detections or other objects since they will be filtered out at a later stage.

Figure 7:
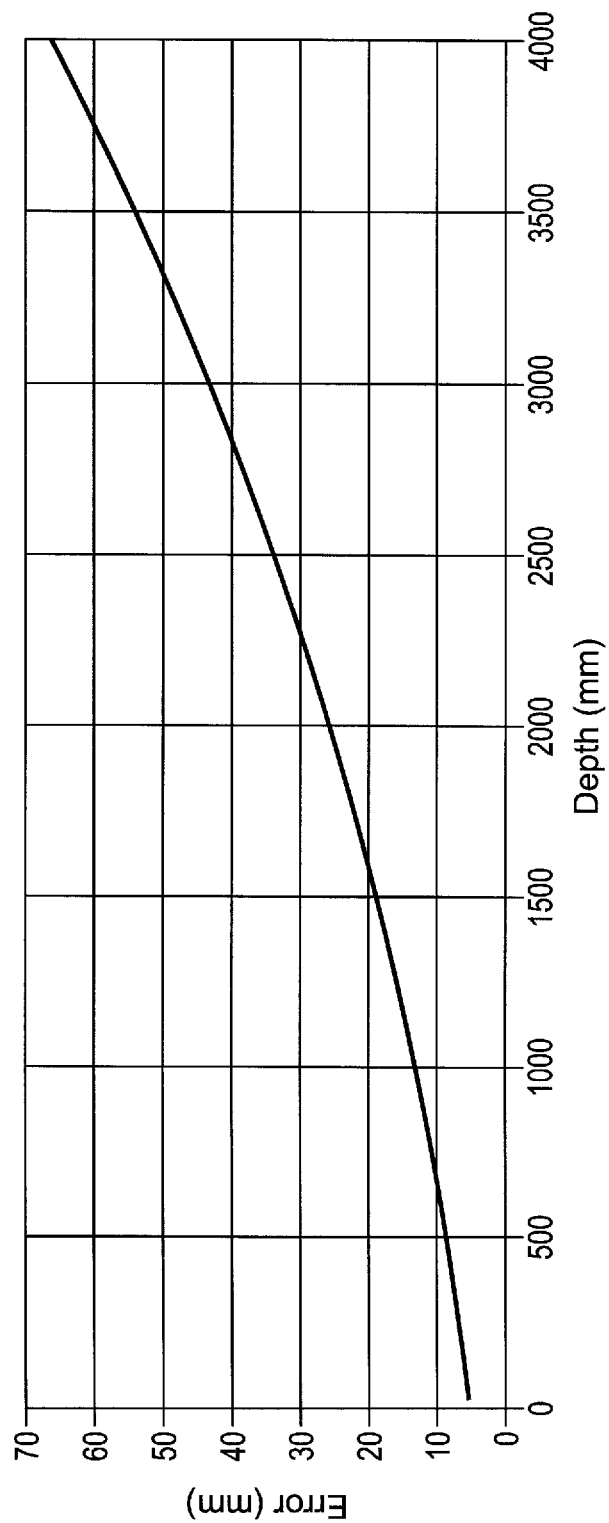
FIG. 7 shows a plot of the estimated minimum depth ambiguity as a function of depth based on the metric distance between adjacent raw sensor readings, under an embodiment.

Each peak pixel becomes the seed for a connected component ("blob") bounded by the maximum hand size, which is taken to be 300 mm plus a depth-dependent slack value that represents expected depth error. For the Microsoft Kinect, the depth error corresponds to the physical distance represented by two adjacent raw sensor readings (see FIG. 7 which shows a plot of the estimated minimum depth ambiguity as a function of depth based on the metric distance between adjacent raw sensor readings). In other words, the slack value accounts for the fact that searching for a depth difference of 10 mm at a distance of 2000 mm is not reasonable since the representational accuracy at that depth is only 25 mm.

The algorithm of an embodiment estimates a potential hand center for each blob by finding the pixel that is farthest from the blob's border, which can be computed efficiently using the distance transform. It then further prunes the blob using a palm radius of 200 mm with the goal of including hand pixels while excluding the forearm and other body parts. Finally, low-level processing concludes by searching the outer boundary for depth pixels that "extend" the blob, defined as those pixels adjacent to the blob that have a similar depth. The algorithm of an embodiment analyzes the extension pixels looking for a single region that is small relative to the boundary length, and it prunes blobs that have a very large or disconnected extension region. The extension region is assumed to correspond to the wrist in a valid hand blob and is used to estimate orientation in much the same way that Plagemann et al. use geodesic backtrack points (see, Plagemann et al.).

The blobs are then sent to the tracking module which associates blobs in the current frame with existing tracks. Each blob/track pair is scored according to the minimum distance between the blob's centroid and the track's trajectory bounded by its current velocity. In addition, there may be overlapping blobs due to low-level ambiguity, and so the tracking module enforces the implied mutual exclusion. The blobs are associated with tracks in a globally optimal way by minimizing the total score across all of the matches. A score threshold of 250 mm is used to prevent extremely poor matches, and thus some blobs and/or tracks may go unmatched.

After the main track extension, the remaining unmatched blobs are compared to the tracks and added as secondary blobs if they are in close spatial proximity. In this way, multiple blobs can be associated with a single track, since a single hand may occasionally be observed as several separate components. A scenario that leads to disjoint observations is when a user is wearing a large, shiny ring that foils the Kinect's analysis of the projected structured light. In these cases, the finger with the ring may be visually separated from the hand since there will be no depth data covering the ring itself. Since the absence of a finger can completely change the interpretation of a hand's shape, it becomes vitally important to associate the finger blob with the track.

The tracking module then uses any remaining blobs to seed new tracks and to prune old tracks that go several frames without any visual evidence of the corresponding object.

Regarding hand shape recognition, the 80×60 depth image used for blob extraction and tracking provides in some cases insufficient information for shape analysis. Instead, hand pose recognition makes use of the 320×240 depth image, a Quarter Video Graphics Array (QVGA) display resolution. The QVGA mode describes the size or resolution of the image in pixels. An embodiment makes a determination as to which QVGA pixels correspond to each track. These pixels are identified by seeding a connected component search at each QVGA pixel within a small depth distance from its corresponding 80×60 pixel. The algorithm of an embodiment also re-estimates the hand center using the QVGA pixels to provide a more sensitive 3D position estimate for cursor control and other continuous, position-based interactions.

An embodiment uses randomized decision forests (see, Breiman) to classify each blob as one of the eight modeled hand shapes. Each forest is an ensemble of decision trees and the final classification (or distribution over classes) is computed by merging the results across all of the trees. A single decision tree can easily overfit its training data so the trees are randomized to increase variance and reduce the composite error. Randomization takes two forms: (1) each tree is learned on a bootstrap sample from the full training data set, and (2) the nodes in the trees optimize over a small, randomly selected number of features. Randomized decision forests have several appealing properties useful for real-time hand shape classification: they are extremely fast at runtime, they automatically perform feature selection, they intrinsically support multi-class classification, and they can be easily parallelized.

Methods of an embodiment make use of three different kinds of image features to characterize segmented hand patches. Set A includes global image statistics such as the percentage of pixels covered by the blob contour, the number of fingertips detected, the mean angle from the blob's centroid to the fingertips, and the mean angle of the fingertips themselves. It also includes all seven independent Flusser-Suk moments (e.g., J. Flusser and T. Suk. Rotation moment invariants for recognition of symmetric objects. IEEE Transactions on Image Processing, 15:3784-3790, 2006 ("Flusser et al.")).

Fingertips are detected from each blob's contour by searching for regions of high positive curvature. Curvature is estimated by looking at the angle between the vectors formed by a contour point $C_i$ and its k-neighbors $C_{i-k}$ and $C_{i+k}$ sampled with appropriate wrap-around. The algorithm of an embodiment uses high curvature at two scales and modulates the value of k depending on the depth of the blob so that k is roughly 30 mm for the first scale and approximately 50 mm from the query point for the second scale.

Feature Set B is made up of the number of pixels covered by every possible rectangle within the blob's bounding box normalized by its total size. To ensure scale-invariance, each blob image is subsampled down to a 5×5 grid meaning that there are 225 rectangles and thus 225 descriptors in Set B (see FIG. 8 which illustrates features extracted for (a) Set B showing four rectangles and (b) Set C showing the difference in mean depth between one pair of grid cells).

Feature Set C uses the same grid as Set B but instead of looking at coverage within different rectangles, it comprises the difference between the mean depth for each pair of individual cells. Since there are 25 cells on a 5×5 grid, there are 300 descriptors in Set C. Feature Set D combines all of the features from sets A, B, and C leading to 536 total features.

As described herein, the blob extraction algorithm attempts to estimate each blob's wrist location by search for extension pixels. If such a region is found, it is used to estimate orientation based on the vector connecting the center of the extension region to the centroid of the blob. By rotating the QVGA image patch by the inverse of this angle, many blobs can be transformed to have a canonical orientation before any descriptors are computed. This process improves classification accuracy by providing a level of rotation invariance. Orientation cannot be estimated for all blobs, however. For example if the arm is pointed directly at the camera then the blob will not have any extension pixels. In these cases, descriptors are computed on the untransformed blob image.

Figure 6A:
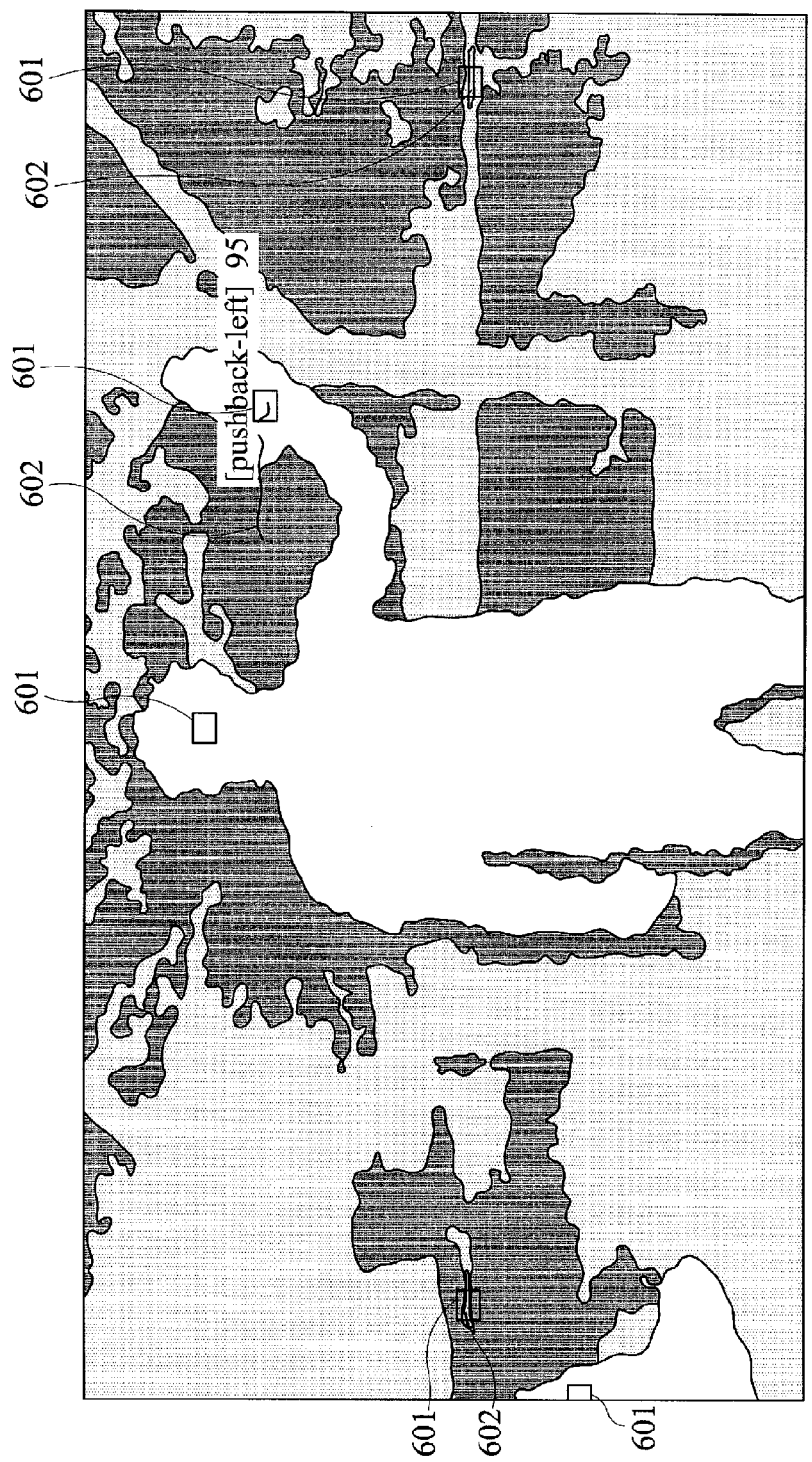
FIGS. 6A, 6B, and 6C (collectively FIG. 6) show sample frames showing pseudo-color depth images along with tracking results, track history, and recognition results along with a confidence value, under an embodiment.
Figure 6B:
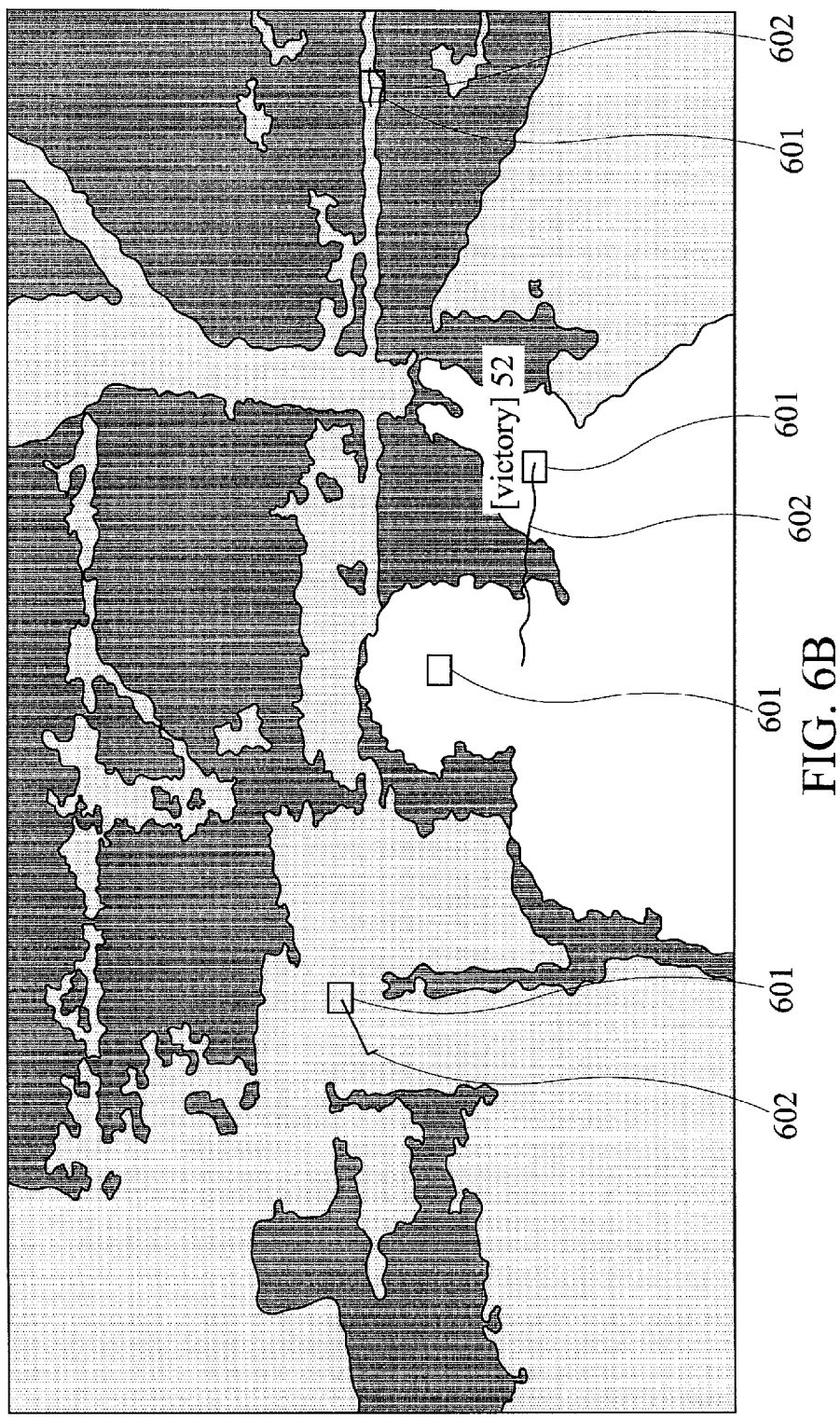
Figure 6C:
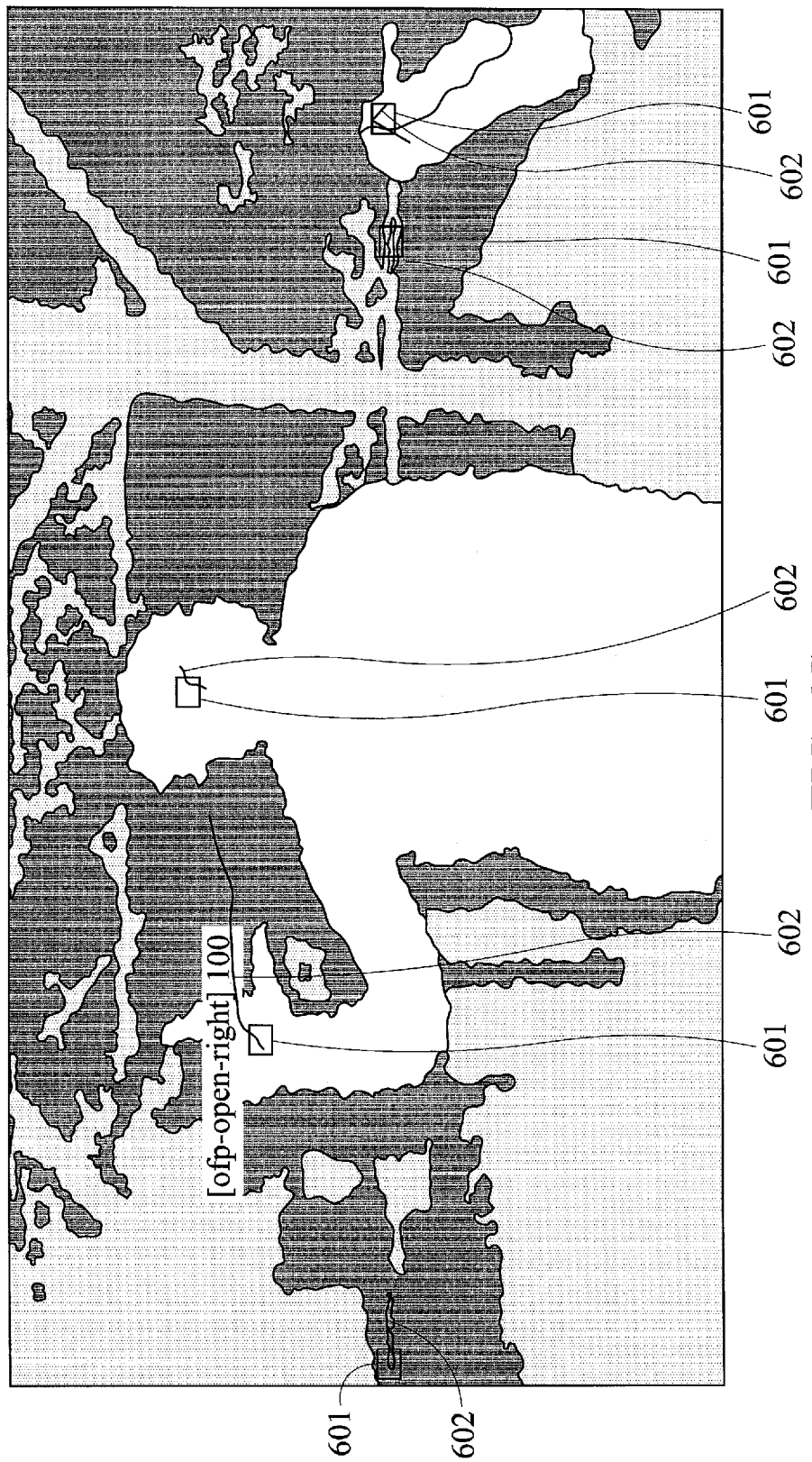

To evaluate the embodiments herein for real-time hand tracking and shape recognition, sample videos were recorded from 16 subjects (FIGS. 6A, 6B, and 6C (collectively FIG. 6) show three sample frames showing pseudo-color depth images along with tracking results 601, track history 602, and recognition results (text labels) along with a confidence value). The videos were captured at a resolution of 640×480 at 30 Hz using a Microsoft Kinect, which estimates per-pixel depth using an approach based on structured light. Each subject contributed eight video segments corresponding to the eight hand shapes depicted in FIG. 4. The segmentation and tracking algorithm described herein ran on these videos with a modified post-process that saved the closest QVGA blob images to disk. Thus the training examples were automatically extracted from the videos using the same algorithm used in the online version. The only manual intervention was the removal of a small number of tracking errors that would otherwise contaminate the training set. For example, at the beginning of a few videos the system saved blobs corresponding to the user's head before locking on to their hand.

Some of the hand poses are specific to either the left or right hand (e.g., palm-open-left) whereas others are very similar for both hands (e.g., victory). Poses in the second set were included in the training data twice, once without any transformation and once after reflection around the vertical axis. Through qualitative experiments with the live, interactive system, it was found that the inclusion of the reflected examples led to a noticeable improvement in recognition performance.

The 16 subjects included four females and 12 males ranging from 25 to 40 years old and between 160 and 188 cm tall. Including the reflected versions, each person contributed between 1,898 and 9,625 examples across the eight hand poses leading to a total of 93,336 labeled examples. The initial evaluation used standard cross-validation to estimate generalization performance. Extremely low error rates were found, but the implied performance did not reliably predict the experience of new users with the live system who saw relatively poor classification rates.

An interpretation is that cross-validation was over-estimating performance because the random partitions included examples from each user in both the training and test sets. Since the training examples were extracted from videos, there is a high degree of temporal correlation and thus the test partitions were not indicative of generalization performance. In order to run more meaningful experiments with valid estimates of cross-user error, a switch was made to instead use a leave-one-user-out approach. Under this evaluation scheme, each combination of a model and feature set was trained on data from 15 subjects and evaluated the resulting classifier on the unseen 16th subject. This process was repeated 16 times with each iteration using data from a different subject as the test set.

Figure 9:
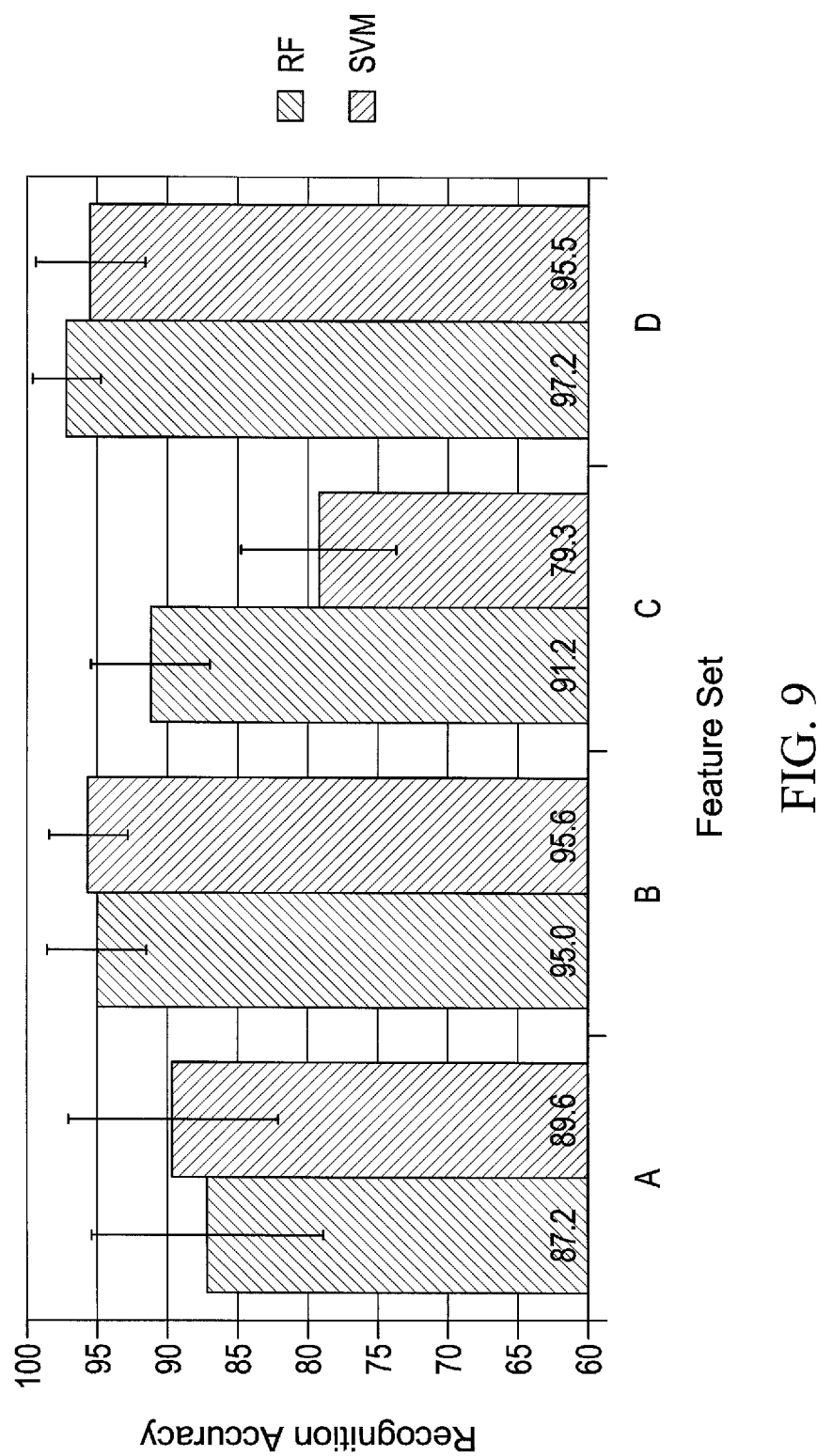
FIG. 9 is a plot of a comparison of hand shape recognition accuracy for randomized decision forest (RF) and support vector machine (SVM) classifiers over four feature sets, under an embodiment.

FIG. 9 plots a comparison of hand shape recognition accuracy for randomized decision forest (RF) and support vector machine (SVM) classifiers over four feature sets, where feature set A uses global statistics, feature set B uses normalized occupancy rates in different rectangles, feature set C uses depth differences between points, and feature set D combines sets A, B, and C. FIG. 9 therefore presents the average recognition rate for both the randomized decision forest (RF) and support vector machine (SVM) models. The SVM was trained with LIBSVM (e.g., C. C. Chang and C. J. Lin. LIBSVM: A library for support vector machines. ACM Transactions on Intelligent Systems and Technology, 2:27:1-27:27, 2011 ("Chang et al.")) and used a radial basis function kernel with parameters selected to maximize accuracy based on the results of a small search over a subset of the data. Both the RF and SVM were tested with the four feature sets described herein.

The best results were achieved with the RF model using Feature Set D (RF-D). This combination led to a mean cross-user accuracy rate of 97.2% with standard deviation of 2.42. The worst performance for any subject under RF-D was 92.8%, while six subjects saw greater than 99% accuracy rates. For comparison, the best performance using an SVM was with Feature Set B, which gave a mean accuracy rate of 95.6%, standard deviation of 2.73, and worst case of 89.0%.

Figure 10:
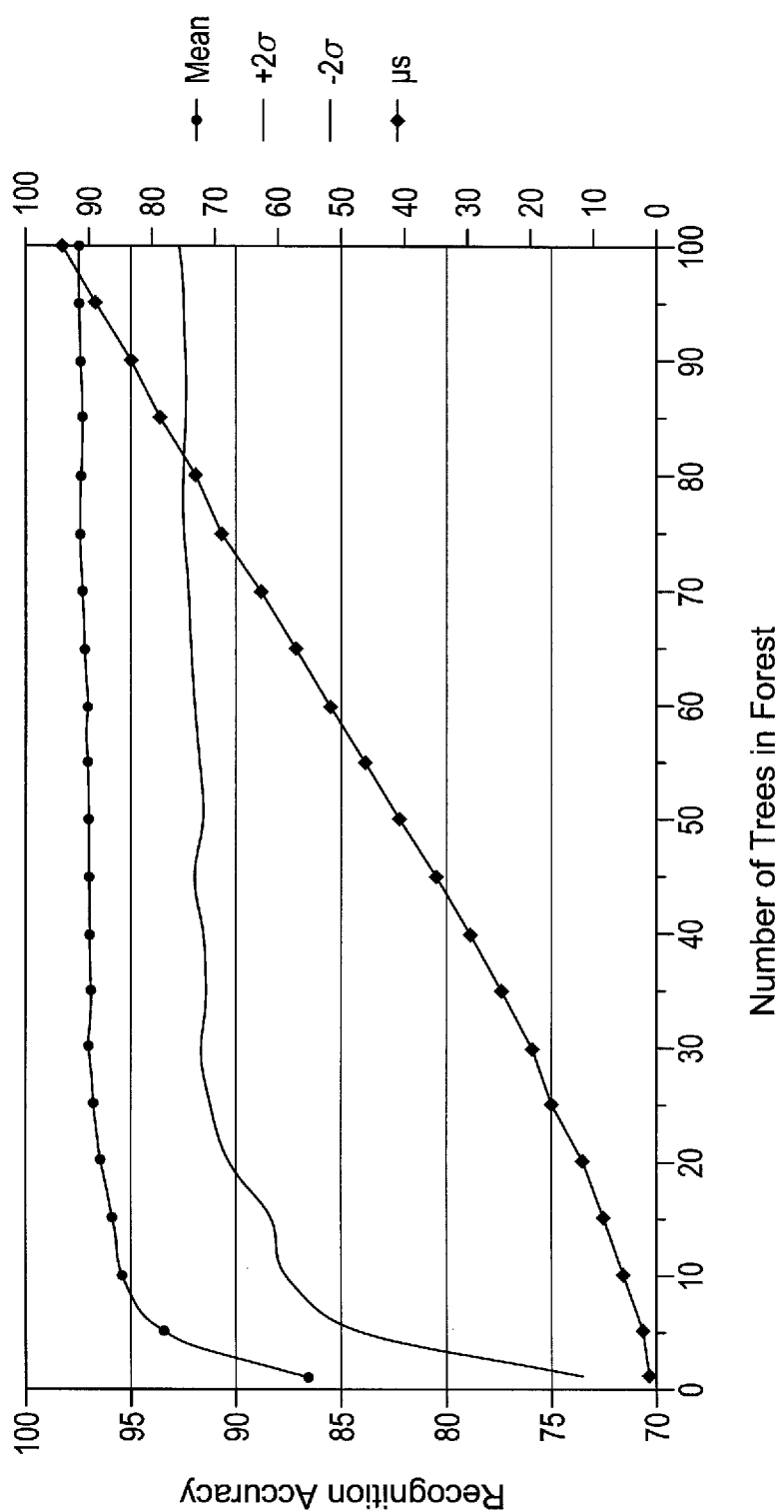
FIG. 10 is a plot of a comparison of hand shape recognition accuracy using different numbers of trees in the randomized decision forest, under an embodiment.

The RF results presented in FIG. 9 are based on forests with 100 trees. Each tree was learned with a maximum depth of 30 and no pruning. At each split node, the number of random features selected was set to the square root of the total number of descriptors. The ensemble classifier evaluates input data by merging the results across all of the random trees, and thus runtime is proportional to the number of trees. In a real-time system, especially when latency matters, a natural question is how classification accuracy changes as the number of trees in the forest is reduced. FIG. 10 presents a comparison of hand shape recognition accuracy using different numbers of trees in the randomized decision forest. The graph shows mean accuracy and ±2σ lines depicting an approximate 95% confidence interval (blue circles, left axis) along with the mean time to classify a single example (green diamonds, right axis).

FIG. 10 shows that for the hand shape classification problem, recognition accuracy is stable down to 30 trees where it only drops from 97.2% to 96.9%. Even with 20 trees, mean cross-user accuracy is only reduced to 96.4%, although below this point, performance begins to drop more dramatically. On the test machine used, an average classification speed seen was 93.3 μs per example with 100 trees but only 20.1 μs with 30 trees.

Although higher accuracy rates might be desirable, the interpretation of informal reports and observation of users working with the interactive system of an embodiment is that the current accuracy rate of 97.2% is sufficient for a positive user experience. An error rate of nearly 3% means that, on average, the system of an embodiment can misclassify the user's pose roughly once every 30 frames, though such a uniform distribution is not expected in practice since the errors are unlikely to be independent. It is thought that the errors will clump but also that many of them will be masked during real use due to several important factors. First, the live system can use temporal consistency to avoid random, short-duration errors. Second, cooperative users will adapt to the system if there is sufficient feedback and if only minor behavioral changes are needed. And third, the user interface can be configured to minimize the impact of easily confused hand poses.

A good example of adapting the interface arises with the pushback interaction based on the palm-open pose. A typical use of this interaction allows users to view more of their workspace by pushing the graphical representation farther back into the screen. Users may also be able to pan to different areas of the workspace or scroll through different object (e.g., movies, images, or merchandise). Scrolling leads to relatively long interactions and so users often relax their fingers so that palm-open begins to look like open-hand even though their intent did not changed. An embodiment implemented a simple perception tweak that prevents open-hand from disrupting the pushback interaction, even if open-hand leads to a distinct interaction in other situations. Essentially, both poses are allowed to continue the interaction even though only palm-open can initiate it. Furthermore, classification confidence is pooled between the two poses to account for the transitional poses between them.

Experimentation was also performed with physical changes to the interface and workspace. For example, a noticeable improvement was seen in user experience when the depth camera was mounted below the primary screen rather than above it. This difference likely stems from a tendency of users to relax and lower their hands rather than raise them due to basic body mechanics and gravity. With a bottom-mounted camera, a slightly angled or lowered hand provides a better view of the hand shape, whereas the view from a top-mounted camera will degrade. Similarly, advantage can be taken of users' natural tendency to stand farther from larger screens. Since the Kinect and many other depth cameras have a minimum sensing distance in the 30-80 cm range, users can be encouraged to maintain a functional distance with as few explicit reminders and warning messages as possible. The interface of an embodiment does provide a visual indication when an interaction approaches the near sensing plane or the edge of the camera's field of view, but implicit, natural cues like screen size are much preferred.

Spatial Operating Environment (SOE)

Figure 11:
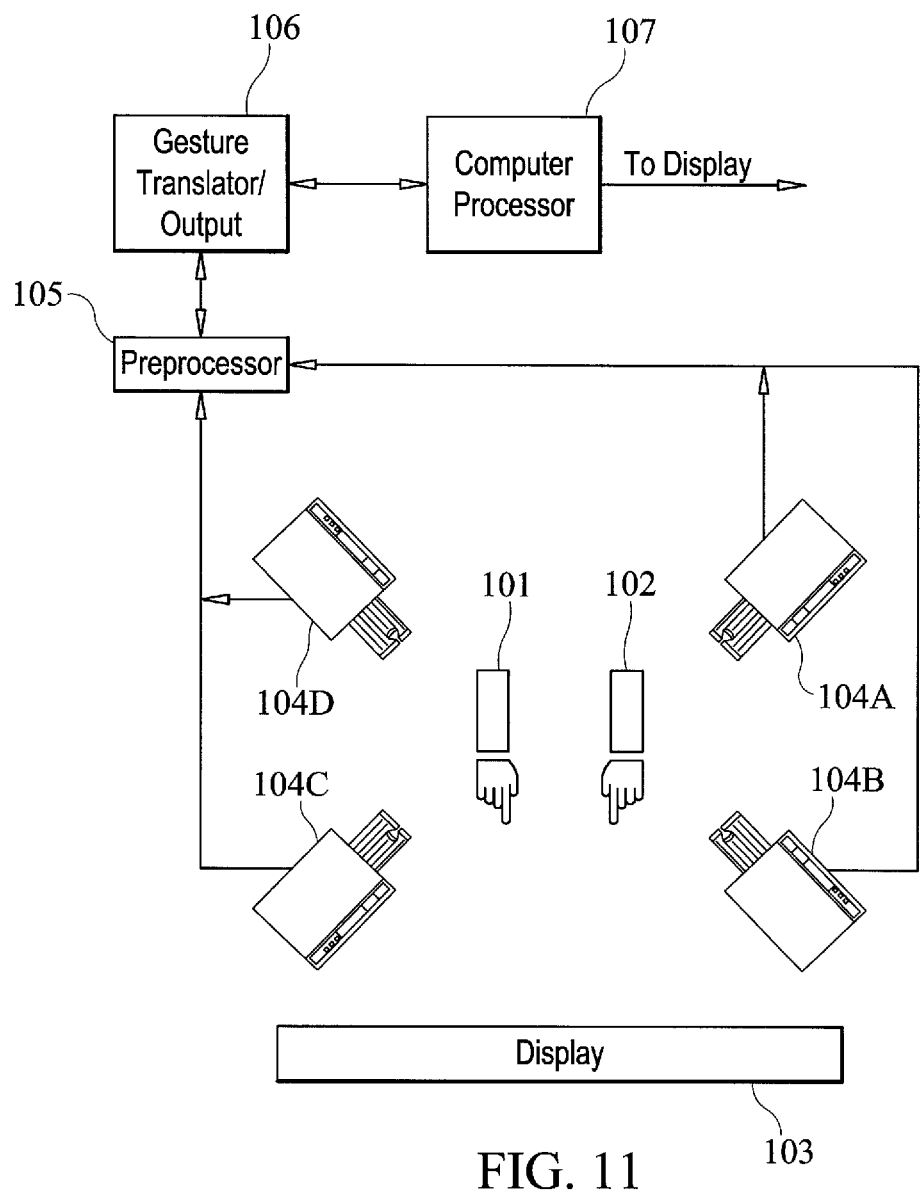
FIG. 11 is a block diagram of a gestural control system, under an embodiment.

Embodiments of a spatial-continuum input system are described herein in the context of a Spatial Operating Environment (SOE). As an example, FIG. 11 is a block diagram of a Spatial Operating Environment (SOE), under an embodiment. A user locates a hand 101 (or hands 101 and 102) in the viewing area 150 of an array of cameras (e.g., one or more cameras or sensors 104A-104D). The cameras detect location, orientation, and movement of the fingers and hands 101 and 102, as spatial tracking data, and generate output signals to pre-processor 105. Pre-processor 105 translates the camera output into a gesture signal that is provided to the computer processing unit 107 of the system. The computer 107 uses the input information to generate a command to control one or more on screen cursors and provides video output to display 103. The systems and methods described in detail above for initializing real-time, vision-based hand tracking systems can be used in the SOE and in analogous systems, for example.

Although the system is shown with a single user's hands as input, the SOE 100 may be implemented using multiple users. In addition, instead of or in addition to hands, the system may track any part or parts of a user's body, including head, feet, legs, arms, elbows, knees, and the like.

While the SOE includes the vision-based interface performing hand or object tracking and shape recognition described herein, alternative embodiments use sensors comprising some number of cameras or sensors to detect the location, orientation, and movement of the user's hands in a local environment. In the example embodiment shown, one or more cameras or sensors are used to detect the location, orientation, and movement of the user's hands 101 and 102 in the viewing area 150. It should be understood that the SOE 100 may include more (e.g., six cameras, eight cameras, etc.) or fewer (e.g., two cameras) cameras or sensors without departing from the scope or spirit of the SOE. In addition, although the cameras or sensors are disposed symmetrically in the example embodiment, there is no requirement of such symmetry in the SOE 100. Any number or positioning of cameras or sensors that permits the location, orientation, and movement of the user's hands may be used in the SOE 100.

In one embodiment, the cameras used are motion capture cameras capable of capturing grey-scale images. In one embodiment, the cameras used are those manufactured by Vicon, such as the Vicon MX40 camera. This camera includes on-camera processing and is capable of image capture at 1000 frames per second. A motion capture camera is capable of detecting and locating markers.

In the embodiment described, the cameras are sensors used for optical detection. In other embodiments, the cameras or other detectors may be used for electromagnetic, magneto-static, RFID, or any other suitable type of detection.

Pre-processor 105 generates three dimensional space point reconstruction and skeletal point labeling. The gesture translator 106 converts the 3D spatial information and marker motion information into a command language that can be interpreted by a computer processor to update the location, shape, and action of a cursor on a display. In an alternate embodiment of the SOE 100, the pre-processor 105 and gesture translator 106 are integrated or combined into a single device.

Computer 107 may be any general purpose computer such as manufactured by Apple, Dell, or any other suitable manufacturer. The computer 107 runs applications and provides display output. Cursor information that would otherwise come from a mouse or other prior art input device now comes from the gesture system.

Marker Tags

While the embodiments described herein include markerless vision-based tracking systems, the SOE of an alternative embodiment contemplates the use of marker tags on one or more fingers of the user so that the system can locate the hands of the user, identify whether it is viewing a left or right hand, and which fingers are visible. This permits the system to detect the location, orientation, and movement of the user's hands. This information allows a number of gestures to be recognized by the system and used as commands by the user.

The marker tags in one embodiment are physical tags comprising a substrate (appropriate in the present embodiment for affixing to various locations on a human hand) and discrete markers arranged on the substrate's surface in unique identifying patterns.

The markers and the associated external sensing system may operate in any domain (optical, electromagnetic, magnetostatic, etc.) that allows the accurate, precise, and rapid and continuous acquisition of their three-space position. The markers themselves may operate either actively (e.g. by emitting structured electromagnetic pulses) or passively (e.g. by being optically retroreflective, as in the present embodiment).

At each frame of acquisition, the detection system receives the aggregate 'cloud' of recovered three-space locations comprising all markers from tags presently in the instrumented workspace volume (within the visible range of the cameras or other detectors). The markers on each tag are of sufficient multiplicity and are arranged in unique patterns such that the detection system can perform the following tasks: (1) segmentation, in which each recovered marker position is assigned to one and only one subcollection of points that form a single tag; (2) labeling, in which each segmented subcollection of points is identified as a particular tag; (3) location, in which the three-space position of the identified tag is recovered; and (4) orientation, in which the three-space orientation of the identified tag is recovered. Tasks (1) and (2) are made possible through the specific nature of the marker-patterns, as described below and as illustrated in one embodiment in FIG. 12.

The markers on the tags in one embodiment are affixed at a subset of regular grid locations. This underlying grid may, as in the present embodiment, be of the traditional Cartesian sort; or may instead be some other regular plane tessellation (a triangular/hexagonal tiling arrangement, for example). The scale and spacing of the grid is established with respect to the known spatial resolution of the marker-sensing system, so that adjacent grid locations are not likely to be confused. Selection of marker patterns for all tags should satisfy the following constraint: no tag's pattern shall coincide with that of any other tag's pattern through any combination of rotation, translation, or mirroring. The multiplicity and arrangement of markers may further be chosen so that loss (or occlusion) of some specified number of component markers is tolerated: After any arbitrary transformation, it should still be unlikely to confuse the compromised module with any other.

Figure 12:
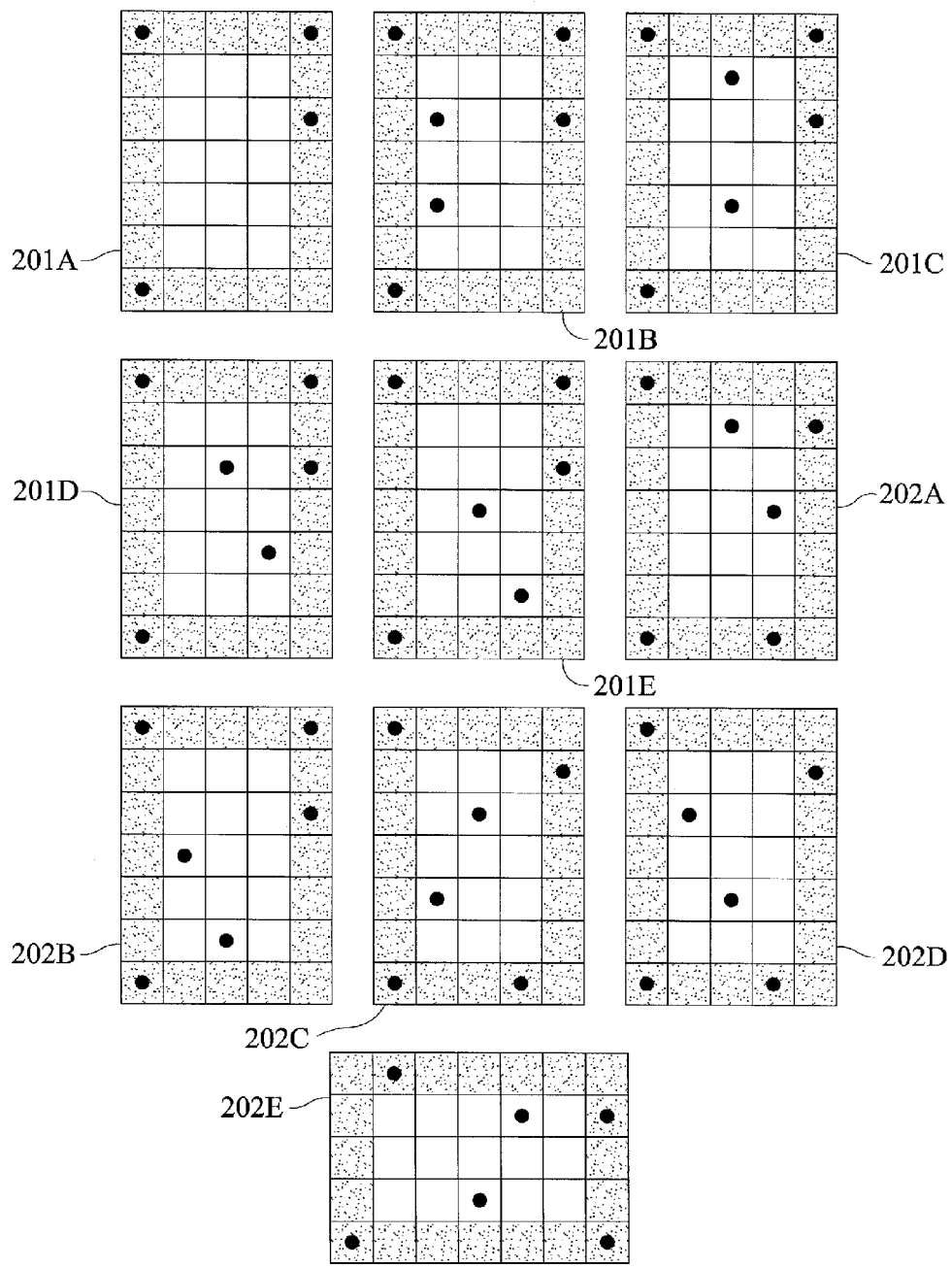
FIG. 12 is a diagram of marking tags, under an embodiment.

Referring now to FIG. 12, a number of tags 201A-201E (left hand) and 202A-202E (right hand) are shown. Each tag is rectangular and consists in this embodiment of a 5×7 grid array. The rectangular shape is chosen as an aid in determining orientation of the tag and to reduce the likelihood of mirror duplicates. In the embodiment shown, there are tags for each finger on each hand. In some embodiments, it may be adequate to use one, two, three, or four tags per hand. Each tag has a border of a different grey-scale or color shade. Within this border is a 3×5 grid array. Markers (represented by the black dots of FIG. 12) are disposed at certain points in the grid array to provide information.

Qualifying information may be encoded in the tags' marker patterns through segmentation of each pattern into 'common' and 'unique' subpatterns. For example, the present embodiment specifies two possible 'border patterns', distributions of markers about a rectangular boundary. A 'family' of tags is thus established—the tags intended for the left hand might thus all use the same border pattern as shown in tags 201A-201E while those attached to the right hand's fingers could be assigned a different pattern as shown in tags 202A-202E. This subpattern is chosen so that in all orientations of the tags, the left pattern can be distinguished from the right pattern. In the example illustrated, the left hand pattern includes a marker in each corner and on marker in a second from corner grid location. The right hand pattern has markers in only two corners and two markers in non corner grid locations. An inspection of the pattern reveals that as long as any three of the four markers are visible, the left hand pattern can be positively distinguished from the left hand pattern. In one embodiment, the color or shade of the border can also be used as an indicator of handedness.

Each tag must of course still employ a unique interior pattern, the markers distributed within its family's common border. In the embodiment shown, it has been found that two markers in the interior grid array are sufficient to uniquely identify each of the ten fingers with no duplication due to rotation or orientation of the fingers. Even if one of the markers is occluded, the combination of the pattern and the handedness of the tag yields a unique identifier.

In the present embodiment, the grid locations are visually present on the rigid substrate as an aid to the (manual) task of affixing each retroreflective marker at its intended location. These grids and the intended marker locations are literally printed via color inkjet printer onto the substrate, which here is a sheet of (initially) flexible 'shrink-film'. Each module is cut from the sheet and then oven-baked, during which thermal treatment each module undergoes a precise and repeatable shrinkage. For a brief interval following this procedure, the cooling tag may be shaped slightly—to follow the longitudinal curve of a finger, for example; thereafter, the substrate is suitably rigid, and markers may be affixed at the indicated grid points.

In one embodiment, the markers themselves are three dimensional, such as small reflective spheres affixed to the substrate via adhesive or some other appropriate means. The three-dimensionality of the markers can be an aid in detection and location over two dimensional markers. However either can be used without departing from the spirit and scope of the SOE described herein.

At present, tags are affixed via Velcro or other appropriate means to a glove worn by the operator or are alternately affixed directly to the operator's fingers using a mild double-stick tape. In a third embodiment, it is possible to dispense altogether with the rigid substrate and affix—or 'paint'—individual markers directly onto the operator's fingers and hands.

Gesture Vocabulary

The SOE of an embodiment contemplates a gesture vocabulary comprising hand poses, orientation, hand combinations, and orientation blends. A notation language is also implemented for designing and communicating poses and gestures in the gesture vocabulary of the SOE. The gesture vocabulary is a system for representing instantaneous 'pose states' of kinematic linkages in compact textual form. The linkages in question may be biological (a human hand, for example; or an entire human body; or a grasshopper leg; or the articulated spine of a lemur) or may instead be nonbiological (e.g. a robotic arm). In any case, the linkage may be simple (the spine) or branching (the hand). The gesture vocabulary system of the SOE establishes for any specific linkage a constant length string; the aggregate of the specific ASCII characters occupying the string's 'character locations' is then a unique description of the instantaneous state, or 'pose', of the linkage.

Hand Poses

FIG. 13 illustrates hand poses in an embodiment of a gesture vocabulary of the SOE, under an embodiment. The SOE supposes that each of the five fingers on a hand is used. These fingers are codes as p-pinkie, r-ring finger, m-middle finger, i-index finger, and t-thumb. A number of poses for the fingers and thumbs are defined and illustrated in FIG. 13. A gesture vocabulary string establishes a single character position for each expressible degree of freedom in the linkage (in this case, a finger). Further, each such degree of freedom is understood to be discretized (or 'quantized'), so that its full range of motion can be expressed through assignment of one of a finite number of standard ASCII characters at that string position. These degrees of freedom are expressed with respect to a body-specific origin and coordinate system (the back of the hand, the center of the grasshopper's body; the base of the robotic arm; etc.). A small number of additional gesture vocabulary character positions are therefore used to express the position and orientation of the linkage 'as a whole' in the more global coordinate system.

With continuing reference to FIG. 13, a number of poses are defined and identified using ASCII characters. Some of the poses are divided between thumb and non-thumb. The SOE in this embodiment uses a coding such that the ASCII character itself is suggestive of the pose. However, any character may used to represent a pose, whether suggestive or not. In addition, there is no requirement in the embodiments to use ASCII characters for the notation strings. Any suitable symbol, numeral, or other representation maybe used without departing from the scope and spirit of the embodiments. For example, the notation may use two bits per finger if desired or some other number of bits as desired.

A curled finger is represented by the character "^" while a curled thumb by ">". A straight finger or thumb pointing up is indicated by "1" and at an angle by "\" or "/". "-" represents a thumb pointing straight sideways and "x" represents a thumb pointing into the plane.

Using these individual finger and thumb descriptions, a robust number of hand poses can be defined and written using the scheme of the embodiments. Each pose is represented by five characters with the order being p-r-m-i-t as described above. FIG. 13 illustrates a number of poses and a few are described here by way of illustration and example. The hand held flat and parallel to the ground is represented by "11111". A first is represented by "^^^^>". An "OK" sign is represented by "111^>".

The character strings provide the opportunity for straight-forward 'human readability' when using suggestive characters. The set of possible characters that describe each degree of freedom may generally be chosen with an eye to quick recognition and evident analogy. For example, a vertical bar ('|') would likely mean that a linkage element is 'straight', an ell ('L') might mean a ninety-degree bend, and a circumflex ('^') could indicate a sharp bend. As noted above, any characters or coding may be used as desired.

Any system employing gesture vocabulary strings such as described herein enjoys the benefit of the high computational efficiency of string comparison—identification of or search for any specified pose literally becomes a 'string compare' (e.g. UNIX's 'strcmp( )' function) between the desired pose string and the instantaneous actual string. Furthermore, the use of 'wildcard characters' provides the programmer or system designer with additional familiar efficiency and efficacy: degrees of freedom whose instantaneous state is irrelevant for a match may be specified as an interrogation point ('?'); additional wildcard meanings may be assigned.

Orientation

In addition to the pose of the fingers and thumb, the orientation of the hand can represent information. Characters describing global-space orientations can also be chosen transparently: the characters '<', '>', '^', and 'v' may be used to indicate, when encountered in an orientation character position, the ideas of left, right, up, and down. FIG. 14 illustrates hand orientation descriptors and examples of coding that combines pose and orientation. In an embodiment, two character positions specify first the direction of the palm and then the direction of the fingers (if they were straight, irrespective of the fingers' actual bends). The possible characters for these two positions express a 'body-centric' notion of orientation: '-', '+', 'x', '*', '^', and 'v' describe medial, lateral, anterior (forward, away from body), posterior (backward, away from body), cranial (upward), and caudal (downward).

In the notation scheme of an embodiment, the five finger pose indicating characters are followed by a colon and then two orientation characters to define a complete command pose. In one embodiment, a start position is referred to as an "xyz" pose where the thumb is pointing straight up, the index finger is pointing forward and the middle finger is perpendicular to the index finger, pointing to the left when the pose is made with the right hand. This is represented by the string "^^x1-:-x".

'XYZ-hand' is a technique for exploiting the geometry of the human hand to allow full six-degree-of-freedom navigation of visually presented three-dimensional structure. Although the technique depends only on the bulk translation and rotation of the operator's hand—so that its fingers may in principal be held in any pose desired—the present embodiment prefers a static configuration in which the index finger points away from the body; the thumb points toward the ceiling; and the middle finger points left-right. The three fingers thus describe (roughly, but with clearly evident intent) the three mutually orthogonal axes of a three-space coordinate system: thus 'XYZ-hand'.

XYZ-hand navigation then proceeds with the hand, fingers in a pose as described above, held before the operator's body at a predetermined 'neutral location'. Access to the three translational and three rotational degrees of freedom of a three-space object (or camera) is effected in the following natural way: left-right movement of the hand (with respect to the body's natural coordinate system) results in movement along the computational context's x-axis; up-down movement of the hand results in movement along the controlled context's y-axis; and forward-back hand movement (toward/away from the operator's body) results in z-axis motion within the context. Similarly, rotation of the operator's hand about the index finger leads to a 'roll' change of the computational context's orientation; 'pitch' and 'yaw' changes are effected analogously, through rotation of the operator's hand about the middle finger and thumb, respectively.

Note that while 'computational context' is used here to refer to the entity being controlled by the XYZ-hand method—and seems to suggest either a synthetic three-space object or camera—it should be understood that the technique is equally useful for controlling the various degrees of freedom of real-world objects: the pan/tilt/roll controls of a video or motion picture camera equipped with appropriate rotational actuators, for example. Further, the physical degrees of freedom afforded by the XYZ-hand posture may be somewhat less literally mapped even in a virtual domain: In the present embodiment, the XYZ-hand is also used to provide navigational access to large panoramic display images, so that left-right and up-down motions of the operator's hand lead to the expected left-right or up-down 'panning' about the image, but forward-back motion of the operator's hand maps to 'zooming' control.

In every case, coupling between the motion of the hand and the induced computational translation/rotation may be either direct (i.e. a positional or rotational offset of the operator's hand maps one-to-one, via some linear or nonlinear function, to a positional or rotational offset of the object or camera in the computational context) or indirect (i.e. positional or rotational offset of the operator's hand maps one-to-one, via some linear or nonlinear function, to a first or higher-degree derivative of position/orientation in the computational context; ongoing integration then effects a non-static change in the computational context's actual zero-order position/orientation). This latter means of control is analogous to use of a an automobile's 'gas pedal', in which a constant offset of the pedal leads, more or less, to a constant vehicle speed.

The 'neutral location' that serves as the real-world XYZ-hand's local six-degree-of-freedom coordinate origin may be established (1) as an absolute position and orientation in space (relative, say, to the enclosing room); (2) as a fixed position and orientation relative to the operator herself (e.g. eight inches in front of the body, ten inches below the chin, and laterally in line with the shoulder plane), irrespective of the overall position and 'heading' of the operator; or (3) interactively, through deliberate secondary action of the operator (using, for example, a gestural command enacted by the operator's 'other' hand, said command indicating that the XYZ-hand's present position and orientation should henceforth be used as the translational and rotational origin).

It is further convenient to provide a 'detent' region (or 'dead zone') about the XYZ-hand's neutral location, such that movements within this volume do not map to movements in the controlled context.

Other poses may included:

[||||:vx] is a flat hand (thumb parallel to fingers) with palm facing down and fingers forward.

[||||:x^] is a flat hand with palm facing forward and fingers toward ceiling.

[||||:-x] is a flat hand with palm facing toward the center of the body (right if left hand, left if right hand) and fingers forward.

[^^^-:-x] is a single-hand thumbs-up (with thumb pointing toward ceiling).

[^^|-:-x] is a mime gun pointing forward.

Two Hand Combination

The SOE of an embodiment contemplates single hand commands and poses, as well as two-handed commands and poses. FIG. 15 illustrates examples of two hand combinations and associated notation in an embodiment of the SOE. Reviewing the notation of the first example, "full stop" reveals that it comprises two closed fists. The "snapshot" example has the thumb and index finger of each hand extended, thumbs pointing toward each other, defining a goal post shaped frame. The "rudder and throttle start position" is fingers and thumbs pointing up palms facing the screen.

Orientation Blends

Figures 16, 17:
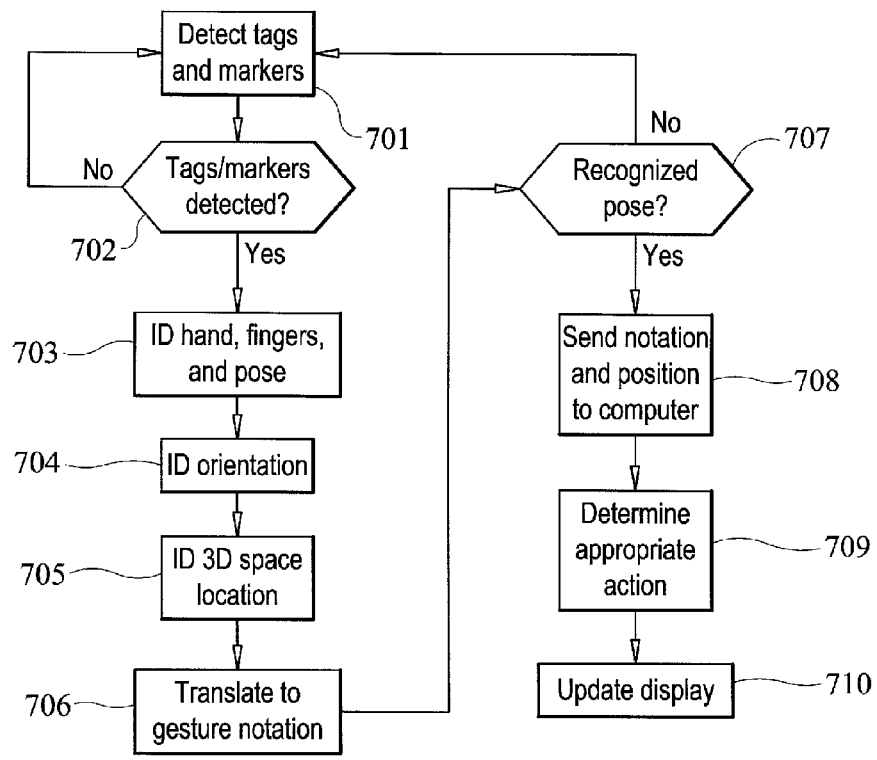
FIG. 16 is a diagram of orientation blends in a gesture vocabulary, under an embodiment.
FIG. 17 is a flow diagram of system operation, under an embodiment.

FIG. 16 illustrates an example of an orientation blend in an embodiment of the SOE. In the example shown the blend is represented by enclosing pairs of orientation notations in parentheses after the finger pose string. For example, the first command shows finger positions of all pointing straight. The first pair of orientation commands would result in the palms being flat toward the display and the second pair has the hands rotating to a 45 degree pitch toward the screen. Although pairs of blends are shown in this example, any number of blends is contemplated in the SOE.

Example Commands

FIGS. 18A and 18B show a number of possible commands that may be used with the SOE. Although some of the discussion here has been about controlling a cursor on a display, the SOE is not limited to that activity. In fact, the SOE has great application in manipulating any and all data and portions of data on a screen, as well as the state of the display. For example, the commands may be used to take the place of video controls during play back of video media. The commands may be used to pause, fast forward, rewind, and the like. In addition, commands may be implemented to zoom in or zoom out of an image, to change the orientation of an image, to pan in any direction, and the like. The SOE may also be used in lieu of menu commands such as open, close, save, and the like. In other words, any commands or activity that can be imagined can be implemented with hand gestures.

Operation

FIG. 17 is a flow diagram illustrating the operation of the SOE in one embodiment. At 701 the detection system detects the markers and tags. At 702 it is determined if the tags and markers are detected. If not, the system returns to 701. If the tags and markers are detected at 702, the system proceeds to 703. At 703 the system identifies the hand, fingers and pose from the detected tags and markers. At 704 the system identifies the orientation of the pose. At 705 the system identifies the three dimensional spatial location of the hand or hands that are detected. (Please note that any or all of 703, 704, and 705 may be combined).

At 706 the information is translated to the gesture notation described above. At 707 it is determined if the pose is valid. This may be accomplished via a simple string comparison using the generated notation string. If the pose is not valid, the system returns to 701. If the pose is valid, the system sends the notation and position information to the computer at 708. At 709 the computer determines the appropriate action to take in response to the gesture and updates the display accordingly at 710.

In one embodiment of the SOE, 701-705 are accomplished by the on-camera processor. In other embodiments, the processing can be accomplished by the system computer if desired.

Parsing and Translation

The system is able to "parse" and "translate" a stream of low-level gestures recovered by an underlying system, and turn those parsed and translated gestures into a stream of command or event data that can be used to control a broad range of computer applications and systems. These techniques and algorithms may be embodied in a system consisting of computer code that provides both an engine implementing these techniques and a platform for building computer applications that make use of the engine's capabilities.

One embodiment is focused on enabling rich gestural use of human hands in computer interfaces, but is also able to recognize gestures made by other body parts (including, but not limited to arms, torso, legs and the head), as well as non-hand physical tools of various kinds, both static and articulating, including but not limited to calipers, compasses, flexible curve approximators, and pointing devices of various shapes. The markers and tags may be applied to items and tools that may be carried and used by the operator as desired.

The system described here incorporates a number of innovations that make it possible to build gestural systems that are rich in the range of gestures that can be recognized and acted upon, while at the same time providing for easy integration into applications.

The gestural parsing and translation system in one embodiment comprises:

1) a compact and efficient way to specify (encode for use in computer programs) gestures at several different levels of aggregation:
   a. a single hand's "pose" (the configuration and orientation of the parts of the hand relative to one another) a single hand's orientation and position in three-dimensional space.
   b. two-handed combinations, for either hand taking into account pose, position or both.
   c. multi-person combinations; the system can track more than two hands, and so more than one person can cooperatively (or competitively, in the case of game applications) control the target system.
   d. sequential gestures in which poses are combined in a series; we call these "animating" gestures.
   e. "grapheme" gestures, in which the operator traces shapes in space.
2) a programmatic technique for registering specific gestures from each category above that are relevant to a given application context.
3) algorithms for parsing the gesture stream so that registered gestures can be identified and events encapsulating those gestures can be delivered to relevant application contexts.

The specification system (1), with constituent elements (1a) to (1f), provides the basis for making use of the gestural parsing and translating capabilities of the system described here.

A single-hand "pose" is represented as a string of
   i) relative orientations between the fingers and the back of the hand,
   ii) quantized into a small number of discrete states.

Using relative joint orientations allows the system described here to avoid problems associated with differing hand sizes and geometries. No "operator calibration" is required with this system. In addition, specifying poses as a string or collection of relative orientations allows more complex gesture specifications to be easily created by combining pose representations with further filters and specifications.

Using a small number of discrete states for pose specification makes it possible to specify poses compactly as well as to ensure accurate pose recognition using a variety of underlying tracking technologies (for example, passive optical tracking using cameras, active optical tracking using lighted dots and cameras, electromagnetic field tracking, etc).

Gestures in every category (1a) to (1f) may be partially (or minimally) specified, so that non-critical data is ignored. For example, a gesture in which the position of two fingers is definitive, and other finger positions are unimportant, may be represented by a single specification in which the operative positions of the two relevant fingers is given and, within the same string, "wild cards" or generic "ignore these" indicators are listed for the other fingers.

All of the innovations described here for gesture recognition, including but not limited to the multi-layered specification technique, use of relative orientations, quantization of data, and allowance for partial or minimal specification at every level, generalize beyond specification of hand gestures to specification of gestures using other body parts and "manufactured" tools and objects.

The programmatic techniques for "registering gestures" (2), consist of a defined set of Application Programming Interface calls that allow a programmer to define which gestures the engine should make available to other parts of the running system.

These API routines may be used at application set-up time, creating a static interface definition that is used throughout the lifetime of the running application. They may also be used during the course of the run, allowing the interface characteristics to change on the fly. This real-time alteration of the interface makes it possible to,
   i) build complex contextual and conditional control states,
   ii) to dynamically add hysterisis to the control environment, and
   iii) to create applications in which the user is able to alter or extend the interface vocabulary of the running system itself.

Algorithms for parsing the gesture stream (3) compare gestures specified as in (1) and registered as in (2) against incoming low-level gesture data. When a match for a registered gesture is recognized, event data representing the matched gesture is delivered up the stack to running applications.

Efficient real-time matching is desired in the design of this system, and specified gestures are treated as a tree of possibilities that are processed as quickly as possible.

In addition, the primitive comparison operators used internally to recognize specified gestures are also exposed for the applications programmer to use, so that further comparison (flexible state inspection in complex or compound gestures, for example) can happen even from within application contexts.

Recognition "locking" semantics are an innovation of the system described here. These semantics are implied by the registration API (2) (and, to a lesser extent, embedded within the specification vocabulary (1)). Registration API calls include,
   i) "entry" state notifiers and "continuation" state notifiers, and
   ii) gesture priority specifiers.

If a gesture has been recognized, its "continuation" conditions take precedence over all "entry" conditions for gestures of the same or lower priorities. This distinction between entry and continuation states adds significantly to perceived system usability.

The system described here includes algorithms for robust operation in the face of real-world data error and uncertainty. Data from low-level tracking systems may be incomplete (for a variety of reasons, including occlusion of markers in optical tracking, network drop-out or processing lag, etc).

Missing data is marked by the parsing system, and interpolated into either "last known" or "most likely" states, depending on the amount and context of the missing data.

If data about a particular gesture component (for example, the orientation of a particular joint) is missing, but the "last known" state of that particular component can be analyzed as physically possible, the system uses this last known state in its real-time matching.

Conversely, if the last known state is analyzed as physically impossible, the system falls back to a "best guess range" for the component, and uses this synthetic data in its real-time matching.

The specification and parsing systems described here have been carefully designed to support "handedness agnosticism," so that for multi-hand gestures either hand is permitted to satisfy pose requirements.

Coincident Virtual/Display and Physical Spaces

The system can provide an environment in which virtual space depicted on one or more display devices ("screens") is treated as coincident with the physical space inhabited by the operator or operators of the system. An embodiment of such an environment is described here. This current embodiment includes three projector-driven screens at fixed locations, is driven by a single desktop computer, and is controlled using the gestural vocabulary and interface system described herein. Note, however, that any number of screens are supported by the techniques being described; that those screens may be mobile (rather than fixed); that the screens may be driven by many independent computers simultaneously; and that the overall system can be controlled by any input device or technique.

The interface system described in this disclosure should have a means of determining the dimensions, orientations and positions of screens in physical space. Given this information, the system is able to dynamically map the physical space in which these screens are located (and which the operators of the system inhabit) as a projection into the virtual space of computer applications running on the system. As part of this automatic mapping, the system also translates the scale, angles, depth, dimensions and other spatial characteristics of the two spaces in a variety of ways, according to the needs of the applications that are hosted by the system.

This continuous translation between physical and virtual space makes possible the consistent and pervasive use of a number of interface techniques that are difficult to achieve on existing application platforms or that must be implemented piece-meal for each application running on existing platforms. These techniques include (but are not limited to):

1) Use of "literal pointing"—using the hands in a gestural interface environment, or using physical pointing tools or devices—as a pervasive and natural interface technique.

2) Automatic compensation for movement or repositioning of screens.

3) Graphics rendering that changes depending on operator position, for example simulating parallax shifts to enhance depth perception.

4) Inclusion of physical objects in on-screen display—taking into account real-world position, orientation, state, etc. For example, an operator standing in front of a large, opaque screen, could see both applications graphics and a representation of the true position of a scale model that is behind the screen (and is, perhaps, moving or changing orientation).

It is important to note that literal pointing is different from the abstract pointing used in mouse-based windowing interfaces and most other contemporary systems. In those systems, the operator must learn to manage a translation between a virtual pointer and a physical pointing device, and must map between the two cognitively.

By contrast, in the systems described in this disclosure, there is no difference between virtual and physical space (except that virtual space is more amenable to mathematical manipulation), either from an application or user perspective, so there is no cognitive translation required of the operator.

The closest analogy for the literal pointing provided by the embodiment described here is the touch-sensitive screen (as found, for example, on many ATM machines). A touch-sensitive screen provides a one to one mapping between the two-dimensional display space on the screen and the two-dimensional input space of the screen surface. In an analogous fashion, the systems described here provide a flexible mapping (possibly, but not necessarily, one to one) between a virtual space displayed on one or more screens and the physical space inhabited by the operator. Despite the usefulness of the analogy, it is worth understanding that the extension of this "mapping approach" to three dimensions, an arbitrarily large architectural environment, and multiple screens is non-trivial.

In addition to the components described herein, the system may also implement algorithms implementing a continuous, systems-level mapping (perhaps modified by rotation, translation, scaling or other geometrical transformations) between the physical space of the environment and the display space on each screen.

A rendering stack that takes the computational objects and the mapping and outputs a graphical representation of the virtual space.

An input events processing stack which takes event data from a control system (in the current embodiment both gestural and pointing data from the system and mouse input) and maps spatial data from input events to coordinates in virtual space. Translated events are then delivered to running applications.

A "glue layer" allowing the system to host applications running across several computers on a local area network.

Data Representation, Transit, and Interchange

Embodiments of an SOE or spatial-continuum input system are described herein as comprising network-based data representation, transit, and interchange that includes a system called "plasma" that comprises subsystems "slawx", "proteins", and "pools", as described in detail below. The pools and proteins are components of methods and systems described herein for encapsulating data that is to be shared between or across processes. These mechanisms also include slawx (plural of "slaw") in addition to the proteins and pools. Generally, slawx provide the lowest-level of data definition for inter-process exchange, proteins provide mid-level structure and hooks for querying and filtering, and pools provide for high-level organization and access semantics. Slawx include a mechanism for efficient, platform-independent data representation and access. Proteins provide a data encapsulation and transport scheme using slawx as the payload. Pools provide structured and flexible aggregation, ordering, filtering, and distribution of proteins within a process, among local processes, across a network between remote or distributed processes, and via longer term (e.g. on-disk, etc.) storage.

The configuration and implementation of the embodiments described herein include several constructs that together enable numerous capabilities. For example, the embodiments described herein provide efficient exchange of data between large numbers of processes as described above. The embodiments described herein also provide flexible data "typing" and structure, so that widely varying kinds and uses of data are supported. Furthermore, embodiments described herein include flexible mechanisms for data exchange (e.g., local memory, disk, network, etc.), all driven by substantially similar application programming interfaces (APIs). Moreover, embodiments described enable data exchange between processes written in different programming languages. Additionally, embodiments described herein enable automatic maintenance of data caching and aggregate state.

Figure 19:
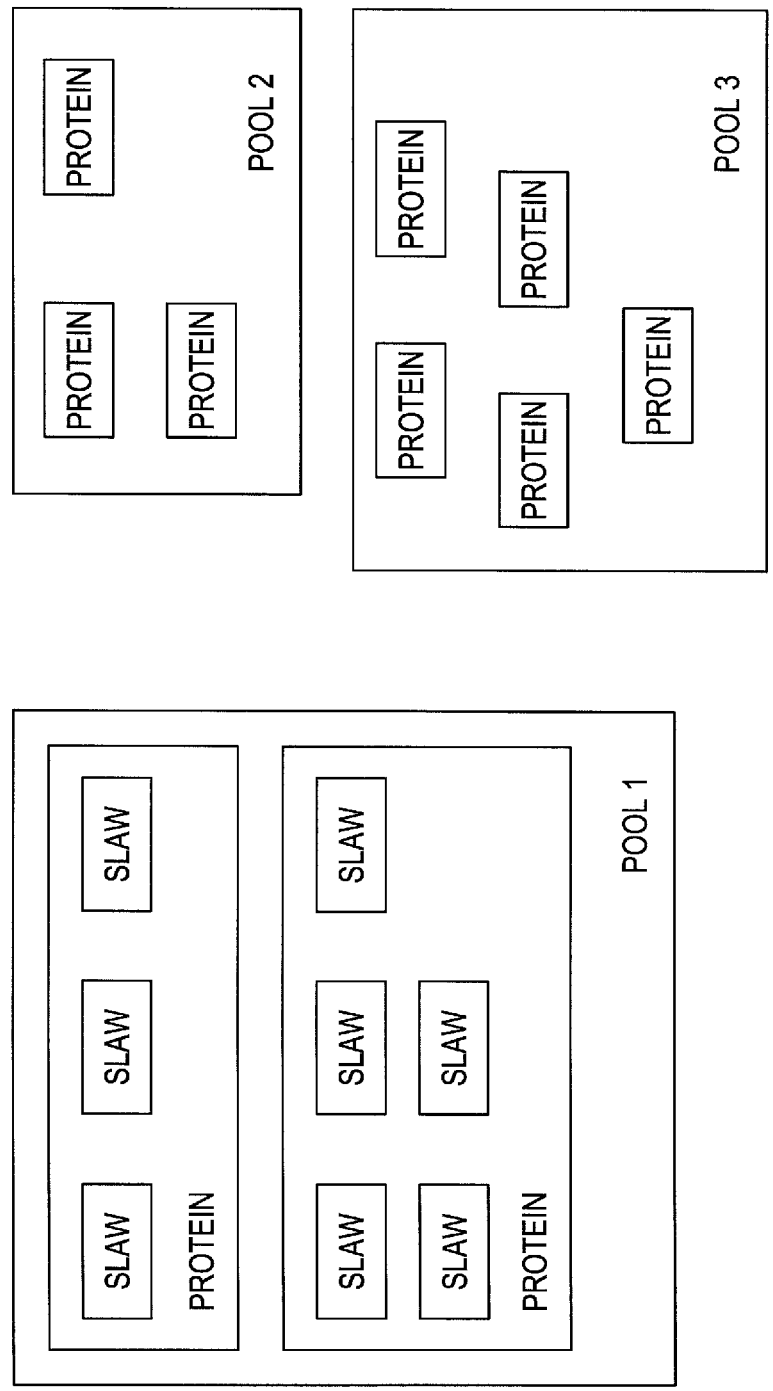
FIG. 19 is a block diagram of a processing environment including data representations using slawx, proteins, and pools, under an embodiment.

FIG. 19 is a block diagram of a processing environment including data representations using slawx, proteins, and pools, under an embodiment. The principal constructs of the embodiments presented herein include slawx (plural of "slaw"), proteins, and pools. Slawx as described herein includes a mechanism for efficient, platform-independent data representation and access. Proteins, as described in detail herein, provide a data encapsulation and transport scheme, and the payload of a protein of an embodiment includes slawx. Pools, as described herein, provide structured yet flexible aggregation, ordering, filtering, and distribution of proteins. The pools provide access to data, by virtue of proteins, within a process, among local processes, across a network between remote or distributed processes, and via 'longer term' (e.g. on-disk) storage.

Figure 20:
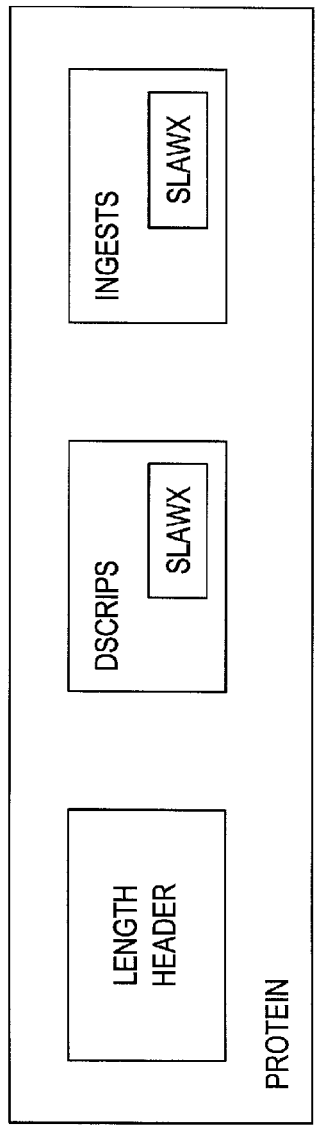
FIG. 20 is a block diagram of a protein, under an embodiment.

FIG. 20 is a block diagram of a protein, under an embodiment. The protein includes a length header, a descrip, and an ingest. Each of the descrip and ingest includes slaw or slawx, as described in detail below.

Figure 21:
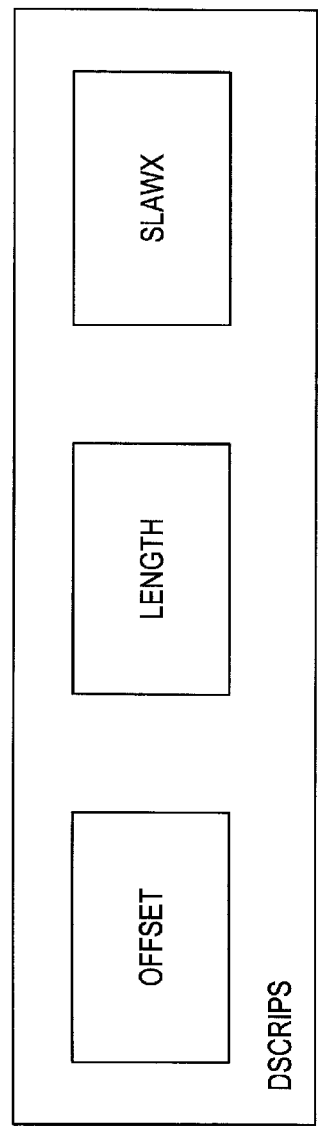
FIG. 21 is a block diagram of a descrip, under an embodiment.

FIG. 21 is a block diagram of a descrip, under an embodiment. The descrip includes an offset, a length, and slawx, as described in detail below.

Figure 22:
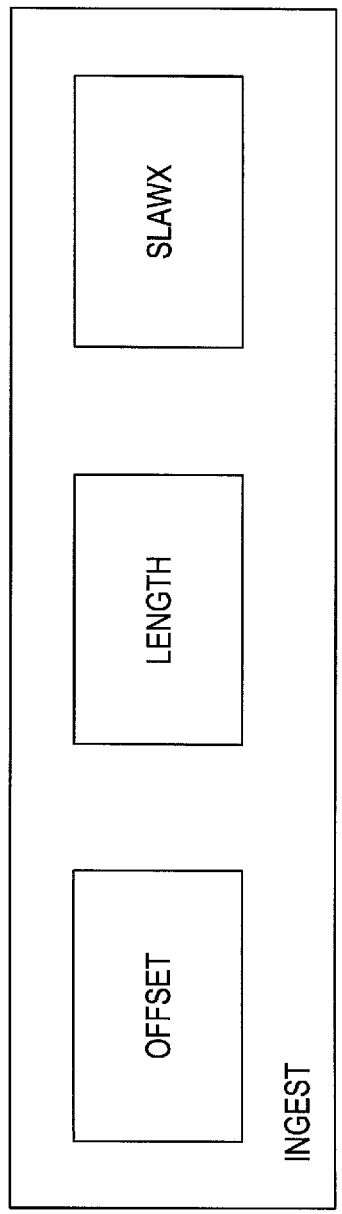
FIG. 22 is a block diagram of an ingest, under an embodiment.

FIG. 22 is a block diagram of an ingest, under an embodiment. The ingest includes an offset, a length, and slawx, as described in detail below.

Figure 23:
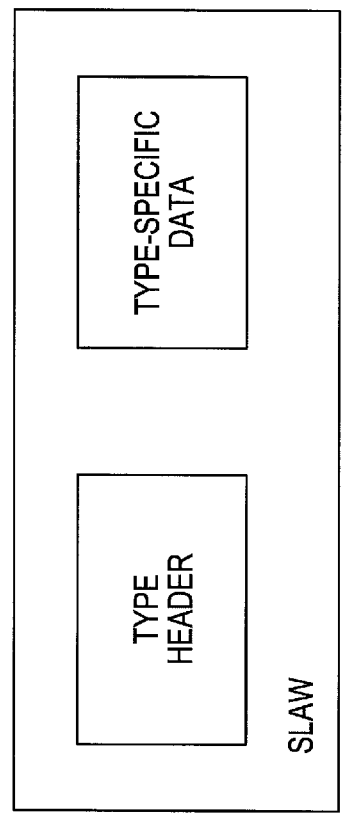
FIG. 23 is a block diagram of a slaw, under an embodiment.

FIG. 23 is a block diagram of a slaw, under an embodiment. The slaw includes a type header and type-specific data, as described in detail below.

Figure 24A:
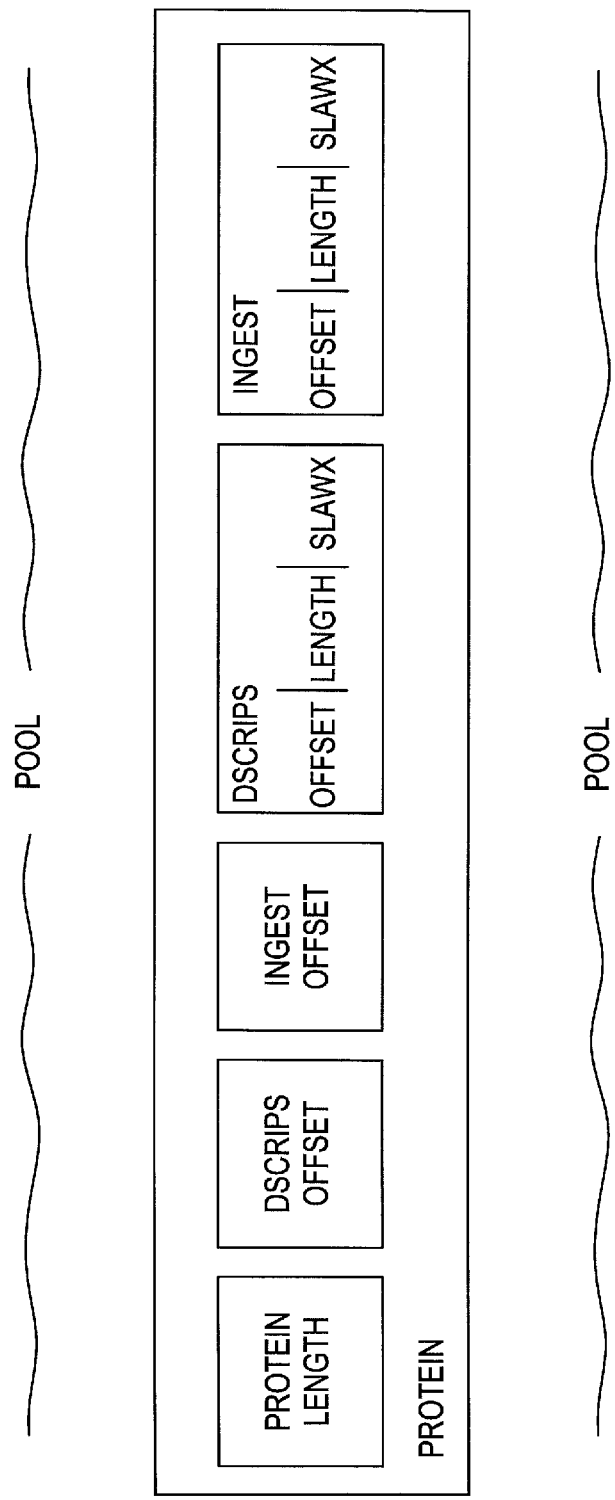
FIG. 24A is a block diagram of a protein in a pool, under an embodiment.

FIG. 24A is a block diagram of a protein in a pool, under an embodiment. The protein includes a length header ("protein length"), a descrips offset, an ingests offset, a descrip, and an ingest. The descrips includes an offset, a length, and a slaw. The ingest includes an offset, a length, and a slaw.

The protein as described herein is a mechanism for encapsulating data that needs to be shared between processes, or moved across a bus or network or other processing structure. As an example, proteins provide an improved mechanism for transport and manipulation of data including data corresponding to or associated with user interface events; in particular, the user interface events of an embodiment include those of the gestural interface described above. As a further example, proteins provide an improved mechanism for transport and manipulation of data including, but not limited to, graphics data or events, and state information, to name a few. A protein is a structured record format and an associated set of methods for manipulating records. Manipulation of records as used herein includes putting data into a structure, taking data out of a structure, and querying the format and existence of data. Proteins are configured to be used via code written in a variety of computer languages. Proteins are also configured to be the basic building block for pools, as described herein. Furthermore, proteins are configured to be natively able to move between processors and across networks while maintaining intact the data they include.

In contrast to conventional data transport mechanisms, proteins are untyped. While being untyped, the proteins provide a powerful and flexible pattern-matching facility, on top of which "type-like" functionality is implemented. Proteins configured as described herein are also inherently multi-point (although point-to-point forms are easily implemented as a subset of multi-point transmission). Additionally, proteins define a "universal" record format that does not differ (or differs only in the types of optional optimizations that are performed) between in-memory, on-disk, and on-the-wire (network) formats, for example.

Referring to FIGS. 20 and 24A, a protein of an embodiment is a linear sequence of bytes. Within these bytes are encapsulated a descrips list and a set of key-value pairs called ingests. The descrips list includes an arbitrarily elaborate but efficiently filterable per-protein event description. The ingests include a set of key-value pairs that comprise the actual contents of the protein.

Proteins' concern with key-value pairs, as well as some core ideas about network-friendly and multi-point data interchange, is shared with earlier systems that privilege the concept of "tuples" (e.g., Linda, Jini). Proteins differ from tuple-oriented systems in several major ways, including the use of the descrips list to provide a standard, optimizable pattern matching substrate. Proteins also differ from tuple-oriented systems in the rigorous specification of a record format appropriate for a variety of storage and language constructs, along with several particular implementations of "interfaces" to that record format.

Turning to a description of proteins, the first four or eight bytes of a protein specify the protein's length, which must be a multiple of 16 bytes in an embodiment. This 16-byte granularity ensures that byte-alignment and bus-alignment efficiencies are achievable on contemporary hardware. A protein that is not naturally "quad-word aligned" is padded with arbitrary bytes so that its length is a multiple of 16 bytes.

The length portion of a protein has the following format: 32 bits specifying length, in big-endian format, with the four lowest-order bits serving as flags to indicate macro-level protein structure characteristics; followed by 32 further bits if the protein's length is greater than 2^32 bytes.

The 16-byte-alignment proviso of an embodiment means that the lowest order bits of the first four bytes are available as flags. And so the first three low-order bit flags indicate whether the protein's length can be expressed in the first four bytes or requires eight, whether the protein uses big-endian or little-endian byte ordering, and whether the protein employs standard or non-standard structure, respectively, but the protein is not so limited. The fourth flag bit is reserved for future use.

If the eight-byte length flag bit is set, the length of the protein is calculated by reading the next four bytes and using them as the high-order bytes of a big-endian, eight-byte integer (with the four bytes already read supplying the low-order portion). If the little-endian flag is set, all binary numerical data in the protein is to be interpreted as little-endian (otherwise, big-endian). If the non-standard flag bit is set, the remainder of the protein does not conform to the standard structure to be described below.

Non-standard protein structures will not be discussed further herein, except to say that there are various methods for describing and synchronizing on non-standard protein formats available to a systems programmer using proteins and pools, and that these methods can be useful when space or compute cycles are constrained. For example, the shortest protein of an embodiment is sixteen bytes. A standard-format protein cannot fit any actual payload data into those sixteen bytes (the lion's share of which is already relegated to describing the location of the protein's component parts). But a non-standard format protein could conceivably use 12 of its 16 bytes for data. Two applications exchanging proteins could mutually decide that any 16-byte-long proteins that they emit always include 12 bytes representing, for example, 12 8-bit sensor values from a real-time analog-to-digital converter.

Immediately following the length header, in the standard structure of a protein, two more variable-length integer numbers appear. These numbers specify offsets to, respectively, the first element in the descrips list and the first key-value pair (ingest). These offsets are also referred to herein as the descrips offset and the ingests offset, respectively. The byte order of each quad of these numbers is specified by the protein endianness flag bit. For each, the most significant bit of the first four bytes determines whether the number is four or eight bytes wide. If the most significant bit (msb) is set, the first four bytes are the most significant bytes of a double-word (eight byte) number. This is referred to herein as "offset form". Use of separate offsets pointing to descrips and pairs allows descrips and pairs to be handled by different code paths, making possible particular optimizations relating to, for example, descrips pattern-matching and protein assembly. The presence of these two offsets at the beginning of a protein also allows for several useful optimizations.

Most proteins will not be so large as to require eight-byte lengths or pointers, so in general the length (with flags) and two offset numbers will occupy only the first three bytes of a protein. On many hardware or system architectures, a fetch or read of a certain number of bytes beyond the first is "free" (e.g., 16 bytes take exactly the same number of clock cycles to pull across the Cell processor's main bus as a single byte).

In many instances it is useful to allow implementation-specific or context-specific caching or metadata inside a protein. The use of offsets allows for a "hole" of arbitrary size to be created near the beginning of the protein, into which such metadata may be slotted. An implementation that can make use of eight bytes of metadata gets those bytes for free on many system architectures with every fetch of the length header for a protein.

The descrips offset specifies the number of bytes between the beginning of the protein and the first descrip entry. Each descrip entry comprises an offset (in offset form, of course) to the next descrip entry, followed by a variable-width length field (again in offset format), followed by a slaw. If there are no further descrips, the offset is, by rule, four bytes of zeros. Otherwise, the offset specifies the number of bytes between the beginning of this descrip entry and a subsequent descrip entry. The length field specifies the length of the slaw, in bytes.

In most proteins, each descrip is a string, formatted in the slaw string fashion: a four-byte length/type header with the most significant bit set and only the lower 30 bits used to specify length, followed by the header's indicated number of data bytes. As usual, the length header takes its endianness from the protein. Bytes are assumed to encode UTF-8 characters (and thus—nota bene—the number of characters is not necessarily the same as the number of bytes).

The ingests offset specifies the number of bytes between the beginning of the protein and the first ingest entry. Each ingest entry comprises an offset (in offset form) to the next ingest entry, followed again by a length field and a slaw. The ingests offset is functionally identical to the descrips offset, except that it points to the next ingest entry rather than to the next descrip entry.

In most proteins, every ingest is of the slaw cons type comprising a two-value list, generally used as a key/value pair. The slaw cons record comprises a four-byte length/type header with the second most significant bit set and only the lower 30 bits used to specify length; a four-byte offset to the start of the value (second) element; the four-byte length of the key element; the slaw record for the key element; the four-byte length of the value element; and finally the slaw record for the value element.

Generally, the cons key is a slaw string. The duplication of data across the several protein and slaw cons length and offsets field provides yet more opportunity for refinement and optimization.

The construct used under an embodiment to embed typed data inside proteins, as described above, is a tagged byte-sequence specification and abstraction called a "slaw" (the plural is "slawx"). A slaw is a linear sequence of bytes representing a piece of (possibly aggregate) typed data, and is associated with programming-language-specific APIs that allow slawx to be created, modified and moved around between memory spaces, storage media, and machines. The slaw type scheme is intended to be extensible and as lightweight as possible, and to be a common substrate that can be used from any programming language.

The desire to build an efficient, large-scale inter-process communication mechanism is the driver of the slaw configuration. Conventional programming languages provide sophisticated data structures and type facilities that work well in process-specific memory layouts, but these data representations invariably break down when data needs to be moved between processes or stored on disk. The slaw architecture is, first, a substantially efficient, multi-platform friendly, low-level data model for inter-process communication.

But even more importantly, slawx are configured to influence, together with proteins, and enable the development of future computing hardware (microprocessors, memory controllers, disk controllers). A few specific additions to, say, the instruction sets of commonly available microprocessors make it possible for slawx to become as efficient even for single-process, in-memory data layout as the schema used in most programming languages.

Each slaw comprises a variable-length type header followed by a type-specific data layout. In an example embodiment, which supports full slaw functionality in C, C++ and Ruby for example, types are indicated by a universal integer defined in system header files accessible from each language. More sophisticated and flexible type resolution functionality is also enabled: for example, indirect typing via universal object IDs and network lookup.

The slaw configuration of an embodiment allows slaw records to be used as objects in language-friendly fashion from both Ruby and C++, for example. A suite of utilities external to the C++ compiler sanity-check slaw byte layout, create header files and macros specific to individual slaw types, and auto-generate bindings for Ruby. As a result, well-configured slaw types are quite efficient even when used from within a single process. Any slaw anywhere in a process's accessible memory can be addressed without a copy or "deserialization" step.

Slaw functionality of an embodiment includes API facilities to perform one or more of the following: create a new slaw of a specific type; create or build a language-specific reference to a slaw from bytes on disk or in memory; embed data within a slaw in type-specific fashion; query the size of a slaw; retrieve data from within a slaw; clone a slaw; and translate the endianness and other format attributes of all data within a slaw. Every species of slaw implements the above behaviors.

FIGS. 24B/1 and 24B2 show a slaw header format, under an embodiment. A detailed description of the slaw follows.

The internal structure of each slaw optimizes each of type resolution, access to encapsulated data, and size information for that slaw instance. In an embodiment, the full set of slaw types is by design minimally complete, and includes: the slaw string; the slaw cons (i.e. dyad); the slaw list; and the slaw numerical object, which itself represents a broad set of individual numerical types understood as permutations of a half-dozen or so basic attributes. The other basic property of any slaw is its size. In an embodiment, slawx have byte-lengths quantized to multiples of four; these four-byte words are referred to herein as 'quads'. In general, such quad-based sizing aligns slawx well with the configurations of modern computer hardware architectures.

The first four bytes of every slaw in an embodiment comprise a header structure that encodes type-description and other metainformation, and that ascribes specific type meanings to particular bit patterns. For example, the first (most significant) bit of a slaw header is used to specify whether the size (length in quad-words) of that slaw follows the initial four-byte type header. When this bit is set, it is understood that the size of the slaw is explicitly recorded in the next four bytes of the slaw (e.g., bytes five through eight); if the size of the slaw is such that it cannot be represented in four bytes (i.e. if the size is or is larger than two to the thirty-second power) then the next-most-significant bit of the slaw's initial four bytes is also set, which means that the slaw has an eight-byte (rather than four byte) length. In that case, an inspecting process will find the slaw's length stored in ordinal bytes five through twelve. On the other hand, the small number of slaw types means that in many cases a fully specified typal bit-pattern "leaves unused" many bits in the four byte slaw header; and in such cases these bits may be employed to encode the slaw's length, saving the bytes (five through eight) that would otherwise be required.

For example, an embodiment leaves the most significant bit of the slaw header (the "length follows" flag) unset and sets the next bit to indicate that the slaw is a "wee cons", and in this case the length of the slaw (in quads) is encoded in the remaining thirty bits. Similarly, a "wee string" is marked by the pattern 001 in the header, which leaves twenty-nine bits for representation of the slaw-string's length; and a leading 0001 in the header describes a "wee list", which by virtue of the twenty-eight available length-representing bits can be a slaw list of up to two-to-the-twenty-eight quads in size. A "full string" (or cons or list) has a different bit signature in the header, with the most significant header bit necessarily set because the slaw length is encoded separately in bytes five through eight (or twelve, in extreme cases). Note that the Plasma implementation "decides" at the instant of slaw construction whether to employ the "wee" or the "full" version of these constructs (the decision is based on whether the resulting size will "fit" in the available wee bits or not), but the full-vs.-wee detail is hidden from the user of the Plasma implementation, who knows and cares only that she is using a slaw string, or a slaw cons, or a slaw list.

Numeric slawx are, in an embodiment, indicated by the leading header pattern 00001. Subsequent header bits are used to represent a set of orthogonal properties that may be combined in arbitrary permutation. An embodiment employs, but is not limited to, five such character bits to indicate whether or not the number is: (1) floating point; (2) complex; (3) unsigned; (4) "wide"; (5) "stumpy" ((4) "wide" and (5) "stumpy" are permuted to indicate eight, sixteen, thirty-two, and sixty-four bit number representations). Two additional bits (e.g., (7) and (8)) indicate that the encapsulated numeric data is a two-, three-, or four-element vector (with both bits being zero suggesting that the numeric is a "one-element vector" (i.e. a scalar)). In this embodiment the eight bits of the fourth header byte are used to encode the size (in bytes, not quads) of the encapsulated numeric data. This size encoding is offset by one, so that it can represent any size between and including one and two hundred fifty-six bytes. Finally, two character bits (e.g., (9) and (10)) are used to indicate that the numeric data encodes an array of individual numeric entities, each of which is of the type described by character bits (1) through (8). In the case of an array, the individual numeric entities are not each tagged with additional headers, but are packed as continuous data following the single header and, possibly, explicit slaw size information.

This embodiment affords simple and efficient slaw duplication (which can be implemented as a byte-for-byte copy) and extremely straightforward and efficient slaw comparison (two slawx are the same in this embodiment if and only if there is a one-to-one match of each of their component bytes considered in sequence). This latter property is important, for example, to an efficient implementation of the protein architecture, one of whose critical and pervasive features is the ability to search through or 'match on' a protein's descrips list.

Further, the embodiments herein allow aggregate slaw forms (e.g., the slaw cons and the slaw list) to be constructed simply and efficiently. For example, an embodiment builds a slaw cons from two component slawx, which may be of any type, including themselves aggregates, by: (a) querying each component slaw's size; (b) allocating memory of size equal to the sum of the sizes of the two component slawx and the one, two, or three quads needed for the header-plus-size structure; (c) recording the slaw header (plus size information) in the first four, eight, or twelve bytes; and then (d) copying the component slawx's bytes in turn into the immediately succeeding memory. Significantly, such a construction routine need know nothing about the types of the two component slawx; only their sizes (and accessibility as a sequence of bytes) matters. The same process pertains to the construction of slaw lists, which are ordered encapsulations of arbitrarily many sub-slawx of (possibly) heterogeneous type.

A further consequence of the slaw system's fundamental format as sequential bytes in memory obtains in connection with "traversal" activities—a recurring use pattern uses, for example, sequential access to the individual slawx stored in a slaw list. The individual slawx that represent the descrips and ingests within a protein structure must similarly be traversed. Such maneuvers are accomplished in a stunningly straightforward and efficient manner: to "get to" the next slaw in a slaw list, one adds the length of the current slaw to its location in memory, and the resulting memory location is identically the header of the next slaw. Such simplicity is possible because the slaw and protein design eschews "indirection"; there are no pointers; rather, the data simply exists, in its totality, in situ.

To the point of slaw comparison, a complete implementation of the Plasma system must acknowledge the existence of differing and incompatible data representation schemes across and among different operating systems, CPUs, and hardware architectures. Major such differences include byte-ordering policies (e.g., little- vs. big-endianness) and floating-point representations; other differences exist. The Plasma specification requires that the data encapsulated by slawx be guaranteed interprable (i.e., must appear in the native format of the architecture or platform from which the slaw is being inspected. This requirement means in turn that the Plasma system is itself responsible for data format conversion. However, the specification stipulates only that the conversion take place before a slaw becomes "at all visible" to an executing process that might inspect it. It is therefore up to the individual implementation at which point it chooses to perform such format c conversion; two appropriate approaches are that slaw data payloads are conformed to the local architecture's data format (1) as an individual slaw is "pulled out" of a protein in which it had been packed, or (2) for all slaw in a protein simultaneously, as that protein is extracted from the pool in which it was resident. Note that the conversion stipulation considers the possibility of hardware-assisted implementations. For example, networking chipsets built with explicit Plasma capability may choose to perform format conversion intelligently and at the "instant of transmission", based on the known characteristics of the receiving system. Alternately, the process of transmission may convert data payloads into a canonical format, with the receiving process symmetrically converting from canonical to "local" format. Another embodiment performs format conversion "at the metal", meaning that data is always stored in canonical format, even in local memory, and that the memory controller hardware itself performs the conversion as data is retrieved from memory and placed in the registers of the proximal CPU.

Figure 24C:
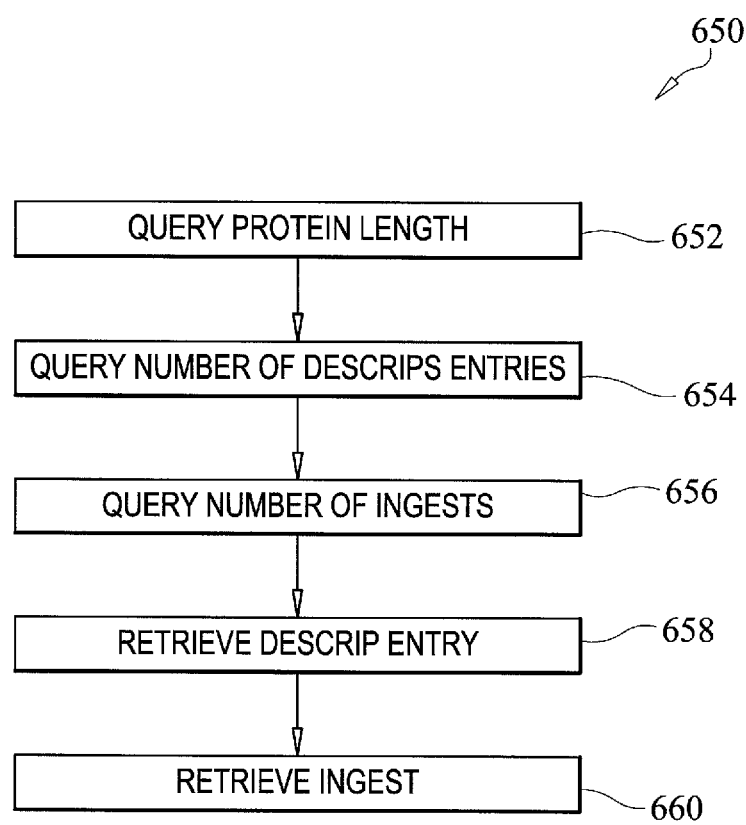
FIG. 24C is a flow diagram for using proteins, under an embodiment.

A minimal (and read-only) protein implementation of an embodiment includes operation or behavior in one or more applications or programming languages making use of proteins. FIG. 24C is a flow diagram 650 for using proteins, under an embodiment. Operation begins by querying 652 the length in bytes of a protein. The number of descrips entries is queried 654. The number of ingests is queried 656. A descrip entry is retrieved 658 by index number. An ingest is retrieved 660 by index number.

Figure 24D:
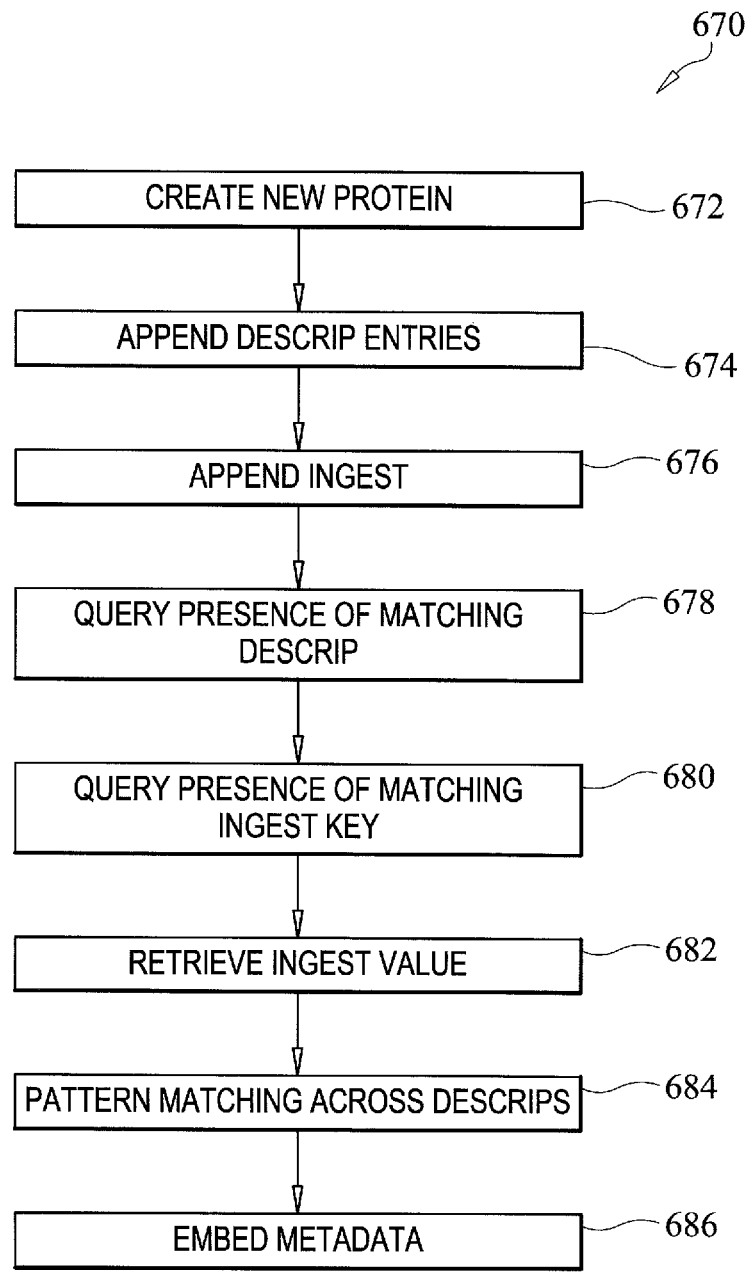
FIG. 24D is a flow diagram for constructing or generating proteins, under an embodiment.

The embodiments described herein also define basic methods allowing proteins to be constructed and filled with data, helper-methods that make common tasks easier for programmers, and hooks for creating optimizations. FIG. 24D is a flow diagram 670 for constructing or generating proteins, under an embodiment. Operation begins with creation 672 of a new protein. A series of descrips entries are appended 674. An ingest is also appended 676. The presence of a matching descrip is queried 678, and the presence of a matching ingest key is queried 680. Given an ingest key, an ingest value is retrieved 682. Pattern matching is performed 684 across descrips. Non-structured metadata is embedded 686 near the beginning of the protein.

As described above, slawx provide the lowest-level of data definition for inter-process exchange, proteins provide mid-level structure and hooks for querying and filtering, and pools provide for high-level organization and access semantics. The pool is a repository for proteins, providing linear sequencing and state caching. The pool also provides multi-process access by multiple programs or applications of numerous different types. Moreover, the pool provides a set of common, optimizable filtering and pattern-matching behaviors.

The pools of an embodiment, which can accommodate tens of thousands of proteins, function to maintain state, so that individual processes can offload much of the tedious bookkeeping common to multi-process program code. A pool maintains or keeps a large buffer of past proteins available— the Platonic pool is explicitly infinite—so that participating processes can scan both backwards and forwards in a pool at will. The size of the buffer is implementation dependent, of course, but in common usage it is often possible to keep proteins in a pool for hours or days.

The most common style of pool usage as described herein hews to a biological metaphor, in contrast to the mechanistic, point-to-point approach taken by existing inter-process communication frameworks. The name protein alludes to biological inspiration: data proteins in pools are available for flexible querying and pattern matching by a large number of computational processes, as chemical proteins in a living organism are available for pattern matching and filtering by large numbers of cellular agents.

Two additional abstractions lean on the biological metaphor, including use of "handlers", and the Golgi framework. A process that participates in a pool generally creates a number of handlers. Handlers are relatively small bundles of code that associate match conditions with handle behaviors. By tying one or more handlers to a pool, a process sets up flexible call-back triggers that encapsulate state and react to new proteins.

A process that participates in several pools generally inherits from an abstract Golgi class. The Golgi framework provides a number of useful routines for managing multiple pools and handlers. The Golgi class also encapsulates parent-child relationships, providing a mechanism for local protein exchange that does not use a pool.

A pools API provided under an embodiment is configured to allow pools to be implemented in a variety of ways, in order to account both for system-specific goals and for the available capabilities of given hardware and network architectures. The two fundamental system provisions upon which pools depend are a storage facility and a means of inter-process communication. The extant systems described herein use a flexible combination of shared memory, virtual memory, and disk for the storage facility, and IPC queues and TCP/IP sockets for inter-process communication.

Pool functionality of an embodiment includes, but is not limited to, the following: participating in a pool; placing a protein in a pool; retrieving the next unseen protein from a pool; rewinding or fast-forwarding through the contents (e.g., proteins) within a pool. Additionally, pool functionality can include, but is not limited to, the following: setting up a streaming pool call-back for a process; selectively retrieving proteins that match particular patterns of descrips or ingests keys; scanning backward and forwards for proteins that match particular patterns of descrips or ingests keys.

Figure 25:
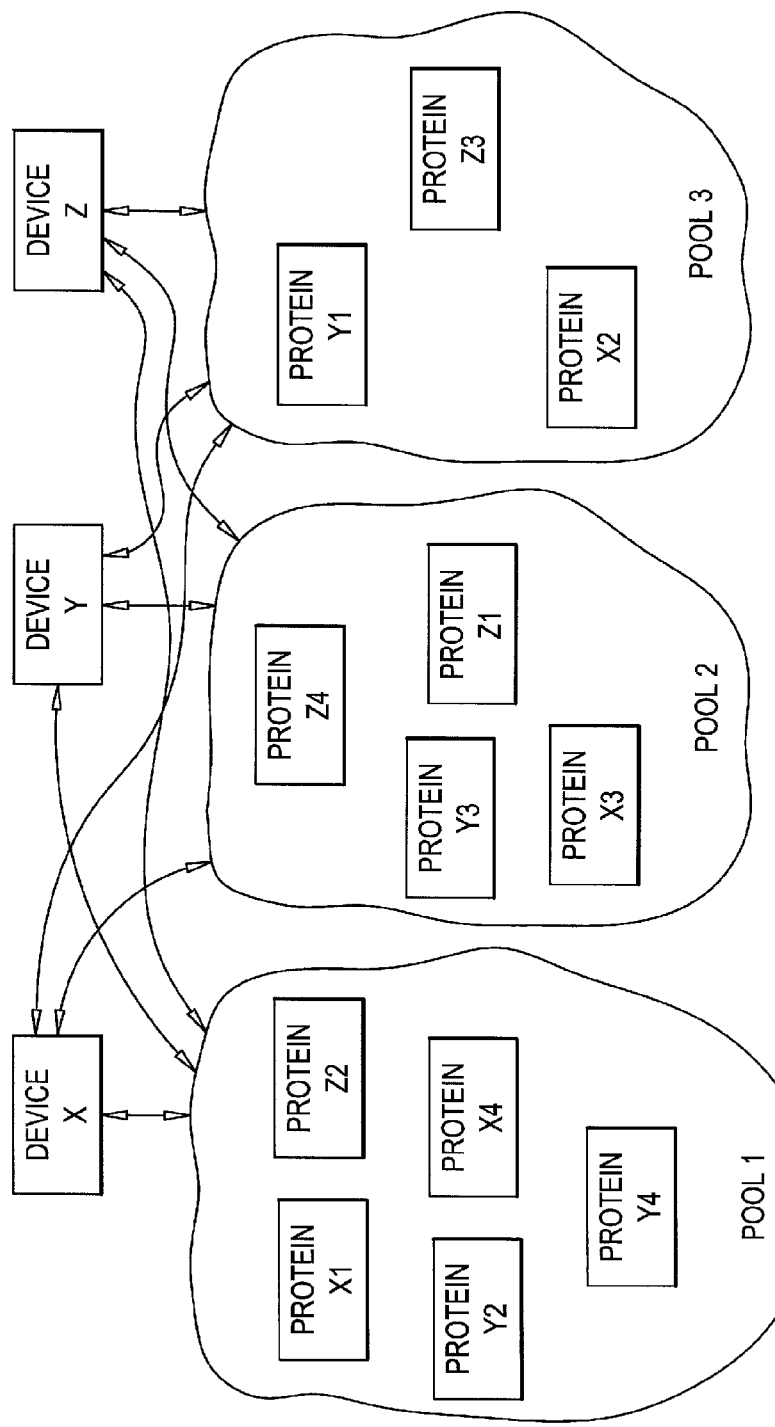
FIG. 25 is a block diagram of a processing environment including data exchange using slawx, proteins, and pools, under an embodiment.

The proteins described above are provided to pools as a way of sharing the protein data contents with other applications. FIG. 25 is a block diagram of a processing environment including data exchange using slawx, proteins, and pools, under an embodiment. This example environment includes three devices (e.g., Device X, Device Y, and Device Z, collectively referred to herein as the "devices") sharing data through the use of slawx, proteins and pools as described above. Each of the devices is coupled to the three pools (e.g., Pool 1, Pool 2, Pool 3). Pool 1 includes numerous proteins (e.g., Protein X1, Protein Z2, Protein Y2, Protein X4, Protein Y4) contributed or transferred to the pool from the respective devices (e.g., protein Z2 is transferred or contributed to pool 1 by device Z, etc.). Pool 2 includes numerous proteins (e.g., Protein Z4, Protein Y3, Protein Z1, Protein X3) contributed or transferred to the pool from the respective devices (e.g., protein Y3 is transferred or contributed to pool 2 by device Y, etc.). Pool 3 includes numerous proteins (e.g., Protein Y1, Protein Z3, Protein X2) contributed or transferred to the pool from the respective devices (e.g., protein X2 is transferred or contributed to pool 3 by device X, etc.). While the example described above includes three devices coupled or connected among three pools, any number of devices can be coupled or connected in any manner or combination among any number of pools, and any pool can include any number of proteins contributed from any number or combination of devices.

Figure 26:
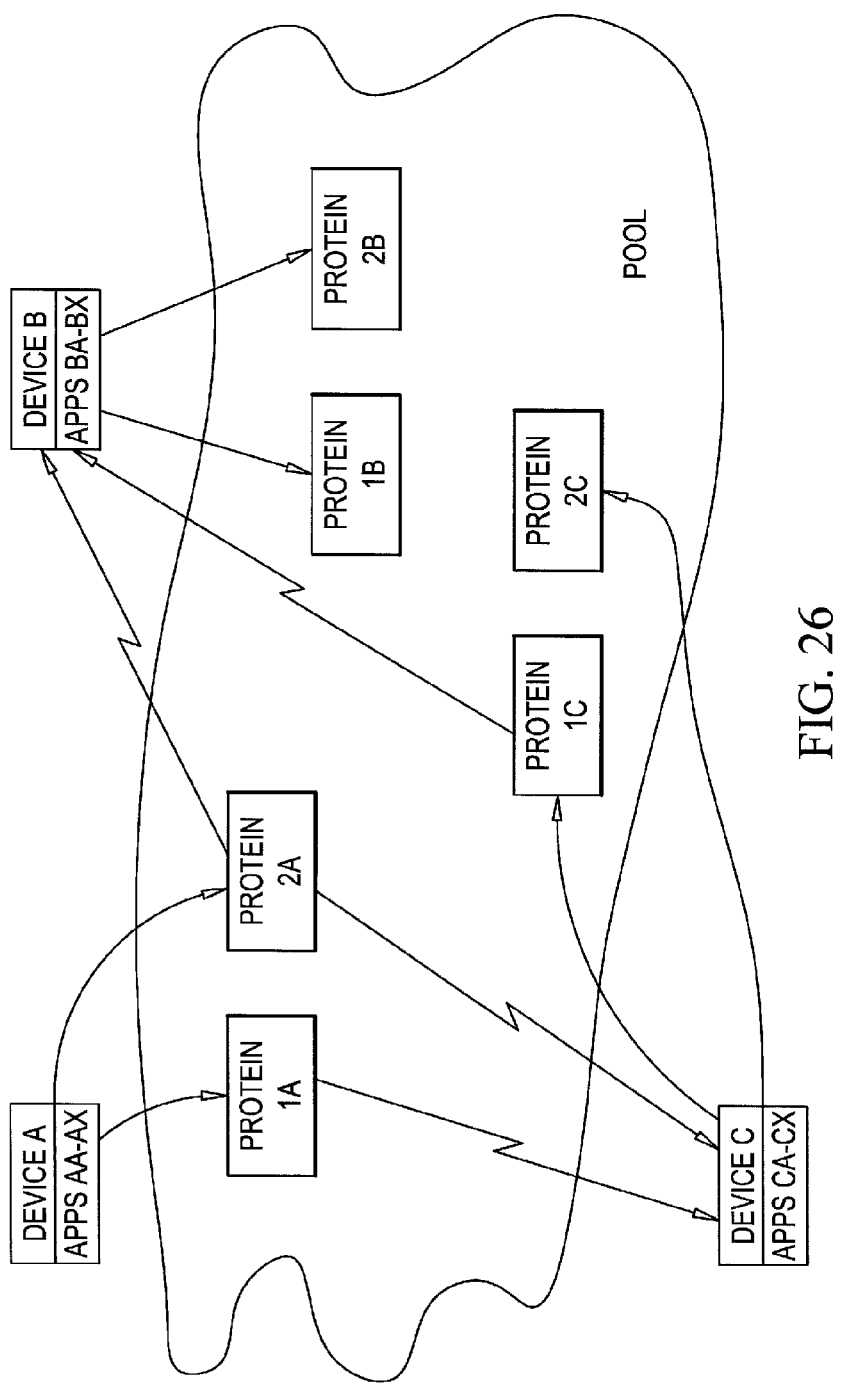
FIG. 26 is a block diagram of a processing environment including multiple devices and numerous programs running on one or more of the devices in which the Plasma constructs (i.e., pools, proteins, and slaw) are used to allow the numerous running programs to share and collectively respond to the events generated by the devices, under an embodiment.

FIG. 26 is a block diagram of a processing environment including multiple devices and numerous programs running on one or more of the devices in which the Plasma constructs (e.g., pools, proteins, and slaw) are used to allow the numerous running programs to share and collectively respond to the events generated by the devices, under an embodiment. This system is but one example of a multi-user, multi-device, multi-computer interactive control scenario or configuration. More particularly, in this example, an interactive system, comprising multiple devices (e.g., device A, B, etc.) and a number of programs (e.g., apps AA-AX, apps BA-BX, etc.) running on the devices uses the Plasma constructs (e.g., pools, proteins, and slaw) to allow the running programs to share and collectively respond to the events generated by these input devices.

In this example, each device (e.g., device A, B, etc.) translates discrete raw data generated by or output from the programs (e.g., apps AA-AX, apps BA-BX, etc.) running on that respective device into Plasma proteins and deposits those proteins into a Plasma pool. For example, program AX generates data or output and provides the output to device A which, in turn, translates the raw data into proteins (e.g., protein 1A, protein 2A, etc.) and deposits those proteins into the pool. As another example, program BC generates data and provides the data to device B which, in turn, translates the data into proteins (e.g., protein 1B, protein 2B, etc.) and deposits those proteins into the pool.

Each protein contains a descrip list that specifies the data or output registered by the application as well as identifying information for the program itself. Where possible, the protein descrips may also ascribe a general semantic meaning for the output event or action. The protein's data payload (e.g., ingests) carries the full set of useful state information for the program event.

The proteins, as described above, are available in the pool for use by any program or device coupled or connected to the pool, regardless of type of the program or device. Consequently, any number of programs running on any number of computers may extract event proteins from the input pool. These devices need only be able to participate in the pool via either the local memory bus or a network connection in order to extract proteins from the pool. An immediate consequence of this is the beneficial possibility of decoupling processes that are responsible for generating processing events from those that use or interpret the events. Another consequence is the multiplexing of sources and consumers of events so that devices may be controlled by one person or may be used simultaneously by several people (e.g., a Plasma-based input framework supports many concurrent users), while the resulting event streams are in turn visible to multiple event consumers.

As an example, device C can extract one or more proteins (e.g., protein 1A, protein 2A, etc.) from the pool. Following protein extraction, device C can use the data of the protein, retrieved or read from the slaw of the descrips and ingests of the protein, in processing events to which the protein data corresponds. As another example, device B can extract one or more proteins (e.g., protein 1C, protein 2A, etc.) from the pool. Following protein extraction, device B can use the data of the protein in processing events to which the protein data corresponds.

Devices and/or programs coupled or connected to a pool may skim backwards and forwards in the pool looking for particular sequences of proteins. It is often useful, for example, to set up a program to wait for the appearance of a protein matching a certain pattern, then skim backwards to determine whether this protein has appeared in conjunction with certain others. This facility for making use of the stored event history in the input pool often makes writing state management code unnecessary, or at least significantly reduces reliance on such undesirable coding patterns.

Figure 27:
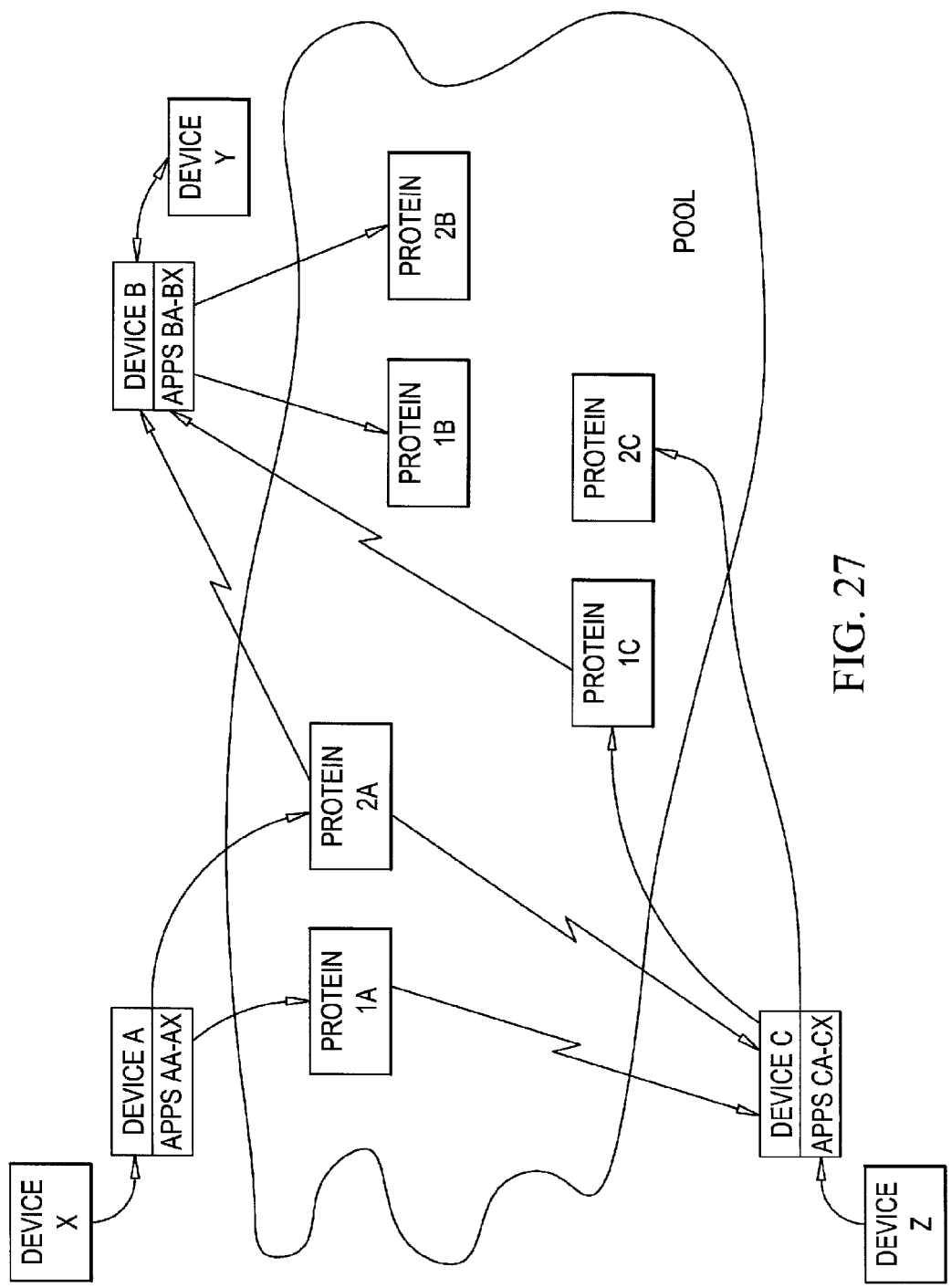
FIG. 27 is a block diagram of a processing environment including multiple devices and numerous programs running on one or more of the devices in which the Plasma constructs (i.e., pools, proteins, and slaw) are used to allow the numerous running programs to share and collectively respond to the events generated by the devices, under an alternative embodiment.

FIG. 27 is a block diagram of a processing environment including multiple devices and numerous programs running on one or more of the devices in which the Plasma constructs (e.g., pools, proteins, and slaw) are used to allow the numerous running programs to share and collectively respond to the events generated by the devices, under an alternative embodiment. This system is but one example of a multi-user, multi-device, multi-computer interactive control scenario or configuration. More particularly, in this example, an interactive system, comprising multiple devices (e.g., devices X and Y coupled to devices A and B, respectively) and a number of programs (e.g., apps AA-AX, apps BA-BX, etc.) running on one or more computers (e.g., device A, device B, etc.) uses the Plasma constructs (e.g., pools, proteins, and slaw) to allow the running programs to share and collectively respond to the events generated by these input devices.

In this example, each device (e.g., devices X and Y coupled to devices A and B, respectively) is managed and/or coupled to run under or in association with one or more programs hosted on the respective device (e.g., device A, device B, etc.) which translates the discrete raw data generated by the device (e.g., device X, device A, device Y, device B, etc.) hardware into Plasma proteins and deposits those proteins into a Plasma pool. For example, device X running in association with application AB hosted on device A generates raw data, translates the discrete raw data into proteins (e.g., protein 1A, protein 2A, etc.) and deposits those proteins into the pool. As another example, device X running in association with application AT hosted on device A generates raw data, translates the discrete raw data into proteins (e.g., protein 1A, protein 2A, etc.) and deposits those proteins into the pool. As yet another example, device Z running in association with application CD hosted on device C generates raw data, translates the discrete raw data into proteins (e.g., protein 1C, protein 2C, etc.) and deposits those proteins into the pool.

Each protein contains a descrip list that specifies the action registered by the input device as well as identifying information for the device itself. Where possible, the protein descrips may also ascribe a general semantic meaning for the device action. The protein's data payload (e.g., ingests) carries the full set of useful state information for the device event.

The proteins, as described above, are available in the pool for use by any program or device coupled or connected to the pool, regardless of type of the program or device. Consequently, any number of programs running on any number of computers may extract event proteins from the input pool. These devices need only be able to participate in the pool via either the local memory bus or a network connection in order to extract proteins from the pool. An immediate consequence of this is the beneficial possibility of decoupling processes that are responsible for generating processing events from those that use or interpret the events. Another consequence is the multiplexing of sources and consumers of events so that input devices may be controlled by one person or may be used simultaneously by several people (e.g., a Plasma-based input framework supports many concurrent users), while the resulting event streams are in turn visible to multiple event consumers.

Devices and/or programs coupled or connected to a pool may skim backwards and forwards in the pool looking for particular sequences of proteins. It is often useful, for example, to set up a program to wait for the appearance of a protein matching a certain pattern, then skim backwards to determine whether this protein has appeared in conjunction with certain others. This facility for making use of the stored event history in the input pool often makes writing state management code unnecessary, or at least significantly reduces reliance on such undesirable coding patterns.

Figure 28:
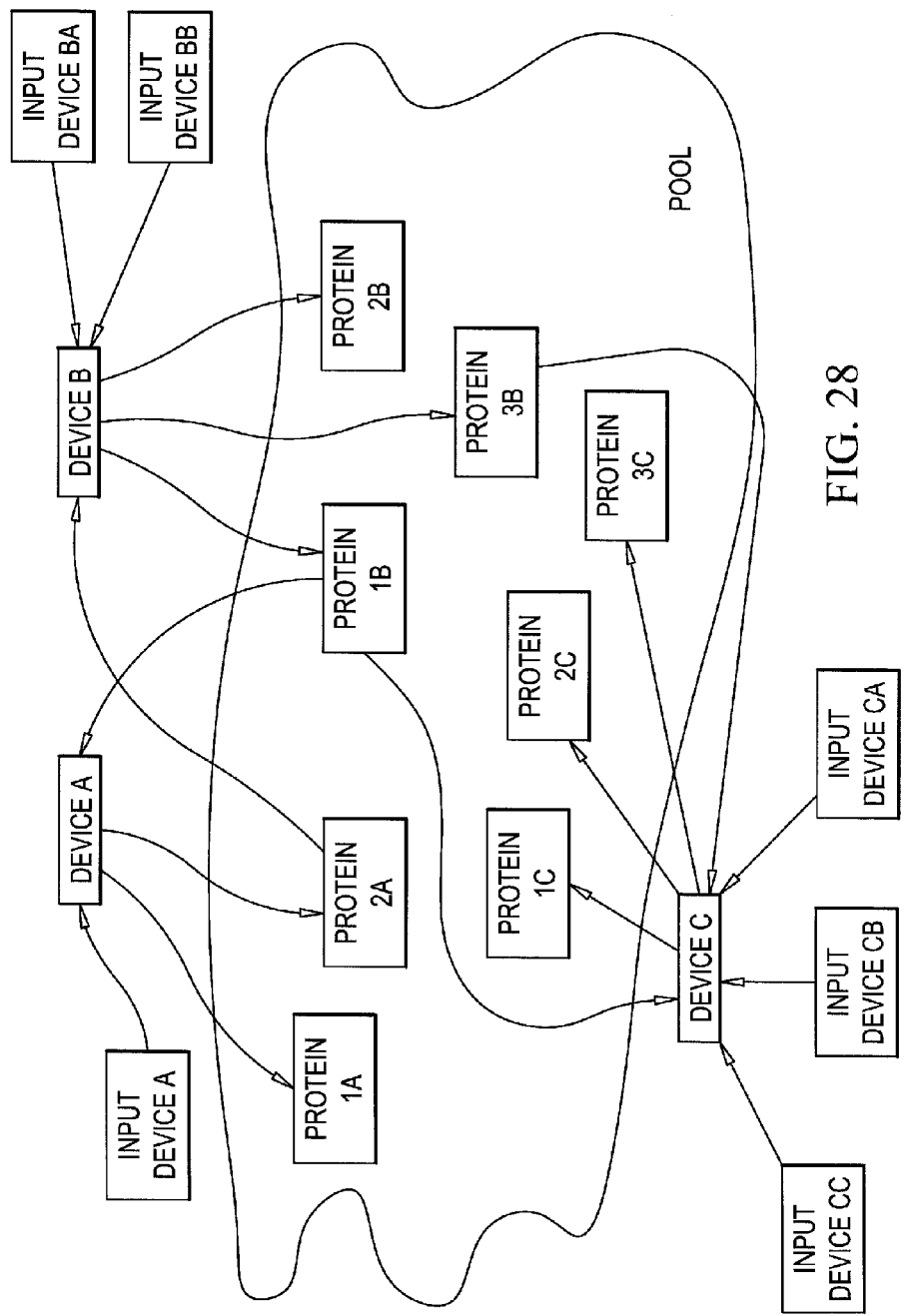
FIG. 28 is a block diagram of a processing environment including multiple input devices coupled among numerous programs running on one or more of the devices in which the Plasma constructs (i.e., pools, proteins, and slaw) are used to allow the numerous running programs to share and collectively respond to the events generated by the input devices, under another alternative embodiment.

FIG. 28 is a block diagram of a processing environment including multiple input devices coupled among numerous programs running on one or more of the devices in which the Plasma constructs (e.g., pools, proteins, and slaw) are used to allow the numerous running programs to share and collectively respond to the events generated by the input devices, under another alternative embodiment. This system is but one example of a multi-user, multi-device, multi-computer interactive control scenario or configuration. More particularly, in this example, an interactive system, comprising multiple input devices (e.g., input devices A, B, BA, and BB, etc.) and a number of programs (not shown) running on one or more computers (e.g., device A, device B, etc.) uses the Plasma constructs (e.g., pools, proteins, and slaw) to allow the running programs to share and collectively respond to the events generated by these input devices.

In this example, each input device (e.g., input devices A, B, BA, and BB, etc.) is managed by a software driver program hosted on the respective device (e.g., device A, device B, etc.) which translates the discrete raw data generated by the input device hardware into Plasma proteins and deposits those proteins into a Plasma pool. For example, input device A generates raw data and provides the raw data to device A which, in turn, translates the discrete raw data into proteins (e.g., protein 1A, protein 2A, etc.) and deposits those proteins into the pool. As another example, input device BB generates raw data and provides the raw data to device B which, in turn, translates the discrete raw data into proteins (e.g., protein 1B, protein 3B, etc.) and deposits those proteins into the pool.

Each protein contains a descrip list that specifies the action registered by the input device as well as identifying information for the device itself. Where possible, the protein descrips may also ascribe a general semantic meaning for the device action. The protein's data payload (e.g., ingests) carries the full set of useful state information for the device event.

To illustrate, here are example proteins for two typical events in such a system. Proteins are represented here as text however, in an actual implementation, the constituent parts of these proteins are typed data bundles (e.g., slaw). The protein describing a g-speak "one finger click" pose (described in the Related Applications) is as follows:

[Descrips: {point, engage, one, one-finger-engage, hand, pilot-id-02, hand-id-23}
Ingests: {pilot-id=>02,
hand-id=>23,
pos=>[0.0, 0.0, 0.0]
angle-axis=>[0.0, 0.0, 0.0, 0.707]
gripe=>..^||:vx
time=>184437103.29}]

As a further example, the protein describing a mouse click is as follows:

[Descrips: {point, click, one, mouse-click, button-one, mouse-id-02}
Ingests: {mouse-id=>23,
pos [0.0, 0.0, 0.0]
time=>184437124.80}]

Either or both of the sample proteins foregoing might cause a participating program of a host device to run a particular portion of its code. These programs may be interested in the general semantic labels: the most general of all, "point", or the more specific pair, "engage, one". Or they may be looking for events that would plausibly be generated only by a precise device: "one-finger-engage", or even a single aggregate object, "hand-id-23".

The proteins, as described above, are available in the pool for use by any program or device coupled or connected to the pool, regardless of type of the program or device. Consequently, any number of programs running on any number of computers may extract event proteins from the input pool. These devices need only be able to participate in the pool via either the local memory bus or a network connection in order to extract proteins from the pool. An immediate consequence of this is the beneficial possibility of decoupling processes that are responsible for generating 'input events' from those that use or interpret the events. Another consequence is the multiplexing of sources and consumers of events so that input devices may be controlled by one person or may be used simultaneously by several people (e.g., a Plasma-based input framework supports many concurrent users), while the resulting event streams are in turn visible to multiple event consumers.

As an example or protein use, device C can extract one or more proteins (e.g., protein 1B, etc.) from the pool. Following protein extraction, device C can use the data of the protein, retrieved or read from the slaw of the descrips and ingests of the protein, in processing input events of input devices CA and CC to which the protein data corresponds. As another example, device A can extract one or more proteins (e.g., protein 1B, etc.) from the pool. Following protein extraction, device A can use the data of the protein in processing input events of input device A to which the protein data corresponds.

Devices and/or programs coupled or connected to a pool may skim backwards and forwards in the pool looking for particular sequences of proteins. It is often useful, for example, to set up a program to wait for the appearance of a protein matching a certain pattern, then skim backwards to determine whether this protein has appeared in conjunction with certain others. This facility for making use of the stored event history in the input pool often makes writing state management code unnecessary, or at least significantly reduces reliance on such undesirable coding patterns.

Examples of input devices that are used in the embodiments of the system described herein include gestural input sensors, keyboards, mice, infrared remote controls such as those used in consumer electronics, and task-oriented tangible media objects, to name a few.

Figure 29:
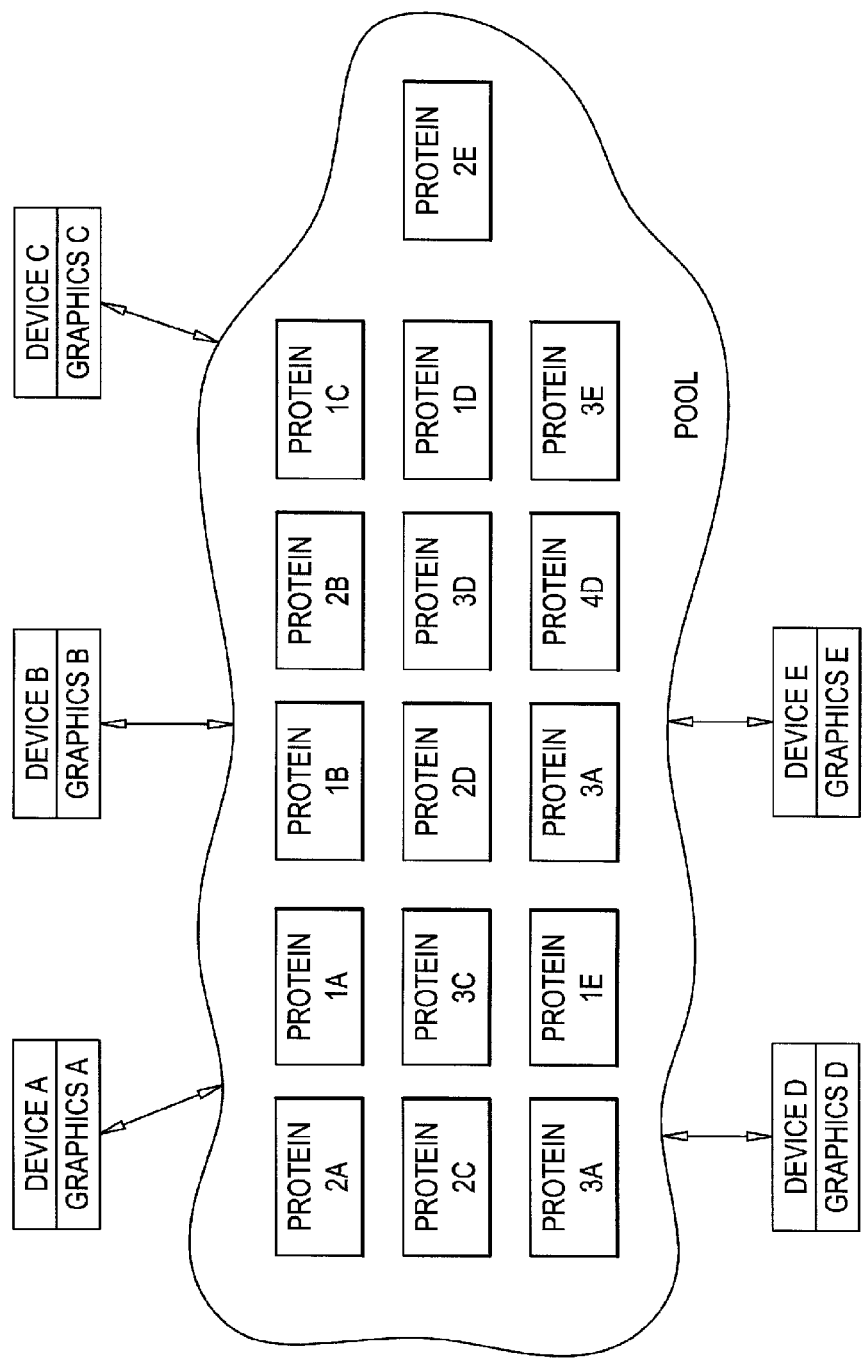
FIG. 29 is a block diagram of a processing environment including multiple devices coupled among numerous programs running on one or more of the devices in which the Plasma constructs (i.e., pools, proteins, and slaw) are used to allow the numerous running programs to share and collectively respond to the graphics events generated by the devices, under yet another alternative embodiment.

FIG. 29 is a block diagram of a processing environment including multiple devices coupled among numerous programs running on one or more of the devices in which the Plasma constructs (e.g., pools, proteins, and slaw) are used to allow the numerous running programs to share and collectively respond to the graphics events generated by the devices, under yet another alternative embodiment. This system is but one example of a system comprising multiple running programs (e.g. graphics A-E) and one or more display devices (not shown), in which the graphical output of some or all of the programs is made available to other programs in a coordinated manner using the Plasma constructs (e.g., pools, proteins, and slaw) to allow the running programs to share and collectively respond to the graphics events generated by the devices.

It is often useful for a computer program to display graphics generated by another program. Several common examples include video conferencing applications, network-based slideshow and demo programs, and window managers. Under this configuration, the pool is used as a Plasma library to implement a generalized framework which encapsulates video, network application sharing, and window management, and allows programmers to add in a number of features not commonly available in current versions of such programs.

Programs (e.g., graphics A-E) running in the Plasma compositing environment participate in a coordination pool through couplings and/or connections to the pool. Each program may deposit proteins in that pool to indicate the availability of graphical sources of various kinds. Programs that are available to display graphics also deposit proteins to indicate their displays' capabilities, security and user profiles, and physical and network locations.

Graphics data also may be transmitted through pools, or display programs may be pointed to network resources of other kinds (RTSP streams, for example). The phrase "graphics data" as used herein refers to a variety of different representations that lie along a broad continuum; examples of graphics data include but are not limited to literal examples (e.g., an 'image', or block of pixels), procedural examples (e.g., a sequence of 'drawing' directives, such as those that flow down a typical openGL pipeline), and descriptive examples (e.g., instructions that combine other graphical constructs by way of geometric transformation, clipping, and compositing operations).

On a local machine graphics data may be delivered through platform-specific display driver optimizations. Even when graphics are not transmitted via pools, often a periodic screen-capture will be stored in the coordination pool so that clients without direct access to the more esoteric sources may still display fall-back graphics.

One advantage of the system described here is that unlike most message passing frameworks and network protocols, pools maintain a significant buffer of data. So programs can rewind backwards into a pool looking at access and usage patterns (in the case of the coordination pool) or extracting previous graphics frames (in the case of graphics pools).

Figure 30:
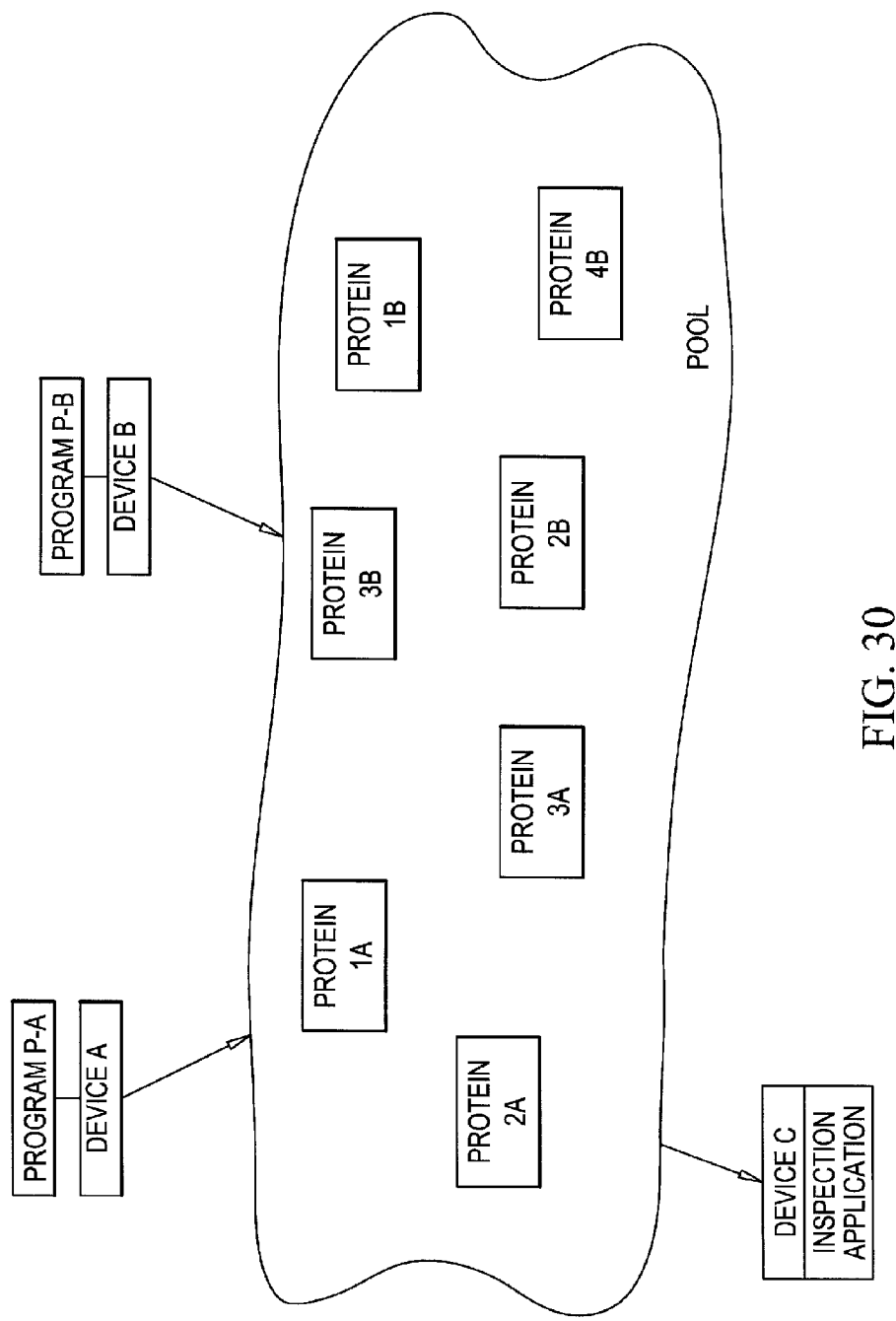
FIG. 30 is a block diagram of a processing environment including multiple devices coupled among numerous programs running on one or more of the devices in which the Plasma constructs (i.e., pools, proteins, and slaw) are used to allow stateful inspection, visualization, and debugging of the running programs, under still another alternative embodiment.

FIG. 30 is a block diagram of a processing environment including multiple devices coupled among numerous programs running on one or more of the devices in which the Plasma constructs (e.g., pools, proteins, and slaw) are used to allow stateful inspection, visualization, and debugging of the running programs, under still another alternative embodiment. This system is but one example of a system comprising multiple running programs (e.g. program P-A, program P-B, etc.) on multiple devices (e.g., device A, device B, etc.) in which some programs access the internal state of other programs using or via pools.

Most interactive computer systems comprise many programs running alongside one another, either on a single machine or on multiple machines and interacting across a network. Multi-program systems can be difficult to configure, analyze and debug because run-time data is hidden inside each process and difficult to access. The generalized framework and Plasma constructs of an embodiment described herein allow running programs to make much of their data available via pools so that other programs may inspect their state. This framework enables debugging tools that are more flexible than conventional debuggers, sophisticated system maintenance tools, and visualization harnesses configured to allow human operators to analyze in detail the sequence of states that a program or programs has passed through.

Referring to FIG. 30, a program (e.g., program P-A, program P-B, etc.) running in this framework generates or creates a process pool upon program start up. This pool is registered in the system almanac, and security and access controls are applied. More particularly, each device (e.g., device A, B, etc.) translates discrete raw data generated by or output from the programs (e.g., program P-A, program P-B, etc.) running on that respective device into Plasma proteins and deposits those proteins into a Plasma pool. For example, program P-A generates data or output and provides the output to device A which, in turn, translates the raw data into proteins (e.g., protein 1A, protein 2A, protein 3A, etc.) and deposits those proteins into the pool. As another example, program P-B generates data and provides the data to device B which, in turn, translates the data into proteins (e.g., proteins 1B-4B, etc.) and deposits those proteins into the pool.

For the duration of the program's lifetime, other programs with sufficient access permissions may attach to the pool and read the proteins that the program deposits; this represents the basic inspection modality, and is a conceptually "one-way" or "read-only" proposition: entities interested in a program P-A inspect the flow of status information deposited by P-A in its process pool. For example, an inspection program or application running under device C can extract one or more proteins (e.g., protein 1A, protein 2A, etc.) from the pool. Following protein extraction, device C can use the data of the protein, retrieved or read from the slaw of the descrips and ingests of the protein, to access, interpret and inspect the internal state of program P-A.

But, recalling that the Plasma system is not only an efficient stateful transmission scheme but also an omnidirectional messaging environment, several additional modes support program-to-program state inspection. An authorized inspection program may itself deposit proteins into program P's process pool to influence or control the characteristics of state information produced and placed in that process pool (which, after all, program P not only writes into but reads from).

Figure 31:
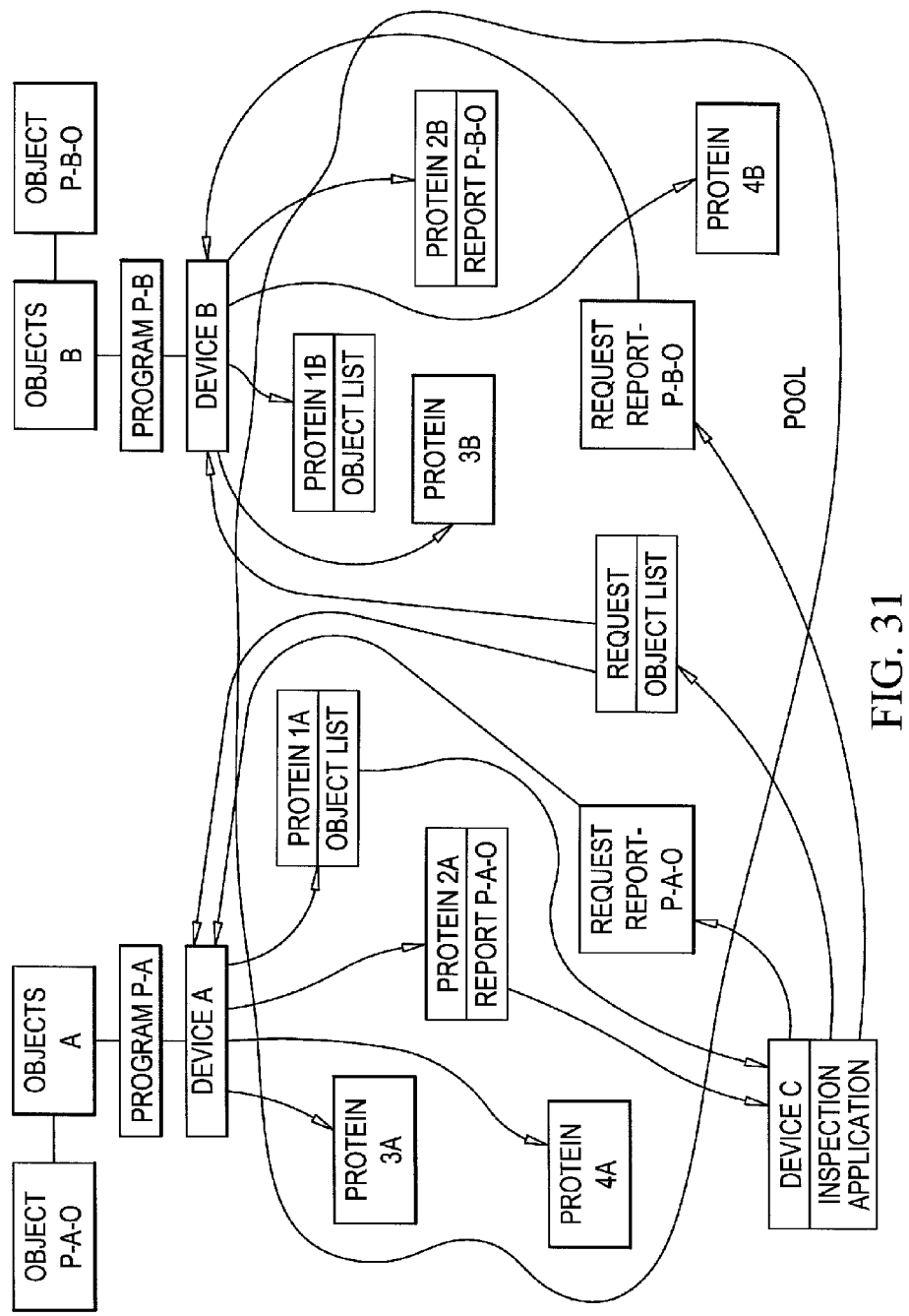
FIG. 31 is a block diagram of a processing environment including multiple devices coupled among numerous programs running on one or more of the devices in which the Plasma constructs (i.e., pools, proteins, and slaw) are used to allow influence or control the characteristics of state information produced and placed in that process pool, under an additional alternative embodiment.

FIG. 31 is a block diagram of a processing environment including multiple devices coupled among numerous programs running on one or more of the devices in which the Plasma constructs (e.g., pools, proteins, and slaw) are used to allow influence or control the characteristics of state information produced and placed in that process pool, under an additional alternative embodiment. In this system example, the inspection program of device C can for example request that programs (e.g., program P-A, program P-B, etc.) dump more state than normal into the pool, either for a single instant or for a particular duration. Or, prefiguring the next 'level' of debug communication, an interested program can request that programs (e.g., program P-A, program P-B, etc.) emit a protein listing the objects extant in its runtime environment that are individually capable of and available for interaction via the debug pool. Thus informed, the interested program can 'address' individuals among the objects in the programs runtime, placing proteins in the process pool that a particular object alone will take up and respond to. The interested program might, for example, request that an object emit a report protein describing the instantaneous values of all its component variables. Even more significantly, the interested program can, via other proteins, direct an object to change its behavior or its variables' values.

More specifically, in this example, inspection application of device C places into the pool a request (in the form of a protein) for an object list (e.g., "Request-Object List") that is then extracted by each device (e.g., device A, device B, etc.) coupled to the pool. In response to the request, each device (e.g., device A, device B, etc.) places into the pool a protein (e.g., protein 1A, protein 1B, etc.) listing the objects extant in its runtime environment that are individually capable of and available for interaction via the debug pool.

Thus informed via the listing from the devices, and in response to the listing of the objects, the inspection application of device C addresses individuals among the objects in the programs runtime, placing proteins in the process pool that a particular object alone will take up and respond to. The inspection application of device C can, for example, place a request protein (e.g., protein "Request Report P-A-O", "Request Report P-B-O") in the pool that an object (e.g., object P-A-O, object P-B-O, respectively) emit a report protein (e.g., protein 2A, protein 2B, etc.) describing the instantaneous values of all its component variables. Each object (e.g., object P-A-O, object P-B-O) extracts its request (e.g., protein "Request Report P-A-O", "Request Report P-B-O", respectively) and, in response, places a protein into the pool that includes the requested report (e.g., protein 2A, protein 2B, respectively). Device C then extracts the various report proteins (e.g., protein 2A, protein 2B, etc.) and takes subsequent processing action as appropriate to the contents of the reports.

In this way, use of Plasma as an interchange medium tends ultimately to erode the distinction between debugging, process control, and program-to-program communication and coordination.

To that last, the generalized Plasma framework allows visualization and analysis programs to be designed in a loosely-coupled fashion. A visualization tool that displays memory access patterns, for example, might be used in conjunction with any program that outputs its basic memory reads and writes to a pool. The programs undergoing analysis need not know of the existence or design of the visualization tool, and vice versa.

The use of pools in the manners described above does not unduly affect system performance. For example, embodiments have allowed for depositing of several hundred thousand proteins per second in a pool, so that enabling even relatively verbose data output does not noticeably inhibit the responsiveness or interactive character of most programs.

Embodiments described herein include a method comprising receiving data from a sensor corresponding to an object detected by the sensor. The method includes generating images from each frame of the data. The images represent a plurality of resolutions. The method includes detecting blobs in the images and tracking the object by associating the blobs with tracks of the object. The method includes detecting a pose of the object by classifying each blob as corresponding to one of a plurality of object shapes. The method includes controlling a gestural interface in response to the pose and the tracks.

Embodiments described herein include a method comprising: receiving data from a sensor corresponding to an object detected by the sensor; generating images from each frame of the data, wherein the images represent a plurality of resolutions; detecting blobs in the images and tracking the object by associating the blobs with tracks of the object; detecting a pose of the object by classifying each blob as corresponding to one of a plurality of object shapes; and controlling a gestural interface in response to the pose and the tracks.

The detecting of the pose and the tracks of an embodiment is based on a three-dimensional structure of the object.

The detecting of the pose and the tracks of an embodiment comprises real-time local segmentation and object detection using depth data of the sensor.

The generating of the images of an embodiment comprises generating at least a first image having a first resolution and a second image having a second resolution.

The detecting of the blobs of an embodiment comprises detecting the blobs in the first image.

The detecting of the pose of an embodiment comprises detecting the pose in the second image.

The object of an embodiment is a hand of a human subject, wherein the detecting of the pose and the tracking of the object comprises skeleton-free detecting.

The method comprises determining that the hand corresponds to extrema in terms of geodesic distance from a center of body mass of the human subject.

The detecting of the pose and the tracking of the object of an embodiment comprises per-frame extrema detection.

The detecting of the pose of an embodiment comprises matching the extrema detected to parts of the human subject.

The method comprises identifying extrema candidates by detecting directional peaks in a first depth image of the images.

The method comprises identifying potential hands as blobs that are spatially connected to the extrema candidates.

The method comprises excluding use of a pre-specified bounding box to limit processing volume.

The data of an embodiment comprises data from a depth sensor.

The method comprises forming the first depth image by down-sampling the data of the depth sensor from an input resolution to a first resolution.

The detecting of the directional peaks of an embodiment comprises identifying peak pixels that extend farther than their spatial neighbors in any of a plurality of cardinal directions.

The detecting of the blobs of an embodiment comprises designating each peak pixel as a seed for a blob, and bounding the blob by a maximum hand size.

The method comprises establishing the maximum hand size as a size value plus a depth-dependent slack value that represents expected depth error.

The size value of an embodiment is approximately 300 millimeters (mm).

The depth error of an embodiment corresponds to a physical distance represented by a plurality of adjacent raw sensor readings.

The method comprises, for each blob, estimating a center of a potential hand by identifying a pixel that is farthest from a border of the blob.

The method comprises pruning each blob using a palm radius.

The pruning of an embodiment includes hand pixels and excludes pixels corresponding to other parts of the human subject.

The palm radius of an embodiment is approximately 200 mm.

The method comprises identifying extension pixels that extend the blob.

The method comprises searching an outer boundary of each blob and identifying the extension pixels.

The extension pixels of an embodiment include pixels adjacent to the blob that have a similar depth as pixels of the blob.

The method comprises analyzing the extension pixels for a region that is small relative to a boundary length.

The method comprises pruning blobs having a disconnected extension region.

In a valid hand blob of an embodiment the extension region corresponds to a wrist of the human subject.

The tracking of the object of an embodiment comprises matching blobs in the first image with existing tracks of the hand.

The method comprises scoring each blob/track pair according to a minimum distance between a centroid of the blob and a trajectory of the track bounded by a current velocity.

The method comprises optimizing the associating between the blobs and the tracks by minimizing a total score across all matches.

The minimizing of the total score of an embodiment uses a score threshold, wherein at least one blob/track is unmatched when a score of the blob/track pair exceeds the threshold.

The score threshold of an embodiment is approximately 250 mm.

The method comprises comparing remaining unmatched blobs to the existing tracks.

The method comprises adding an unmatched blob to an existing track as a secondary matched blob when the unmatched blob is in close spatial proximity to the existing track.

A plurality of blobs of an embodiment is associated with a single track.

The method comprises using any remaining unmatched blobs to seed new tracks.

The method comprises using any remaining unmatched blobs to prune old tracks.

The detecting of the pose of an embodiment comprises, using a second depth image of the images, identifying pixels that correspond to the tracks of the hand.

The method comprises forming the second depth image by down-sampling the data of the depth sensor from an input resolution to a second resolution.

The method comprises identifying the pixels by seeding a connected component search at each pixel within a depth distance from a corresponding pixel of the first depth image, wherein the connected component comprises the blobs of the first depth image that are spatially connected to the extrema candidates.

The method comprises re-estimating the center of the hand using the identified pixels, wherein the re-estimating provides a three-dimensional position estimate having a relatively higher sensitivity.

The method comprises classifying each blob as one of the plurality of object shapes, wherein the plurality of object shapes include a plurality of hand shapes.

The classifying of an embodiment uses randomized decision forests.

Each decision forest of an embodiment comprises a plurality of decision trees and a final classification of each blob is computed by merging results across the plurality of decision trees.

The plurality of decision trees of an embodiment is randomized.

The classifying as one of the plurality of hand shapes of an embodiment comprises use of a plurality of sets of image features.

A first set of image features of an embodiment comprises global image statistics.

The global image statistics of an embodiment comprise at least one of percentage of pixels covered by a blob contour, a number of fingertips detected, a mean angle from a centroid of a blob to the fingertips, and a mean angle of the fingertips.

The method comprises detecting fingertips from a contour of each blob by identifying regions of high positive curvature.

A second set of image features of an embodiment comprises a number of pixels covered by every grid within a bounding box of a blob normalized by its total size.

The method comprises subsampling each blob to a pre-specified grid size.

A third set of image features of an embodiment comprises a difference between a mean depth for each pair of individual cells of every grid within a bounding box of a blob.

A fourth set of image features of an embodiment comprises a combination of the first set of image features, the second set of image features, and the third set of image features.

When an extension region is identified, estimating an orientation of the hand shape of an embodiment is based on a vector connecting a center of the extension region to the centroid of the blob.

The sensor of an embodiment comprises a depth sensor.

The depth sensor of an embodiment is an infrared (IR) depth sensor that outputs data of a distance between components of the object and the sensor.

The sensor of an embodiment comprises an infrared (IR) emitter that illuminates the object with infrared light beams.

The sensor of an embodiment comprises a video camera.

The video camera of an embodiment is a color camera that outputs multi-channel data.

Embodiments described herein include a method comprising receiving sensor data of an appendage of a body. The method includes generating from the sensor data a first image having a first resolution. The method includes detecting a plurality of blobs in the first image. The method includes associating the plurality of blobs with tracks of the appendage. The method includes generating from the sensor data a second image having a second resolution. The method includes classifying, using the second image, each blob of the plurality of blobs as one of a plurality of hand shapes.

Embodiments described herein include a method comprising: receiving sensor data of an appendage of a body; generating from the sensor data a first image having a first resolution; detecting a plurality of blobs in the first image; associating the plurality of blobs with tracks of the appendage; generating from the sensor data a second image having a second resolution; and classifying, using the second image, each blob of the plurality of blobs as one of a plurality of hand shapes.

Embodiments described herein include a system comprising a gestural interface application running on a processor that is coupled to a sensor. The gestural interface application receives data from the sensor corresponding to an object detected by the sensor. The gestural interface application generates images from each frame of the data. The images represent a plurality of resolutions. The gestural interface application detects blobs in the images and tracks the object by associating the blobs with tracks of the object. The gestural interface application detects a pose of the object by classifying each blob as corresponding to one of a plurality of object shapes. The gestural interface application generates a gesture signal in response to the pose and the tracks and controls a component coupled to the interface system with the gesture signal.

Embodiments described herein include a system comprising a gestural interface application running on a processor that is coupled to a sensor, the gestural interface application receiving data from the sensor corresponding to an object detected by the sensor, generating images from each frame of the data, wherein the images represent a plurality of resolutions, detecting blobs in the images and tracking the object by associating the blobs with tracks of the object, detecting a pose of the object by classifying each blob as corresponding to one of a plurality of object shapes, and generating a gesture signal in response to the pose and the tracks and controlling a component coupled to the interface system with the gesture signal.

The detecting of the pose and the tracks of an embodiment is based on a three-dimensional structure of the object.

The detecting of the pose and the tracks of an embodiment comprises real-time local segmentation and object detection using depth data of the sensor.

The generating of the images of an embodiment comprises generating at least a first image having a first resolution and a second image having a second resolution.

The detecting of the blobs of an embodiment comprises detecting the blobs in the first image.

The detecting of the pose of an embodiment comprises detecting the pose in the second image.

The object of an embodiment is a hand of a human subject, wherein the detecting of the pose and the tracking of the object comprises skeleton-free detecting.

The system comprises determining that the hand corresponds to extrema in terms of geodesic distance from a center of body mass of the human subject.

The detecting of the pose and the tracking of the object of an embodiment comprises per-frame extrema detection.

The detecting of the pose of an embodiment comprises matching the extrema detected to parts of the human subject.

The system comprises identifying extrema candidates by detecting directional peaks in a first depth image of the images.

The system comprises identifying potential hands as blobs that are spatially connected to the extrema candidates.

The system comprises excluding use of a pre-specified bounding box to limit processing volume.

The data of an embodiment comprises data from a depth sensor.

The system comprises forming the first depth image by down-sampling the data of the depth sensor from an input resolution to a first resolution.

The detecting of the directional peaks of an embodiment comprises identifying peak pixels that extend farther than their spatial neighbors in any of a plurality of cardinal directions.

The detecting of the blobs of an embodiment comprises designating each peak pixel as a seed for a blob, and bounding the blob by a maximum hand size.

The system comprises establishing the maximum hand size as a size value plus a depth-dependent slack value that represents expected depth error.

The size value of an embodiment is approximately 300 millimeters (mm).

The depth error of an embodiment corresponds to a physical distance represented by a plurality of adjacent raw sensor readings.

The system comprises, for each blob, estimating a center of a potential hand by identifying a pixel that is farthest from a border of the blob.

The system comprises, comprising pruning each blob using a palm radius.

The pruning of an embodiment includes hand pixels and excludes pixels corresponding to other parts of the human subject.

The palm radius of an embodiment is approximately 200 mm.

The system comprises identifying extension pixels that extend the blob.

The system comprises searching an outer boundary of each blob and identifying the extension pixels.

The extension pixels of an embodiment include pixels adjacent to the blob that have a similar depth as pixels of the blob.

The system comprises analyzing the extension pixels for a region that is small relative to a boundary length.

The system comprises pruning blobs having a disconnected extension region.

In a valid hand blob, the extension region of an embodiment corresponds to a wrist of the human subject.

The tracking of the object of an embodiment comprises matching blobs in the first image with existing tracks of the hand.

The system comprises scoring each blob/track pair according to a minimum distance between a centroid of the blob and a trajectory of the track bounded by a current velocity.

The system comprises optimizing the associating between the blobs and the tracks by minimizing a total score across all matches.

The minimizing of the total score of an embodiment uses a score threshold, wherein at least one blob/track is unmatched when a score of the blob/track pair exceeds the threshold.

The score threshold of an embodiment is approximately 250 mm.

The system comprises comparing remaining unmatched blobs to the existing tracks.

The system comprises adding an unmatched blob to an existing track as a secondary matched blob when the unmatched blob is in close spatial proximity to the existing track.

A plurality of blobs of an embodiment is associated with a single track.

The system comprises using any remaining unmatched blobs to seed new tracks.

The system comprises using any remaining unmatched blobs to prune old tracks.

The detecting of the pose of an embodiment comprises, using a second depth image of the images, identifying pixels that correspond to the tracks of the hand.

The system comprises forming the second depth image by down-sampling the data of the depth sensor from an input resolution to a second resolution.

The system comprises identifying the pixels by seeding a connected component search at each pixel within a depth distance from a corresponding pixel of the first depth image, wherein the connected component comprises the blobs of the first depth image that are spatially connected to the extrema candidates.

The system comprises re-estimating the center of the hand using the identified pixels, wherein the re-estimating provides a three-dimensional position estimate having a relatively higher sensitivity.

The system comprises classifying each blob as one of the plurality of object shapes, wherein the plurality of object shapes include a plurality of hand shapes.

The classifying of an embodiment uses randomized decision forests.

Each decision forest of an embodiment comprises a plurality of decision trees and a final classification of each blob is computed by merging results across the plurality of decision trees.

The plurality of decision trees of an embodiment is randomized.

The classifying as one of the plurality of hand shapes of an embodiment comprises use of a plurality of sets of image features.

A first set of image features of an embodiment comprises global image statistics.

The global image statistics of an embodiment comprise at least one of percentage of pixels covered by a blob contour, a number of fingertips detected, a mean angle from a centroid of a blob to the fingertips, and a mean angle of the fingertips.

The system comprises detecting fingertips from a contour of each blob by identifying regions of high positive curvature.

A second set of image features of an embodiment comprises a number of pixels covered by every grid within a bounding box of a blob normalized by its total size.

The system comprises subsampling each blob to a pre-specified grid size.

A third set of image features of an embodiment comprises a difference between a mean depth for each pair of individual cells of every grid within a bounding box of a blob.

A fourth set of image features of an embodiment comprises a combination of the first set of image features, the second set of image features, and the third set of image features.

The system comprises, when an extension region is identified, estimating an orientation of the hand shape based on a vector connecting a center of the extension region to the centroid of the blob.

The sensor of an embodiment comprises a depth sensor.

The depth sensor of an embodiment is an infrared (IR) depth sensor that outputs data of a distance between components of the object and the sensor.

The sensor of an embodiment comprises an infrared (IR) emitter that illuminates the object with infrared light beams.

The sensor of an embodiment comprises a video camera.

The video camera of an embodiment is a color camera that outputs multi-channel data.

Embodiments described herein include a system comprising a detection and tracking algorithm running on a processor that is coupled to a sensor. The detection and tracking algorithm is coupled to a gestural interface. The detection and tracking algorithm receives sensor data of an appendage of a body. The detection and tracking algorithm generates from the sensor data a first image having a first resolution. The detection and tracking algorithm detects a plurality of blobs in the first image. The detection and tracking algorithm associates the plurality of blobs with tracks of the appendage. The detection and tracking algorithm generates from the sensor data a second image having a second resolution. The detection and tracking algorithm classifies, using the second image, each blob of the plurality of blobs as one of a plurality of hand shapes.

Embodiments described herein include a system comprising a detection and tracking algorithm running on a processor that is coupled to a sensor, wherein the detection and tracking algorithm is coupled to a gestural interface, the detection and tracking algorithm receiving sensor data of an appendage of a body, generating from the sensor data a first image having a first resolution, detecting a plurality of blobs in the first image, associating the plurality of blobs with tracks of the appendage, generating from the sensor data a second image having a second resolution, and classifying, using the second image, each blob of the plurality of blobs as one of a plurality of hand shapes.

The systems and methods described herein include and/or run under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, cellular telephones, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components of a host system, and/or provided by some combination of algorithms. The methods described herein can be implemented in one or more of software algorithm(s), programs, firmware, hardware, components, circuitry, in any combination.

System components embodying the systems and methods described herein can be located together or in separate locations. Consequently, system components embodying the systems and methods described herein can be components of a single system, multiple systems, and/or geographically separate systems. These components can also be subcomponents or subsystems of a single system, multiple systems, and/or geographically separate systems. These components can be coupled to one or more other components of a host system or a system coupled to the host system.

Communication paths couple the system components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the processing environment is not intended to be exhaustive or to limit the systems and methods described to the precise form disclosed. While specific embodiments of, and examples for, the processing environment are described herein for illustrative purposes, various equivalent modifications are possible within the scope of other systems and methods, as those skilled in the relevant art will recognize. The teachings of the processing environment provided herein can be applied to other processing systems and methods, not only for the systems and methods described above.

The elements and acts of the various embodiments described above can be combined to provide further embodiments. These and other changes can be made to the processing environment in light of the above detailed description.

What is claimed is:

1. A system comprising: a detection and tracking algorithm running on a processor that is coupled to a sensor, wherein the detection and tracking algorithm is coupled to a gestural interface; a gestural interface application running on a processor that is coupled to a sensor, the gestural interface application receiving data from the sensor corresponding to an object detected by the sensor, generating images from each frame of the data, wherein the images represent a plurality of resolutions, detecting blobs in the images and tracking the object by associating the blobs with tracks of the object, detecting a pose of the object by classifying each blob as corresponding to one of a plurality of object shapes, and generating a gesture signal in response to the pose and the tracks and controlling a component coupled to the interface system with the gesture signal.

2. A system comprising a detection and tracking algorithm running on a processor that is coupled to a sensor, wherein the detection and tracking algorithm is coupled to a gestural interface, the detection and tracking algorithm receiving sensor data of an appendage of a body, generating from the sensor data a first image having a first resolution, detecting a plurality of blobs in the first image, associating the plurality of blobs with tracks of the appendage, generating from the sensor data a second image having a second resolution, and classifying, using the second image, each blob of the plurality of blobs as one of a plurality of hand shapes.

3. A method comprising: a detection and tracking algorithm running on a processor that is coupled to a sensor, wherein the detection and tracking algorithm is coupled to a gestural interface; receiving sensor data of an appendage of a body; generating from the sensor data a first image having a first resolution; detecting a plurality of blobs in the first image; associating the plurality of blobs with tracks of the appendage; generating from the sensor data a second image having a second resolution; and classifying, using the second image, each blob of the plurality of blobs as one of a plurality of hand shapes.

4. A method comprising: a detection and tracking algorithm running on a processor that is coupled to a sensor, wherein the detection and tracking algorithm is coupled to a gestural interface; receiving data from a sensor corresponding to an object detected by the sensor; generating images from each frame of the data, wherein the images represent a plurality of resolutions; detecting blobs in the images and tracking the object by associating the blobs with tracks of the object; detecting a pose of the object by classifying each blob as corresponding to one of a plurality of object shapes; and controlling a gestural interface in response to the pose and the tracks.

5. The method of claim 4, wherein the detecting of the pose and the tracks is based on a three-dimensional structure of the object.

6. The method of claim 4, wherein the detecting of the pose and the tracks comprises real-time local segmentation and object detection using depth data of the sensor.

7. The method of claim 4, wherein the generating of the images comprises generating at least a first image having a first resolution and a second image having a second resolution.

8. The method of claim 7, wherein the detecting of the blobs comprises detecting the blobs in the first image.

9. The method of claim 8, wherein the detecting of the pose comprises detecting the pose in the second image.

10. The method of claim 4, wherein the object is a hand of a human subject, wherein the detecting of the pose and the tracking of the object comprises skeleton-free detecting.

11. The method of claim 10, comprising determining that the hand corresponds to extrema in terms of geodesic distance from a center of body mass of the human subject.

12. The method of claim 10, wherein the detecting of the pose and the tracking of the object comprises per-frame extrema detection.

13. The method of claim 12, wherein the detecting of the pose comprises matching the extrema detected to parts of the human subject.

14. The method of claim 12, comprising identifying extrema candidates by detecting directional peaks in a first depth image of the images.

15. The method of claim 14, comprising identifying potential hands as blobs that are spatially connected to the extrema candidates.

16. The method of claim 15, comprising excluding use of a pre-specified bounding box to limit processing volume.

17. The method of claim 14, wherein the data comprises data from a depth sensor.

18. The method of claim 17, comprising forming the first depth image by down-sampling the data of the depth sensor from an input resolution to a first resolution.

19. The method of claim 14, wherein the detecting of the directional peaks comprises identifying peak pixels that extend farther than their spatial neighbors in any of a plurality of cardinal directions.

20. The method of claim 19, wherein the detecting of the blobs comprises designating each peak pixel as a seed for a blob, and bounding the blob by a maximum hand size.

21. The method of claim 20, comprising establishing the maximum hand size as a size value plus a depth-dependent slack value that represents expected depth error.

22. The method of claim 21, wherein the size value is approximately 300 millimeters (mm).

23. The method of claim 21, wherein the depth error corresponds to a physical distance represented by a plurality of adjacent raw sensor readings.

24. The method of claim 20, comprising, for each blob, estimating a center of a potential hand by identifying a pixel that is farthest from a border of the blob.

25. The method of claim 24, comprising pruning each blob using a palm radius.

26. The method of claim 25, wherein the pruning includes hand pixels and excludes pixels corresponding to other parts of the human subject.

27. The method of claim 25, wherein the palm radius is approximately 200 mm.

28. The method of claim 25, comprising identifying extension pixels that extend the blob.

29. The method of claim 28, comprising searching an outer boundary of each blob and identifying the extension pixels.

30. The method of claim 28, wherein the extension pixels include pixels adjacent to the blob that have a similar depth as pixels of the blob.

31. The method of claim 28, comprising analyzing the extension pixels for a region that is small relative to a boundary length.

32. The method of claim 31, comprising pruning blobs having a disconnected extension region.

33. The method of claim 32, wherein, in a valid hand blob, the extension region corresponds to a wrist of the human subject.

34. The method of claim 28, wherein the tracking of the object comprises matching blobs in the first image with existing tracks of the hand.

35. The method of claim 34, comprising scoring each blob/track pair according to a minimum distance between a centroid of the blob and a trajectory of the track bounded by a current velocity.

36. The method of claim 35, comprising optimizing the associating between the blobs and the tracks by minimizing a total score across all matches.

37. The method of claim 36, wherein the minimizing of the total score uses a score threshold, wherein at least one blob/track is unmatched when a score of the blob/track pair exceeds the threshold.

38. The method of claim 37, wherein the score threshold is approximately 250 mm.

39. The method of claim 34, comprising comparing remaining unmatched blobs to the existing tracks.

40. The method of claim 39, comprising adding an unmatched blob to an existing track as a secondary matched blob when the unmatched blob is in close spatial proximity to the existing track.

41. The method of claim 40, wherein a plurality of blobs are associated with a single track.

42. The method of claim 39, comprising using any remaining unmatched blobs to seed new tracks.

43. The method of claim 39, comprising using any remaining unmatched blobs to prune old tracks.

44. The method of claim 39, wherein the detecting of the pose comprises, using a second depth image of the images, identifying pixels that correspond to the tracks of the hand.

45. The method of claim 44, comprising forming the second depth image by down-sampling the data of the depth sensor from an input resolution to a second resolution.

46. The method of claim 44, comprising identifying the pixels by seeding a connected component search at each pixel within a depth distance from a corresponding pixel of the first depth image, wherein the connected component comprises the blobs of the first depth image that are spatially connected to the extrema candidates.

47. The method of claim 46, comprising re-estimating the center of the hand using the identified pixels, wherein the re-estimating provides a three-dimensional position estimate having a relatively higher sensitivity.

48. The method of claim 44, comprising classifying each blob as one of the plurality of object shapes, wherein the plurality of object shapes include a plurality of hand shapes.

49. The method of claim 48, wherein the classifying uses randomized decision forests.

50. The method of claim 49, wherein each decision forest comprises a plurality of decision trees and a final classification of each blob is computed by merging results across the plurality of decision trees.

51. The method of claim 50, wherein the plurality of decision trees are randomized.

52. The method of claim 48, wherein the classifying as one of the plurality of hand shapes comprises use of a plurality of sets of image features.

53. The method of claim 52, wherein a first set of image features comprises global image statistics.

54. The method of claim 53, wherein the global image statistics comprise at least one of percentage of pixels covered by a blob contour, a number of fingertips detected, a mean angle from a centroid of a blob to the fingertips, and a mean angle of the fingertips.

55. The method of claim 54, comprising detecting fingertips from a contour of each blob by identifying regions of high positive curvature.

56. The method of claim 53, wherein a second set of image features comprises a number of pixels covered by every grid within a bounding box of a blob normalized by its total size.

57. The method of claim 56, comprising subsampling each blob to a pre-specified grid size.

58. The method of claim 56, wherein a third set of image features comprises a difference between a mean depth for each pair of individual cells of every grid within a bounding box of a blob.

59. The method of claim 58, wherein a fourth set of image features comprises a combination of the first set of image features, the second set of image features, and the third set of image features.

60. The method of claim 52, comprising, when an extension region is identified, estimating an orientation of the hand shape based on a vector connecting a center of the extension region to the centroid of the blob.

61. The method of claim 4, wherein the sensor comprises a depth sensor.

62. The method of claim 61, wherein the depth sensor is an infrared (IR) depth sensor that outputs data of a distance between components of the object and the sensor.

63. The method of claim 62, wherein the sensor comprises an infrared (IR) emitter that illuminates the object with infrared light beams.

64. The method of claim 61, wherein the sensor comprises a video camera.

65. The method of claim 64, wherein the video camera is a color camera that outputs multi-channel data.

* * * * *